United States Patent
Seo et al.

(10) Patent No.: US 9,729,297 B2
(45) Date of Patent: Aug. 8, 2017

(54) METHOD AND APPARATUS FOR PERFORMING HARQ IN CARRIER AGGREGATION SYSTEM

(71) Applicant: LG ELECTRONICS INC., Seoul (KR)

(72) Inventors: Dongyoun Seo, Seoul (KR); Joonkui Ahn, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 30 days.

(21) Appl. No.: 14/759,581

(22) PCT Filed: Jan. 8, 2014

(86) PCT No.: PCT/KR2014/000214
§ 371 (c)(1),
(2) Date: Jul. 7, 2015

(87) PCT Pub. No.: WO2014/109553
PCT Pub. Date: Jul. 17, 2014

(65) Prior Publication Data
US 2015/0349936 A1 Dec. 3, 2015

Related U.S. Application Data

(60) Provisional application No. 61/750,315, filed on Jan. 8, 2013, provisional application No. 61/883,224, filed
(Continued)

(51) Int. Cl.
*H04L 5/00* (2006.01)
*H04W 72/12* (2009.01)
(Continued)

(52) U.S. Cl.
CPC .......... *H04L 5/0055* (2013.01); *H04L 1/1854* (2013.01); *H04L 1/1864* (2013.01);
(Continued)

(58) Field of Classification Search
CPC ....... H04L 5/0055; H04L 1/1864; H04L 5/14; H04L 1/1854; H04L 1/1887; H04L 5/001; H04W 72/1289
(Continued)

(56) References Cited

U.S. PATENT DOCUMENTS

2011/0243088 A1   10/2011   Ahn et al.
2012/0269180 A1   10/2012   Li et al.
(Continued)

FOREIGN PATENT DOCUMENTS

EP   2 640 155 A1   9/2013
EP   2696523 A2    2/2014
(Continued)

*Primary Examiner* — Kwang B Yao
*Assistant Examiner* — Syed M Bokhari
(74) *Attorney, Agent, or Firm* — Birch, Stewart, Kolasch & Birch, LLP

(57) ABSTRACT

Provided are an apparatus and a method for executing an uplink hybrid automatic repeat request (HARQ) in a carrier aggregation system. The method transmits data to a base station from an uplink subframe of a second cell, and receives, from the base station, an acknowledgement/not-acknowledgement (ACK/NACK) or scheduling information for the data from a downlink subframe of a first cell, wherein if the timing relationship between the uplink subframe of the second cell and the downlink subframe of the first cell does not match the timing relationship for when the first cell is being used exclusively, then the scheduling information is received from the downlink subframe of the first cell.

6 Claims, 45 Drawing Sheets

Related U.S. Application Data on Sep. 27, 2013, provisional application No. 61/897,195, filed on Oct. 29, 2013, provisional application No. 61/900,315, filed on Nov. 5, 2013.

(51) Int. Cl.
*H04L 1/18* (2006.01)
*H04L 5/14* (2006.01)

(52) U.S. Cl.
CPC .............. *H04L 1/1887* (2013.01); *H04L 5/14* (2013.01); *H04W 72/1289* (2013.01); *H04L 5/001* (2013.01)

(58) Field of Classification Search
USPC .................. 370/277, 280, 329, 331, 311
See application file for complete search history.

(56) References Cited

U.S. PATENT DOCUMENTS

| | | | |
|---|---|---|---|
| 2012/0281600 A1 | 11/2012 | Tseng et al. | |
| 2012/0327821 A1 | 12/2012 | Lin et al. | |
| 2013/0315114 A1 | 11/2013 | Seo et al. | |
| 2013/0343239 A1* | 12/2013 | Damnjanovic | H04L 5/001 370/280 |
| 2014/0036749 A1* | 2/2014 | Wang | H04W 28/12 370/311 |
| 2014/0092865 A1* | 4/2014 | Heo | H04W 52/0258 370/331 |
| 2014/0301320 A1* | 10/2014 | Kim | H04L 1/1861 370/329 |
| 2015/0223240 A1* | 8/2015 | Choi | H04L 1/1861 370/329 |
| 2016/0050060 A1 | 2/2016 | Seo et al. | |

FOREIGN PATENT DOCUMENTS

| | | |
|---|---|---|
| KR | 10-2010-0073998 A | 7/2010 |
| KR | 10-2012-0125197 A | 11/2012 |
| KR | 10-2012-0130735 A | 12/2012 |
| WO | WO 2012/108718 A2 | 8/2012 |
| WO | 2012/128558 A2 | 9/2012 |
| WO | WO 2012/138179 A2 | 10/2012 |

\* cited by examiner

METHOD AND APPARATUS FOR PERFORMING HARQ IN CARRIER AGGREGATION SYSTEM

CROSS REFERENCE TO RELATED APPLICATIONS

This application is the National Phase of PCT International Application No. PCT/KR2014/000214, filed on Jan. 8, 2014, which claims priority under 35 U.S.C. 119(e) to U.S. Provisional Application Nos. 61/750,315, filed on Jan. 8, 2013, 61/883,224, filed on Sep. 27, 2013, 61/897,195, filed on Oct. 29, 2013 and 61/900,315, filed on Nov. 5, 2013, all of which are hereby expressly incorporated by reference into the present application.

BACKGROUND OF THE INVENTION

Field of the Invention

The present invention relates to wireless communication and, more particularly, to a method and apparatus for performing hybrid automatic repeat request (HARQ) in a carrier aggregation system.

Related Art

Carrier aggregation systems are getting attention these days. A carrier aggregation system refers to a broadband wireless communication system comprising more than one component carrier (CC) which provides bandwidth smaller than the target bandwidth of the broadband wireless communication system. In a carrier aggregation system, a term of a serving cell may be used instead of the term of a component carrier. A serving cell associated with the carrier aggregation system may consist of a pair of two component carriers such as a downlink component carrier (DL CC) and a uplink component carrier (UL CC) or consist only of DL CCs. A carrier aggregation system is such a kind of system where a plurality of serving cells is associated with one user equipment.

Conventional carrier aggregation systems allowed aggregating only those component carriers operating in the same scheme. In other words, the a priori art allowed aggregating only the component carriers operating based on the frequency division duplex (FDD) scheme or the time division duplex (TDD) scheme. In particular, in the case of TDD, it is assumed that component carriers to be aggregated are set up with the same uplink-downlink configuration (UL-DL configuration). UL-DL configuration is intended to inform in which subframe each individual subframe within a frame consisting of a plurality of subframes is used between a uplink (UL) subframe and a downlink (DL) subframe.

However, there are chances that future wireless communication systems may not be constrained to aggregate only those component carriers employing the same scheme. For example, component carriers operating based on the FDD scheme or component carriers consisting only of uplink subframes may be aggregated with component carriers operating based on the TDD scheme. Similarly, component carriers operating based on the TDD scheme may be aggregated with component carriers operating based on the FDD scheme. Or component carriers consisting only of uplink subframes may be aggregated with component carriers operating based on the TDD or FDD scheme.

As described above, in a carrier aggregation system where component carriers operating according to the schemes different from each other, it can be difficult or inefficient to directly apply a method for performing hybrid automatic repeat request (HARQ) which assumes aggregation of component carriers operating in the same scheme.

In a component carrier system aggregating component carriers operating according to different schemes from each other, there need a method and an apparatus for efficiently organizing a timing between scheduling information and scheduled data, a timing between the data and acknowledgement/not-acknowledgement (ACK/NACK) which is a response to the data, a timing between the ACK/NACK and data retransmission according to the ACK/NACK, and the like.

SUMMARY OF THE INVENTION

The present invention provides a method and an apparatus for performing HARQ in a carrier aggregation system. In particular, the present invention provides a method and an apparatus for performing HARQ in a carrier aggregation system which aggregates component carriers (cells) employing frame structures different from each other.

In one aspect, provided is a method for performing Hybrid Automatic Repeat reQuest (HARQ) of a user equipment in a carrier aggregation system. The method includes transmitting data from a uplink subframe of a second cell to a base station and receiving ACK/NACK (acknowledgement/not-acknowledgement) about the data from a downlink subframe of a first cell or scheduling information from the base station. A downlink subframe of the first cell receives the scheduling information if a timing relationship between uplink subframe of the second cell and a downlink subframe of the first cell does not coincide with a timing relationship when the first cell is used alone.

In another aspect, provided is a method for performing uplink HARQ of a user equipment in a carrier aggregation system. The method includes transmitting data from a uplink subframe of a second cell to a base station and receiving ACK/NACK (acknowledgement/not-acknowledgement) about the data from a downlink subframe of a first cell or scheduling information from the base station. The first cell uses a Frequency Division Duplex (FDD) frame, and the second cell uses a Time Division Duplex (TDD) frame. A timing relationship between a uplink subframe of the second cell and a downlink subframe of the first cell is determined according to second uplink-downlink (UL-DL) configuration of the second cell and uplink subframes of the second UL-DL configuration overlap most with the UL subframes of first UL-DL configuration applied when the second cell is used alone.

In still another aspect, provided is a method for performing uplink HARQ in a carrier aggregation system. The method includes transmitting data from a uplink subframe of a second cell to a base station and receiving ACK/NACK (acknowledgement/not-acknowledgement) about the data from a downlink subframe of a first cell or scheduling information from the base station. The first cell uses a Time Division Duplex (TDD) frame, and the second cell uses a Frequency Division Duplex (FDD). A timing relationship between a uplink subframe of the second cell and a downlink subframe of the first cell is determined according to uplink-downlink (UL-DL) configuration of the first cell.

HARQ can be performed efficiently even for the case where component carriers (cells) having different frame structures are aggregated.

DESCRIPTION OF EXEMPLARY EMBODIMENTS

User Equipment (UE) can be fixed or can have mobility. UE can also be called another term, such as a Mobile Station (MS), a Mobile Terminal (MT), a User Terminal (UT), a Subscriber Station (SS), a wireless device, a Personal Digital Assistant (PDA), a wireless modem, or a handheld device.

The BS commonly refers to a fixed station that communicates with UE. The BS can also be called another tem, such as an evolved-NodeB (eNodeB), a Base Transceiver System (BTS), or an access point.

Communication from a BS to UE is called downlink (DL), and communication from UE to a BS is called uplink (UL). A wireless communication system including a BS and UE can be a Time Division Duplex (TDD) system or a Frequency Division Duplex (FDD) system. A TDD system is a wireless communication system that performs UL and DL transmission/reception using different times in the same frequency band. An FDD system is a wireless communication system that enables UL and DL transmission/reception at the same time using different frequency bands. A wireless communication system can perform communication using radio frames.

Figure 1:
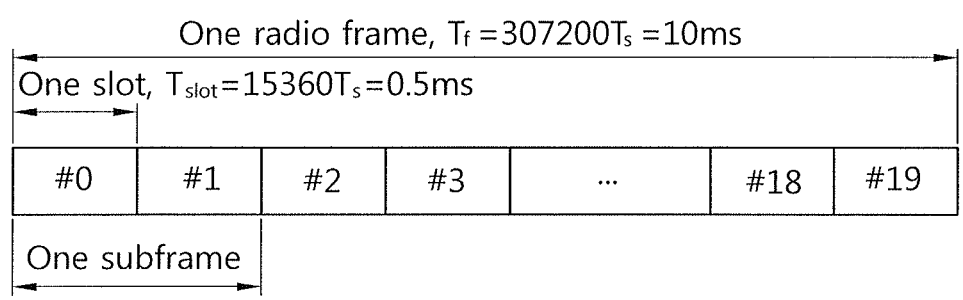
FIG. 1 shows the structure of an FDD radio frame.

FIG. 1 shows the structure of an FDD radio frame.

An FDD radio frame (in what follows, it is called an FDD frame for short) consists of 10 subframes, and one subframe comprises two consecutive slots. Slots included in an FDD frame can be indexed with 0 to 19. The time interval required for one subframe to be transmitted is called a transmission time interval (TTI), and the TTI can be used as a minimum scheduling unit. For example, length of one subframe can be 1 ms, and length of one slot can be 0.5 ms. If length of a radio frame is denoted by $T_f$, $T_f$ can be 307200 $T_s$, which is equal to 10 ms.

In the FDD frame, downlink subframes and uplink subframes can be placed in a consecutive manner in the respective frequency bands. In other words, the FDD frame includes 10 downlink subframes in a first frequency band and 10 uplink subframes in a second frequency band. Downlink subframes and uplink subframes within the FDD frame can be indexed sequentially from 0 to 9.

Figure 2:
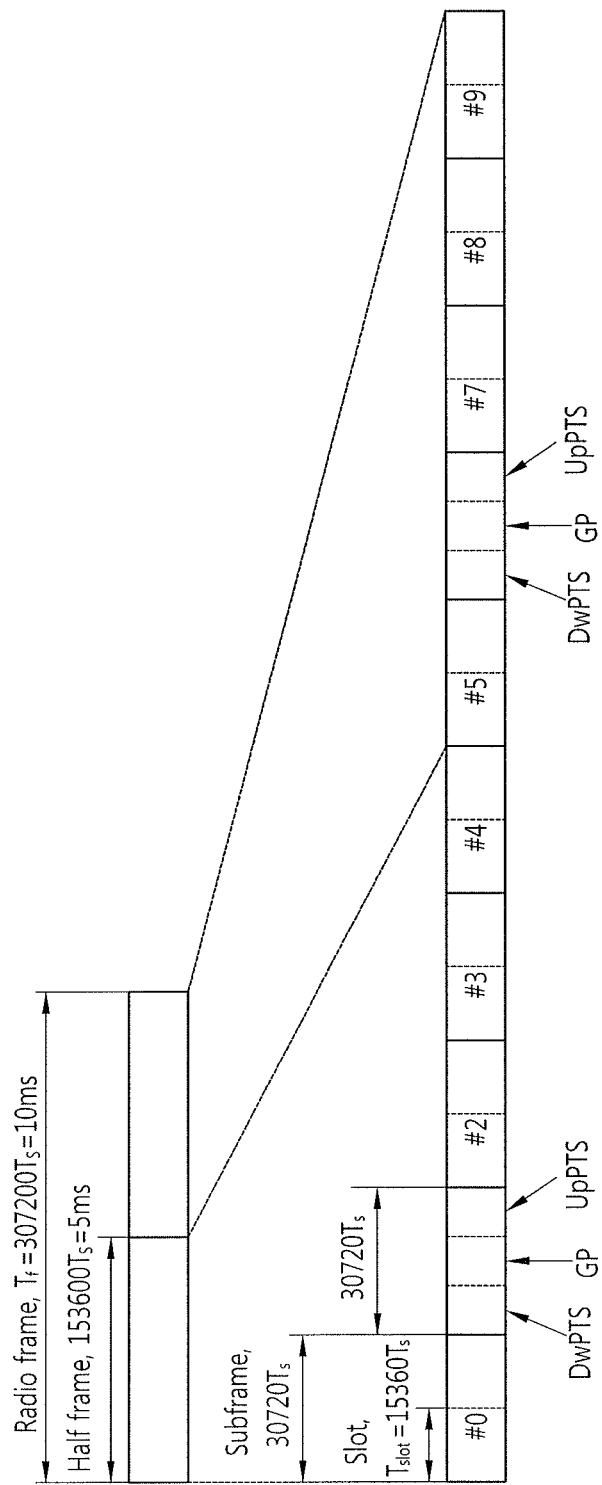
FIG. 2 shows the structure of a TDD radio frame.

FIG. 2 illustrates a structure of a TDD radio frame.

With reference to FIG. 2, a TDD radio frame (in what follows, it is called a TDD frame) comprises two half-frames, and one half-frame comprises 5 subframes, thereby comprising a total of 10 subframes. A TDD frame includes a uplink (UL) subframe, a downlink (DL) subframe, and a special (S) subframe within the same frequency band. If subframes of a TDD frame are indexed from 0, subframes indexed with #1 and #6 may correspond to special subframes, where a special subframe includes a downlink pilot time slot (DwPTS), a guard period (GP), and a uplink pilot time slot (UpPTS). The DwPTS is used for an intimal cell search, synchronization, or channel estimation in a user equipment; and can be used for downlink transmission. The UpPTS is used for channel estimation in a base station and uplink transmission synchronization of a user equipment, which can be used for uplink transmission. The GP is a time period defined for removing interference generated in a uplink due to multi-path delay of a downlink signal between the uplink and a downlink. The GP and the UpPTS can be used as a time gap.

As described above, a DL subframe and a UL subframe of a TDD frame coexist in the same frequency band. Table 1 shows one example of UL-DL configuration of a TDD frame.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' represents a DL subframe, 'U' a UL subframe, and 'S' a special subframe. Receiving UL-DL configuration from a base station, a user equipment can determine whether individual subframes in a TDD frame correspond to DL subframes (or S subframes) or UL subframes.

Figure 3:
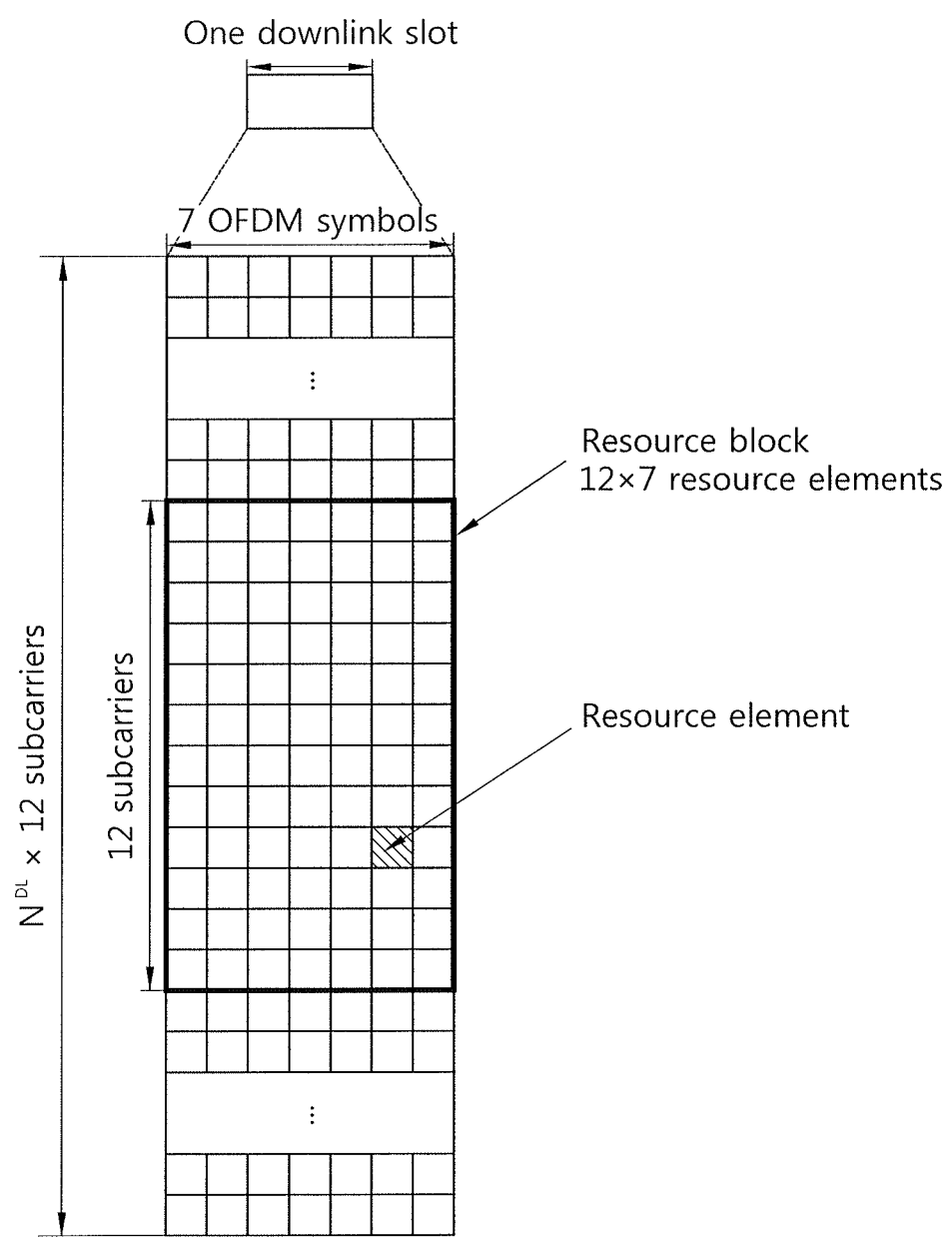
FIG. 3 shows an example of a resource grid for one downlink slot.

FIG. 3 shows an example of a resource grid for one downlink slot.

Referring to FIG. 3, the downlink slot includes a plurality of Orthogonal Frequency Division Multiplexing (OFDM) symbol in the time domain and includes $N_{RB}$ Resource Blocks (RBs) in the frequency domain. The RBs includes one slot in the time domain and a plurality of consecutive subcarrier in the frequency domain in a resource allocation unit. The number of RBs $N_{RB}$ included in the downlink slot depends on a downlink transmission bandwidth $N^{DL}$ configured in a cell. For example, in an LTE system, the $N_{RB}$ can be any one of 6 to 110. An uplink slot can have the same structure as the downlink slot.

Each element on the resource grid is called a Resource Element (RE). The RE on the resource grid can be identified by an index pair (k,l) within a slot. Here, k (k=0, . . . , $N_{RB} \times 12-1$) is a subcarrier index within the frequency domain, and l (l=0, . . . , 6) is an OFDM symbol index within the time domain.

Although 7×12 REs including 7 OFDM symbols in the time domain and 12 subcarrier in the frequency domain have been illustrated as being included in one RB in FIG. 3, the number of OFDM symbols and the number of subcarriers within an RB are not limited thereto. The number of OFDM symbols and the number of subcarriers can be changed in various ways depending on the length of a CP, frequency spacing, etc. In one OFDM symbol, one of 128, 256, 512, 1024, 1536, and 2048 can be selected and used as the number of subcarriers.

Figure 4:
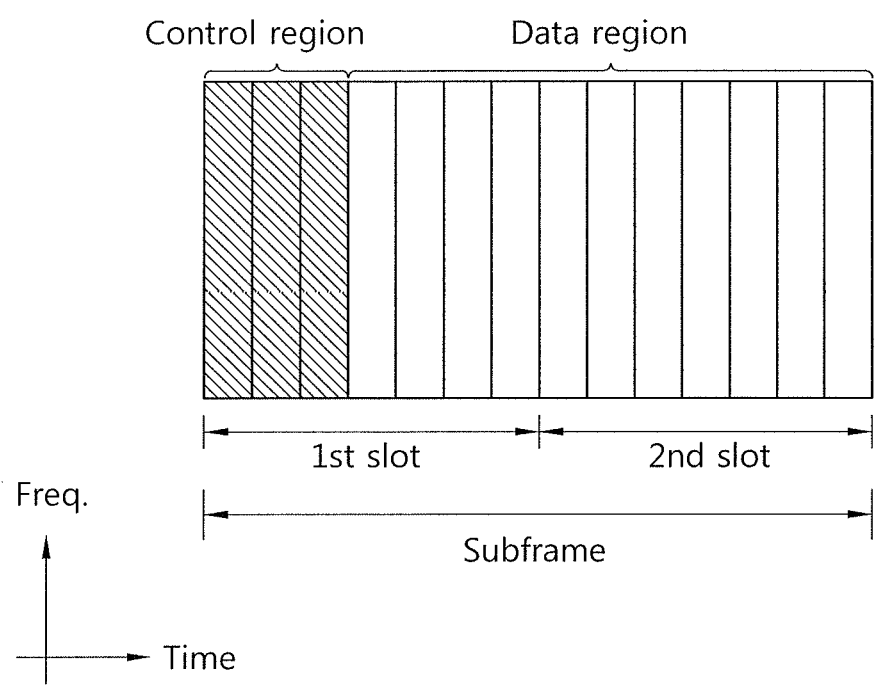
FIG. 4 shows the structure of a DL subframe.

FIG. 4 shows the structure of a DL subframe.

Referring to FIG. 4, a downlink (DL) subframe is divided into a control region and a data region in the time domain. The control region includes a maximum of former 3 (maximum 4 according to circumstances) OFDM symbols of a first slot within a subframe, but the number of OFDM symbols included in the control region can be changed. A control channel different from a physical downlink control channel (PDCCH) is allocated to the control region, and a physical downlink shared channel (PDSCH) is allocated to the data region.

A PCFICH that is transmitted in the first OFDM symbol of a subframe carries a Control Format Indicator (CFI) regarding the number of OFDM symbols (i.e., the size of a control region) that are used to send control channels within the subframe. UE first receives a CFI on a PCFICH and then monitors PDCCHs. Unlike in a PDCCH, a PCFICH is not subject to blind decoding, but is transmitted through the fixed PCFICH resources of a subframe.

A PHICH carries a positive-acknowledgement (ACK)/negative-acknowledgement (NACK) signal for an uplink Hybrid Automatic Repeat reQuest (HARQ). An ACK/NACK signal for uplink (UL) data on a PUSCH which is transmitted by UE is transmitted on a PHICH.

Control information transmitted through a PDCCH is called Downlink Control Information (DCI). DCI can include the resource allocation of a PDSCH (this is also called a DL grant), the resource allocation of a PUSCH (this is also called an UL grant), a set of transmit power control commands for individual MSs within a specific UE group and/or the activation of a Voice over Internet Protocol (VoIP).

Downlink Control Information (DCI) including a DL grant can include a HARQ process number. The DCI has 3 bits for the HARQ process number in the case of FDD, while 4 bits in the case of TDD. The UE can differentiate HARQ processes based on the HARQ process number.

The base station determines a PDCCH format according to the DCI to be sent to the UE, attaches a Cyclic Redundancy Check (CRC) to the DCI, and masks the CRC with a unique identifier (which is called a Radio Network Temporary Identifier (RNTI)) depending on the owner or intended use of the PDCCH.

In case the PDCCH is used for a specific UE, a unique identifier of the UE, for example, the CRC can be masked with a Cell-RNTI (C-RNTI). Similarly, in case the PDCCH is used for a paging message, the CRC can be masked with a paging identifier, for example, a Paging-RNTI (P-RNTI). In the case of a PDCCH for system information, the CRC can be masked with system information identifier, namely, system information-RNTI (SI-RNTI). In order to indicate a random access response, which is a response to a random access preamble of the UE, the CRC can be masked with the Random Access RNTI (RA-RNTI). If the C-RNTI is used, the PDCCH carries control information for the corresponding specific UE (which is called UE-specific control information); if a different RNTI is used, the PDCCH carries common control information that is received by all or a plurality of the UEs within the cell.

The base station encodes CRC-added DCI and generates coded data. The encoding includes channel coding and rate matching. Afterwards, the base station modulates coded data, generates modulated symbols, and transmits the modulated symbols by mapping them into physical resource elements (REs).

The PDSCH transmitted in the data region is a downlink data channel. System information, data, and so on can be transmitted through the PDSCH. And the PBCH carries system information essential for the UE to communicate with the base station, where the system information transmitted through the PBCH is called a Master Information Block (MIB). Similarly, the system information transmitted on the PDSCH specified by the PDCCH is called a System Information Block (SIB).

Figure 5:
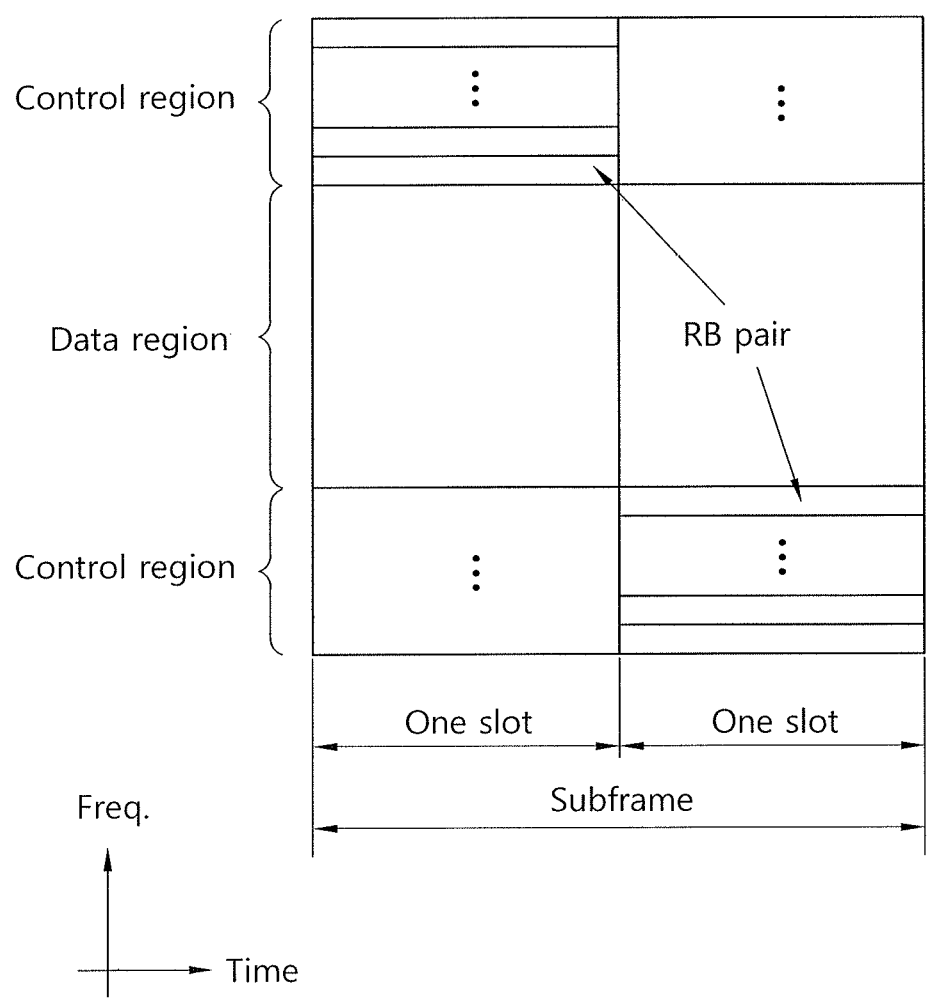
FIG. 5 shows the structure of an UL subframe.

FIG. 5 illustrates a structure of a uplink subframe.

With reference to FIG. 5, in the frequency domain, a uplink subframe can be divided into a control region where a Physical Uplink Control Channel (PUCCH) carrying uplink control information is allocated and a data region where a Physical Uplink Shared Channel (PUSCH) carrying user data and/or control information is allocated.

The PUCCH is allocated onto an RB pair in a subframe. RBs belonging to an RB pair occupy different sub-carriers in each of a first and a second slot.

<Hybrid Automatic Repeat Request (HARQ)>

HARQ operations can be classified into synchronous and asynchronous HARQ.

In a synchronous HARQ scheme, when an initial transmission fails, subsequent retransmission is carried out at a predetermined timing. The retransmission timing can be carried out at each $8^{th}$ time unit (subframe) after the initial transmission. Since that timing is already agreed upon between the base station and the UE, there is no need to additionally inform of the timing. If a data transmitter has received a NACK message, data can be retransmitted at each 8-th subframe until the data transmitter receives an ACK message.

On the other hand, the asynchronous HARQ scheme can be carried out as a retransmission timing is newly scheduled or through additional signaling. The timing of retransmission of the data that were once failed for transmission can be varied by various factors such as a channel condition.

Meanwhile, HARQ operations can be classified into channel non-adaptive HARQ and channel-adaptive HARQ. In the channel non-adaptive HARQ scheme, data modulation, the number of resource blocks, and coding method for retransmission are determined according to the configuration at the initial transmission. On the other hand, in the channel adaptive HARQ scheme, the configuration changes according to the channel condition. For example, suppose a transmitter has transmitted data by using 6 resource blocks at the initial transmission. Then the same number of resource blocks is used to retransmit the data in the channel non-adaptive HARQ scheme. However, in the case of the channel adaptive HARQ scheme, even with the same assumption that 6 resource blocks have been used for the initial data transmission, resource blocks of which the number is larger or smaller than 6 is used for data retransmission depending on the channel condition.

According to the classification above, four different combinations can be applied for HARQ operations; however, asynchronous and channel adaptive HARQ scheme; and synchronous and channel non-adaptive HARQ scheme are two commonly used schemes. The asynchronous and channel adaptive HARQ scheme can maximize retransmission efficiency by changing the amount of resources used and the retransmission timing adaptively according to the channel condition. However, the asynchronous and channel adaptive HARQ scheme readily increases the overhead, by which the scheme is usually not employed for uplink transmission. On the other hand, the synchronous and channel non-adaptive HARQ scheme predetermines retransmission timing and resource allocation, thus requiring virtually zero overhead; however, if the scheme is used in the channel condition exhibiting a severe change, the retransmission efficiency degrades considerably.

In the current 3GPP LTE system, asynchronous HARQ scheme is used for downlink transmission while synchronous HARQ scheme is used for uplink transmission. In other words, asynchronous HARQ scheme is used when the base station transmits/retransmits data while synchronous HARQ scheme is used when the UE transmits/retransmits data.

Figure 6:
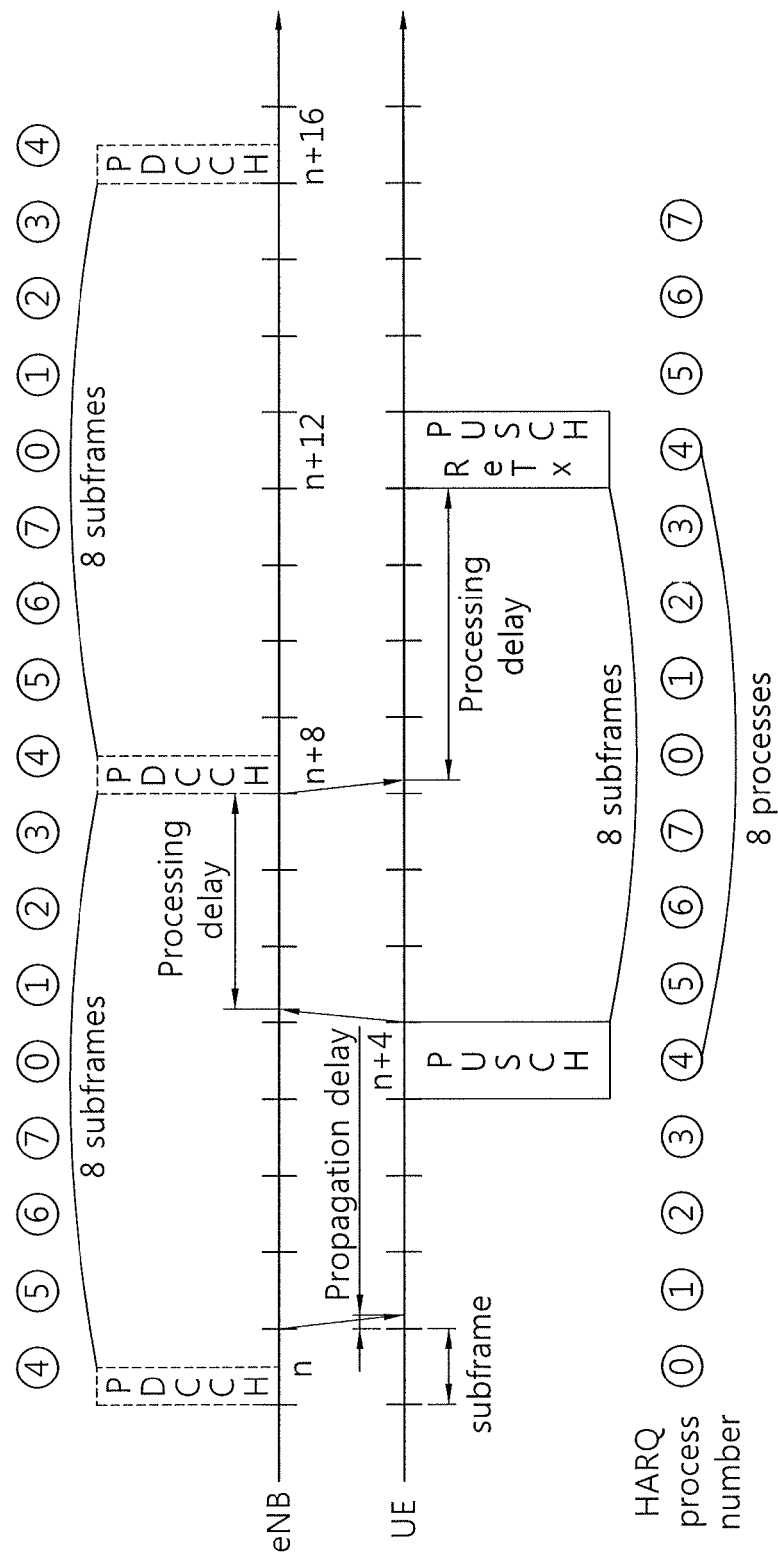
FIG. 6 illustrates a synchronous HARQ scheme used for uplink transmission.

FIG. 6 illustrates a synchronous HARQ scheme used for uplink transmission.

With reference to FIG. 6, after receiving a UL grant, which is scheduling information, at subframe n, the UE transmits the PUSCH at subframe n+4. It should be noted that the PUSCH is scheduled by the UL grant. At subframe n+8, the UE can receive the ACK/NACK signal related to the PUSCH through the PHICH or can receive the UL grant through the PDCCH. The UE can retransmit the PUSCH at subframe n+12. Subframe n, n+4, n+8, and n+12 are the subframes constituting the same HARQ process, and the same HARQ process number can be assigned to the subframes.

Meanwhile, as shown in FIG. 6, a time delay occurs until the UE transmits the next data after receiving the UL grant or the ACK/NACK signal from the base station. The time delay is generated due to a channel propagation delay and processing time required for data decoding and encoding. In order to prevent data transmission from being stopped during the time delay period, a method for transmitting data by using an independent HARQ process is being used.

For example, suppose the shortest time period from data transmission to the next data transmission is 8 subframes for one HARQ process. Then data transmission can be carried out without discontinuity by employing 8 independent HARQ processes. In the LTE FDD scheme, a maximum of 8 HARQ processes can be allocated in case the system is not based on the Multi Input Multi Output (MIMO) operation. In the LTE FDD scheme, the maximum number of HARQ processes can be varied according to UL-DL configuration, which will be described in detail later. In case two codewords are transmitted simultaneously based on the MIMO operation, the two codewords can be transmitted together through one HARQ process, or the two codewords can be transmitted separately by the respective HARQ processes.

In what follows, a carrier aggregation system will be described.

Figure 7:
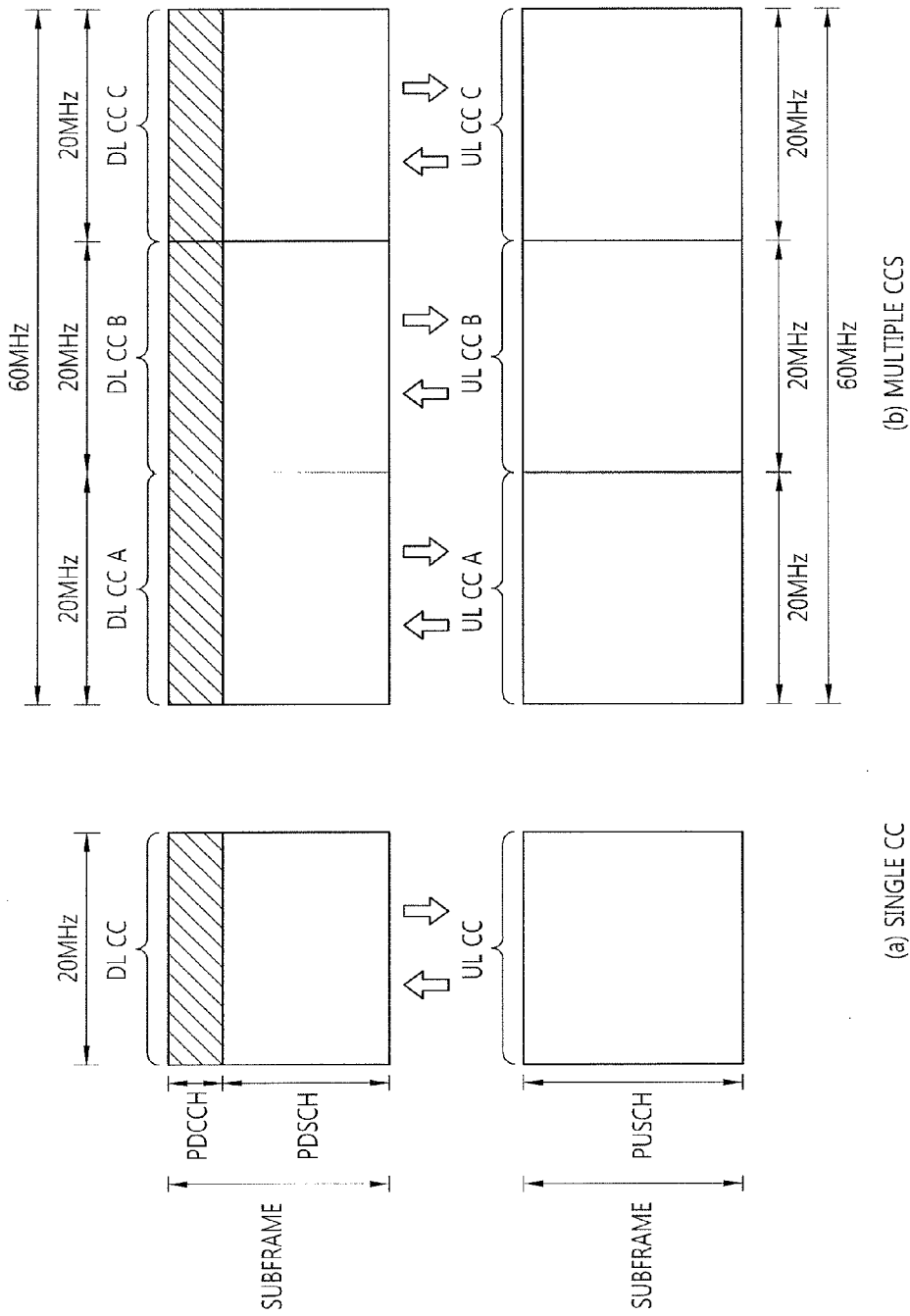
FIG. 7 is an example where a single component carrier system and a carrier aggregation system are compared with each other.

FIG. 7 is an example where a single component carrier system and a carrier aggregation system are compared with each other.

With reference to FIG. 7, in a single component carrier system, only one component carrier is allocated to the UE for uplink and downlink transmission. The bandwidth of a component carrier can vary, but only one component carrier is allocated to the UE. On the other hand, in a carrier aggregation (CA) system, a plurality of component carriers (DL CC A to C, UL CC A to C) can be allocated. For example, three component carriers of 20 MHz bandwidth can be allocated to the UE so that bandwidth of 60 MHz can be allocated.

Carrier aggregation systems can be classified into contiguous carrier aggregation systems where individual component carriers are disposed contiguously and non-contiguous carrier aggregation systems where individual component carriers are disposed apart from each other. In what follows, if a system is simply called a carrier aggregation system, it should be understood that the system refers to both of the case where component carriers are contiguous and the case where component carriers are non-contiguous.

When more than one component carrier is aggregated, target component carriers can use the same bandwidth employed by existing systems to ensure backward compatibility with the existing systems. For example, the 3GPP LTE system supports bandwidth of 1.4 MHz, 3 MHz, 5 MHz, 10 MHz, 15 MHz, and 20 MHz, while the 3GPP LTE-A system is capable of implementing broadband more than 20 MHz by using only the bandwidth of the 3GPP LTE system. Or a broadband system can be implemented by defining new bandwidth instead of adopting the bandwidth of existing systems directly.

System frequency band of a wireless communication system is differentiated by a plurality of carrier frequency. At this time, carrier frequency refers to the center frequency of a cell. In what follows, it is assumed that a cell can be composed of a pair of downlink frequency resources and uplink frequency resources. Or a cell can be composed only of downlink frequency resources. In general, if carrier aggregation is not taken into account, a single cell can always have uplink and downlink frequency resources in the form of a pair.

In order for packet data to be transmitted or received through a specific cell, the UE first needs to complete configuration of the specific cell. At this time, configuration refers to the state where system information required for transmitting and receiving data to and from the corresponding cell has been completed. For example, configuration can include the whole process of receiving common physical layer parameters required for data transmission and reception, MAC layer parameters, or parameters required for particular operations in the RRC layer. A cell which has completed configuration enters a state where the cell can immediately transmit and receive packets once information indicating that packet data can be transmitted is received.

A cell which has completed configuration can stay in the activation or deactivation state. At this time, activation refers to the state where data transmission or reception is being carried out or is in a ready state. The UE can monitor or receive the PDCCH and the PDSCH of an activated cell so that the UE can check the resources (which can be frequency or temporal resources) allocated to the UE.

Deactivation refers to the state where it is not possible to transmit or receive traffic data but measurement or transmission/reception of minimal information is allowed. The UE can receive system information (SI) required for receiving packets from a deactivated cell. On the other hand, the UE does not monitor or receive the PDCCH and the PDSCH of a deactivated cell to check the resources (which can be frequency or temporal resources) allocated to the UE.

Cells can be divided into primary cells (Pcells), secondary cells (Scells), and serving cells.

If the cell is configured for carrier aggregation, the UE establishes only one RRC connection to the network. During the RRC connection establishment/re-establishment/handover process, one cell provides Non-Access Stratum (NAS) mobility information and security input. Such a kind of cell is called a primary cell. In other words, a primary cell refers to the cell in which the UE carries out an initial connection establishment procedure or a connection re-establishment procedure or the cell specified as a primary cell during the handover procedure.

A secondary cell refers to the cell configured to provide additional radio resources after an RRC connection is established through a primary cell.

A serving cell refers to the cell configured to provide a service to the UE, and in case carrier aggregation is not configured or the UE is unable to provide carrier aggregation, the serving cell is composed of primary cells. In case carrier aggregation is configured, a plurality of serving cells can be employed. A plurality of serving cells can be formed by a set of one or more cells from among a primary cell or all of the secondary cells.

A Primary Component Carrier (PCC) refers to the CC corresponding to a primary cell. A PCC is such a kind of CC among various CCs, through which the UE establishes (RRC) connection to the base station during an initial phase. The PCC is a special CC which deals with establishing (RRC) connection for signaling of a plurality of CCs and manages UE context information which carries connection information related to the UE. Also, in case the PCC establishes connection to the UE and enters an RRC connected mode, the PCC always stays in the activation mode. A downlink component carrier corresponding to the primary cell is called a DownLink Primary Component Carrier (DL PCC), and a uplink component carrier corresponding to the primary cell is called a UpLink Primary Component Carrier (UL PCC).

A Secondary Component Carrier (SCC) refers to the CC corresponding to a secondary cell. In other words, an SCC is allocated to the UE in addition to a PCC; an SCC is an extended carrier for allocation of additional resources in addition to a PCC and can be in the activation or the deactivation mode. A downlink component carrier corresponding to a secondary cell is called a DL Secondary CC (DL SCC), and a uplink component carrier corresponding to a secondary cell is called a UL SCC.

As for component carriers constituting a serving cell, a downlink component carrier may constitute one serving cell, and a downlink component carrier and a uplink component carrier may be configured to be connected to each other to form one serving cell. In the prior art, a serving cell is not allowed to be formed by only one uplink component carrier. However, the present invention allows a serving cell to be formed by using only a uplink component carrier.

Activation/deactivation of a component carrier is equivalent to the concept of activation/deactivation of a serving cell. For example, suppose a serving cell 1 is composed of a DL CC1. Then activation of the serving cell 1 indicates activation of the DL CC1. Now, suppose a serving cell 2 is configured so that connection is established between a DL CC2 and a UL CC2. Then activation of the serving cell 2 indicates activation of the DL CC2 and the UL CC2. In this sense, each component carrier can correspond to a cell.

The number of component carriers aggregated can be set differently for downlink and uplink. The case where the number of downlink CCs is the same as the number of uplink CCs is called symmetric aggregation, while it is called asymmetric aggregation if the numbers are different. Similarly, sizes of CCs (namely, bandwidth) can be different from each other. For example, if 5 CCs are used to form bandwidth of 70 MHz, the bandwidth may be realized by 5 MHz CC (carrier #0), 20 MHz CC (carrier #1), 20 MHz CC (carrier #2), 20 MHz CC (carrier #3), and 5 MHz CC (carrier #4).

As described above, different from single component carrier systems, a carrier aggregation system can support a plurality of serving cells, namely, a plurality of component carriers (CCs).

Meanwhile, a carrier aggregation system can support Cross-Carrier Scheduling (CCS). CCS is such a scheduling method capable of resource allocation of the PDSCH transmitted through another component carrier by using the PDCCH transmitted through a particular component carrier and/or resource allocation of the PUSCH transmitted through another component carrier in addition to a component carrier linked to the particular component carrier by default. In other words, the PDCCH and the PDSCH can be transmitted through different DL CCs, and the PUSCH can be transmitted through a UL CC which is not linked to the DL CC through which the PDCCH including a UL grant has been transmitted, namely, a UL CC belonging to a different cell other than the UL CC constituting the same cell. As described above, a CCS-supporting system needs a carrier indicator that can be used to indicate which PDSCH/PUSCH transmitted through some DL CC/UL CC is being scheduled by the PDCCH. The field including such a carrier indicator is called a Carrier Indication Field (CIF).

A CCS-supporting system can include the CIF in the existing Downlink Control Information (DCI) format. In the CCS-supporting system, for example, in the LTE-A system, the CIF is added to an existing DCI format (namely, the DCI format used in the LTE system); therefore, 3 bits can be extended, and the PDCCH structure can re-use the coding method, the resource allocation method (in other words, resource mapping based on the CCE), and so on used in the existing system.

The base station can configure a set of PDCCH monitoring DL CCs (monitoring CCs). The set of PDCCH monitoring DL CCs comprises part of the whole DL CCs aggregated, and if CCS is determined, the UE carries out PDCCH monitoring/decoding only for the DL CCs included in the set of PDCCH monitoring DL CCs. In other words, only through the DL CC included in the set of PDCCH monitoring DL CCs, does the base station transmits the PDCCH related to the PDSCH/PUSCH to be scheduled. The set of PDCCH monitoring DL CCs can be configured in a UE-specific manner, in a UE group-specific manner, or in a cell-specific manner.

Non-Cross Carrier Scheduling (NCCS) refers to the scheme where scheduling is carried out within the same carrier (cell) and data are received/transmitted according to the scheduling. The NCCS is also called self-scheduling. The NCCS can be regarded as a scheduling method that has been applied to existing UEs for which only a single cell is established.

Meanwhile, existing carrier aggregation systems are based on the assumption that carriers using the same frame structure are aggregated. For example, the assumption is that FDD cells employing FDD frames are aggregated or TDD cells employing TDD frames are aggregated. Also, it is further assumed that individual TDD cells use the same UL-DL configuration when the TDD cells are aggregated.

However, in a future carrier aggregation system, an FDD and a TDD cell can be aggregated, and even when TDD cells are aggregated, each individual TDD cell can have different UL-DL configuration. For example, carrier aggregation where the primary cell is an FDD cell and the secondary cell is a TDD cell can also be used. Similarly, carrier aggregation where the primary cell is an FDD cell and the secondary cell consists only of uplink subframes can also be used. In what follows, aggregation of cells based on different schemes or aggregation of cells using different frame structures commonly refer to those examples.

In the future carrier aggregation system, it becomes a problem that in which way HARQ is carried out when CCS is applied.

In what follows, determining at which subframe each step of the synchronous HARQ is carried out is said to set up timing of the synchronous HARQ. For configuration of synchronous HARQ timing, propagation delay of a signal and processing time required to process the signal should be taken into account. It requires minimum preparation time for the UE or the base station since it receives a signal until the next signal in response to the received signal is transmitted; if the preparation time is expressed in units of subframes, it can be called $k_m$ subframe. $k_m$ can be 4, for example.

In the following, for the purpose of convenience, a few terms are defined to describe synchronous HARQ timing used in the uplink transmission. These terms can be used in the following descriptions and drawings.

First, the time interval between transmission of a UL grant and the initial transmission of the PUSCH is called GU and denoted by k. The time interval between the initial transmission of the PUSCH and transmission of the PHICH is called UH and is denoted by j. The time interval between transmission of the PHICH and retransmission of the PUSCH is called HU and denoted by r. The time interval between retransmission of the UL grant and retransmission of the PUSCH is called GU' and denoted by k'. The time interval between transmission of the PUSCH and transmission of the next UL grant is denoted by UG.

Figure 8:
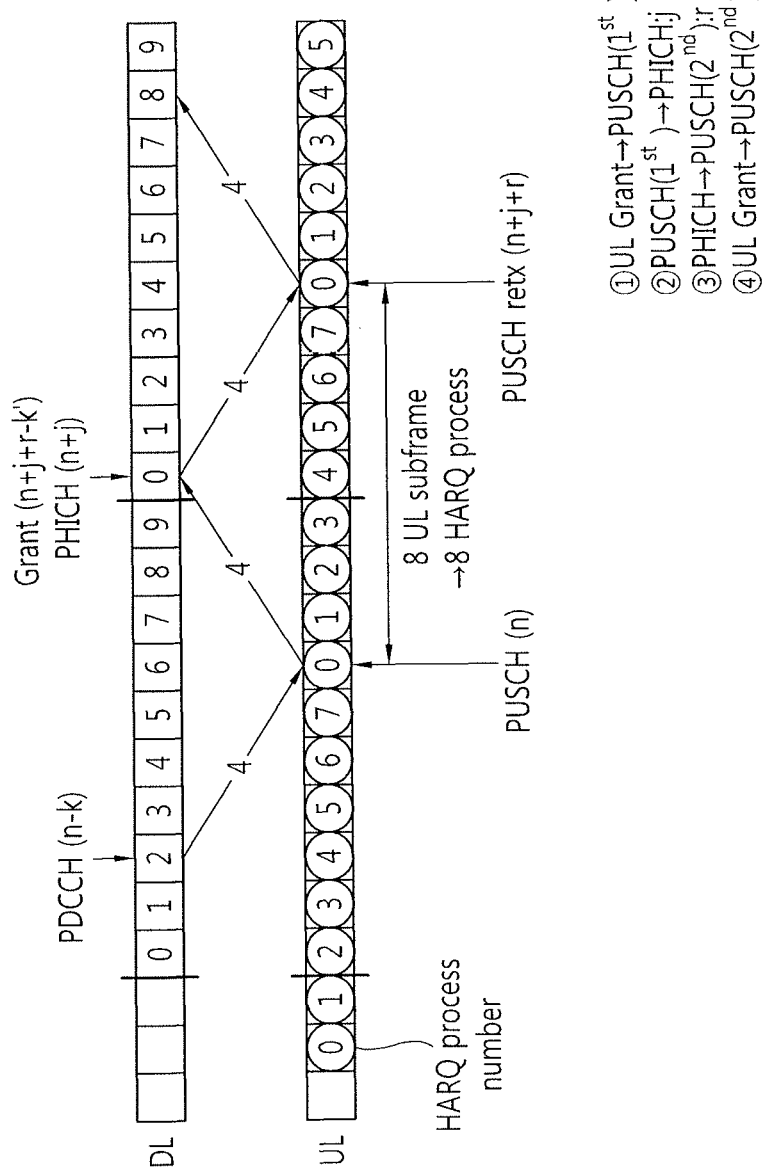
FIG. 8 illustrates synchronous HARQ timing of the prior art for the case where only one FDD cell is employed.

FIG. 8 is one example illustrating synchronous HARQ timing. More specifically, FIG. 8 illustrates synchronous HARQ timing of the prior art for the case where only one FDD cell is employed.

FIG. 8 shows a downlink subframe n−k to which a UL grant is transmitted by the base station through the PDCCH, a uplink subframe n to which the PUSCH scheduled by the UL grant is transmitted by the UE, a downlink subframe n+j to which the ACK/NACK which is a response to the PUSCH is transmitted by the base station (through the PHICH), and a uplink subframe n+j+r to which the PUSCH is retransmitted by the UE in case the ACK/NACK is NACK. Meanwhile, although the UE can retransmit the PUSCH based on the ACK/NACK received through the PHICH, the UE may retransmit the PUSCH at the subframe n+j+r based on the UL grant received at the subframe n+j+r−k'.

In an FDD frame, DL subframes and UL subframes are disposed in a contiguous manner and always exist with a 1-to-1 relationship. Therefore, in the synchronous HARQ timing, $k=j=r=k'=k_m=4$. The number of HARQ processes can be determined by the number of UL subframes included in the interval between transmission of the PUSCH scheduled and retransmission of the PUSCH, and a total of 8 independent HARQ processes can be operated.

Meanwhile, for the case of a TDD frame, the number of DL subframes in a TDD frame is not always equal to the number of UL subframs in the same TDD frame. Therefore, the k, j, r, and k' values based on the condition that $k_m=4$ can be varied according to UL-DL configuration.

Figure 9:
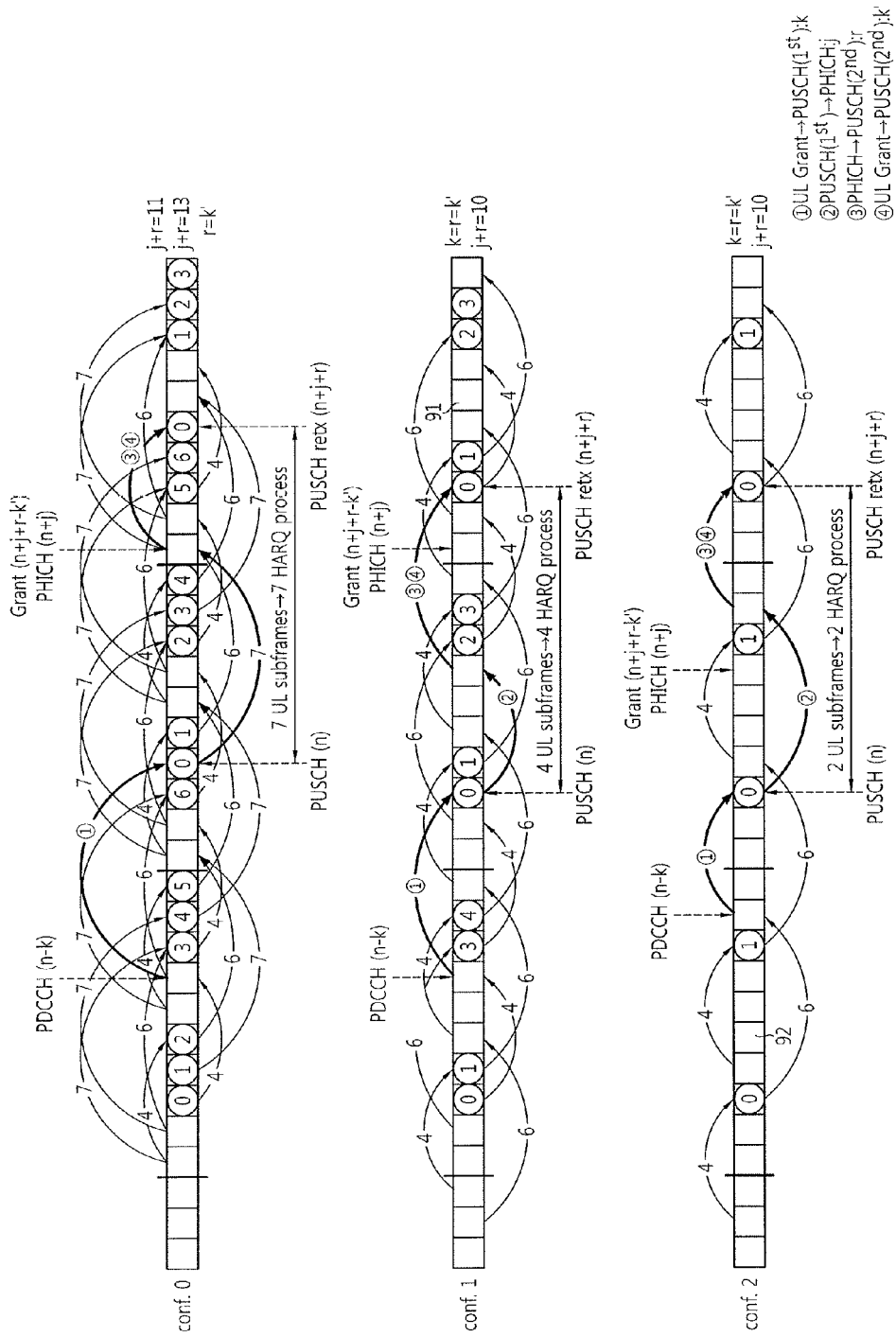
FIG. 9 and FIG. 10 illustrate conventional synchronous HARQ timing for each of UL-DL configuration in one TDD cell.
Figure 10:
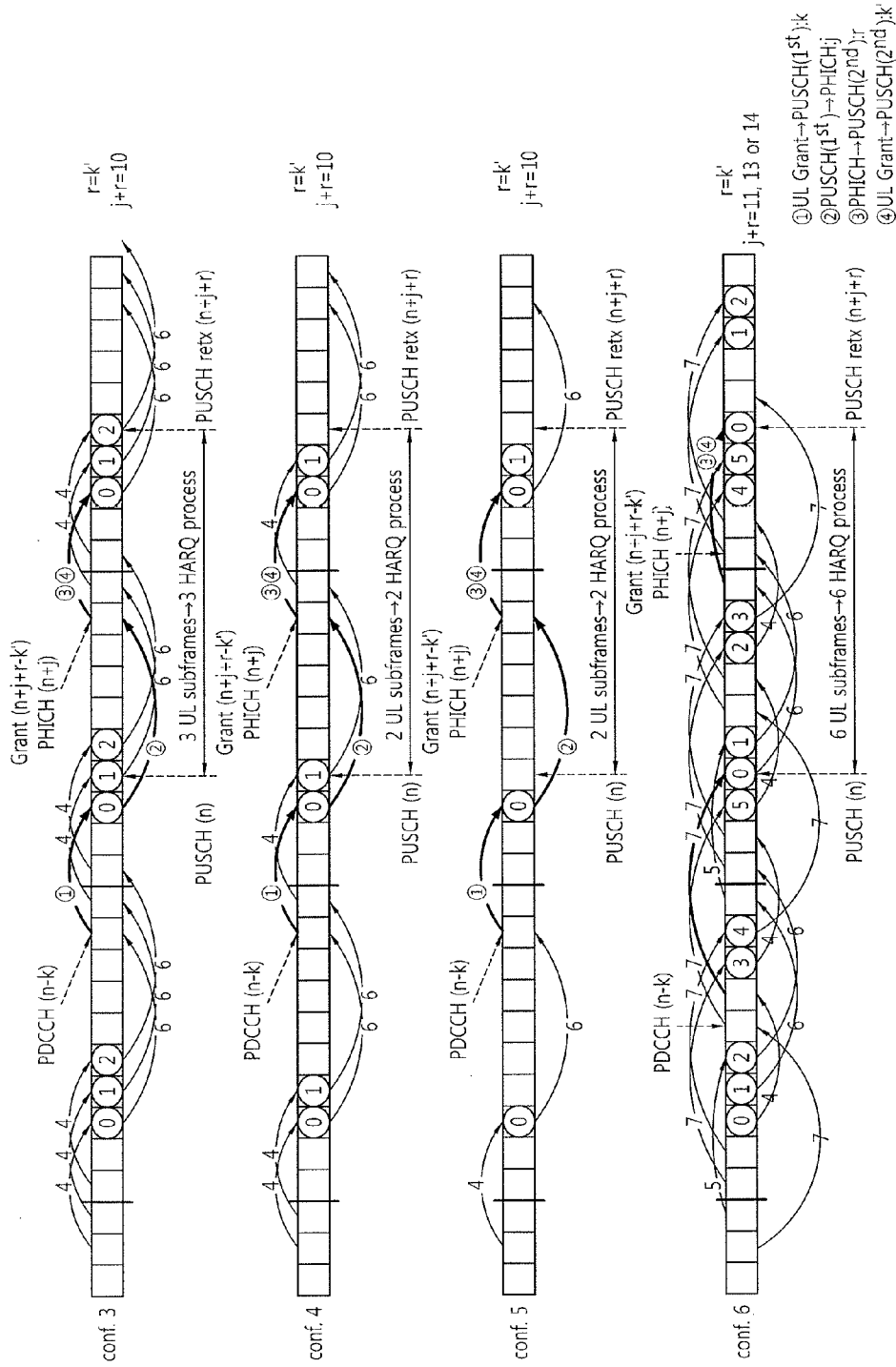

FIGS. 9 to 10 are examples illustrating conventional synchronous HARQ timing for each UL-DL configuration in one TDD cell. In other words, FIGS. 9 and 10 illustrate conventional synchronous HARQ timing according to UL-DL configuration when only one TDD cell is used.

FIG. 9 illustrates conventional synchronous HARQ timing for each of UL-DL configuration 0 to 2. Given that the subframe to which the UE transmits the PUSCH is subframe n, the figure shows subframe n−k receiving the PDCCH including a UL grant scheduling the PUSCH, subframe n+j receiving ACK/NACK with respect to the PUSCH through the PHICH, subframe n+j+r−k' receiving a UL grant for retransmission of the PUSCH, and subframe n+j+r to which the PUSCH is retransmitted.

FIG. 10 shows subframe n, subframe n−k, subframe n+j, subframe n+j+r−k', and subframe n+j+r for each of UL-DL configuration 3 to 6.

In FIGS. 9 and 10, those subframes denoted by numbers are uplink subframes, and the PUSCH can be transmitted to each of the uplink subframes. Those subframes not containing numbers are downlink subframes or special subframes. Also, in a downlink subframe connected to a uplink subframe by an arrow, the PDCCH including a UL grant or the PHICH including an ACK/NACK is transmitted by the base station. Among DL subframes included in a TDD frame, a downlink subframe not connected to a uplink subframe with an arrow is a downlink subframe that does not have the PHICH. For example, in FIG. 9, downlink subframes 91, 92 are examples of a downlink subframe that does not have the PHICH.

Meanwhile, in carrier aggregation, if aggregated TDD carriers use the same UL-DL configuration or use NCCS, the existing synchronous HARQ timing for a single component carrier as shown in FIGS. 9 and 10 can be applied equally to each individual carrier.

However, if aggregated carriers use frame structures different from each other, there are times when the synchronous HARQ timing of the existing single component carrier cannot be applied in the same way. For example, suppose the primary cell is a TDD cell, the secondary cell is an FDD cell, and CCS is applied. In this case, the DL subframe to which a UL grant is transmitted can belong to the primary cell, and the UL subframe to which the PUSCH scheduled by the UL grant can belong to the secondary cell. Assume that synchronous HARQ timing with respect to a single component carrier is applied to the temporal relationship between the DL subframe of the primary cell and the UL subframe of the secondary cell. At this time, if synchronous HARQ timing with respect to a single component carrier is used, the DL subframe to which a UL grant scheduling a UL subframe of the secondary cell may not belong to the primary cell. This is so because the DL subframes are not disposed contiguously since the primary cell is a TDD cell. Therefore, it is necessary to determine synchronous HARQ timing which takes into account aggregation of component carriers which use frame structures different from each other.

In the following drawings, those cells transmitting scheduling information are called scheduling cells, and those cells scheduled by the scheduling information are called scheduled cells. The arrow going to a scheduled cell from a scheduling cell represents GU (an interval between transmission of a UL grant and initial transmission of the PUSCH) timing or HU (an interval between transmission of the PHICH and retransmission of the PUSCH) timing, while the arrow going to a scheduling cell from a scheduled cell represents UH (an interval between initial transmission of the PUSCH and transmission of the PHICH) timing or UG (an interval between transmission of the PUSCH and transmission of the next UL grant) timing.

Also, in the case of CCS, the primary cell is assumed to be a scheduling cell, and the secondary cell is assumed to be a scheduled cell. But the present invention is not limited to the assumption.

Meanwhile, as described above, a TDD frame may have a subframe that includes the PHICH within the PDCCH region and a subframe that does not. In the drawings below, a subframe at which an arrow representing UH arrives is a subframe to which the PHICH belongs.

In what follows, it is assumed that carriers (cells) employing different frame structures from each other are aggregated. It is further assumed that CCS is applied. In other words, scheduling information (UL grant) is transmitted by the base station through a downlink subframe of the primary cell. The PUSCH scheduled by the scheduling information is transmitted by the UE through a uplink subframe of the secondary cell. ACK/NACK with respect to the PUSCH is transmitted through the PHICH of a downlink subframe of the primary cell. In what follows, under the assumption above, descriptions are given without specifying a transmitting subject. Also, descriptions can be given without specifying to which cell a subframe belongs. For example, that scheduling information is transmitted at subframe n−k indicates that scheduling information is transmitted at the downlink subframe n−k of the primary cell by the base station. That the PUSCH is transmitted at subframe n indicates that the PUSCH is transmitted at uplink subframe n of the secondary cell by the UE.

<First Embodiment>

In the case of a subframe in which the PHICH exists, the UE receives the PHICH at the corresponding subframe. In the case of a subframe that does not have the PHICH, the UE receives an Enhanced-PHICH (E-PHICH) in case the E-PH- ICH has been configured. In case the E-PHICH has not been configured, operations without involving the PHICH are carried out. The E-PHICH is a channel configured in addition to the existing PHICH, and the operation without involving the PHICH indicates the operation which allows only retransmission of the PUSCH due to a UL grant without allowing retransmission of the PUSCH based on the ACK/NACK received through the PHICH. In the operation without involving the PHICH, it can be assumed that the UE has received ACK through the PHICH.

<Second Embodiment>

Figure 11:
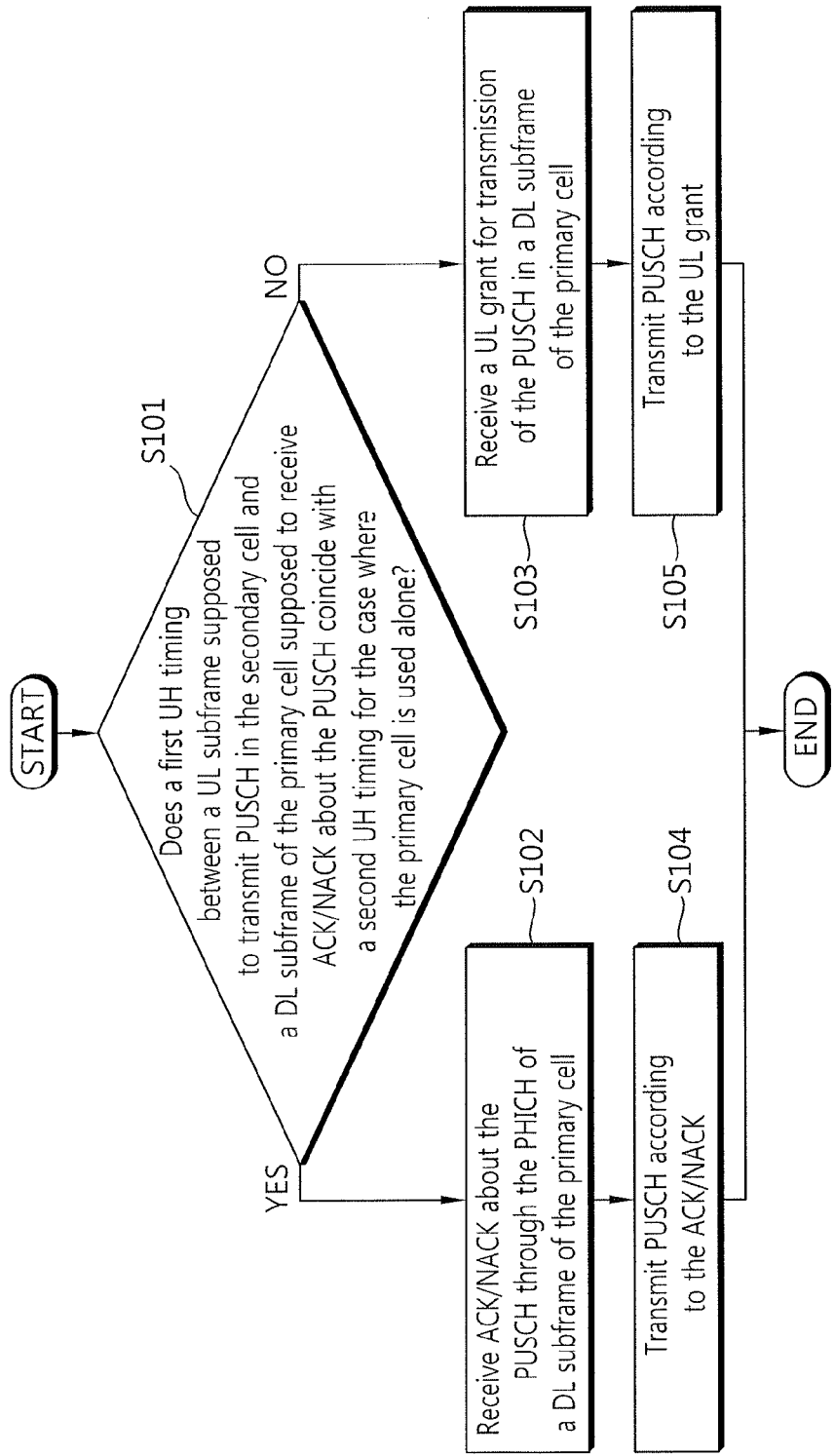
FIG. 11 illustrates a method for performing HARQ according to one embodiment of the present invention.

FIG. 11 illustrates a method for performing HARQ according to one embodiment of the present invention.

With reference to FIG. 11, the UE determines whether first UH timing between a UL subframe supposed to transmit the PUSCH in the secondary cell and a DL subframe of the primary cell supposed to receive ACK/NACK about the PUSCH through the PHICH coincides with second UH timing of the case where the primary cell is used alone S101. The second UH timing represents a temporal relationship between DL subframes of the primary cell supposed to receive ACK/NACK when the UE transmits the PUSCH from a UL subframe of the primary cell which coincides with the UL subframe of the secondary cell.

If the first UH timing coincides with the second UH timing, the ACK/NACK for the PUSCH is received through a PHICH of the DL subframe of the primary cell S102. And PUSCH is transmitted according to ACK/NACK S104.

If the first UH timing does not coincide with the second UH timing, the UE receives a UL grant for transmission of the PUSCH from the DL subframe of the primary cell S103. In other words, in this case, the UE performs operations without involving the PHICH. The UE transmits the PUSCH according to the UL grant S105.

In other words, the UE determines whether the timing between the PUSCH transmitted from a UL subframe of the secondary cell and a DL subframe of the primary cell supposed to receive ACK/NACK with respect to the PUSCH coincides with the HARQ timing for the case where only a single component carrier is used. If it is found that the two timings coincide with each other, the UE receives the PHICH from the DL subframe of the primary cell; otherwise, the UE performs PHICH-less operations.

The method described with reference to FIG. 11 can be applied to such a subframe including the PHICH in a situation of carrier aggregation when the DL subframe of the primary cell uses HARQ timing of a single component carrier. If the DL subframe of the primary cell does not include the PHICH, the UE performs PHICH-less operations.

Suppose a scheduled cell uses synchronous HARQ timing of a scheduling cell. In this case, PUSCH transmission which coincides with the synchronous HARQ timing according to the existing UL-DL configuration can be carried out as usual. On the other hand, the PUSCH transmission that does not coincides with the synchronous HARQ timing according to the existing UL-DL configuration carries out the PHICH-less operations. It can be said that the PUSCH transmission that does not coincides with the synchronous HARQ timing according to the existing UL-DL configuration relies on additional synchronous HARQ timing.

In case a scheduling cell corresponds to UL-DL configuration 1 to 6, the additional synchronous HARQ timing can map PHICH resources to the resources where $I_{PHICH} \neq 0$, for example, to the resources where $I_{PHICH}=1$. $I_{PHICH}$ is an index indicating the resources constituting the PHICH, and in the UL-DL configuration 1 to 6, resources indexed with $I_{PHICH}=0$ have been used. For those subframes that do not have PHICH resources other than those resources with $I_{PHICH} \neq 0$, the UE cannot transmit the PHICH and performs PHICH-less operations.

In case a scheduling cell corresponds to UL-DL configuration 0, the additional synchronous HARQ timing can be used to map the resources with $I_{PHICH} \neq 0$, 1 to the resources with $I_{PHICH}=2$.

<Third Embodiment>

In a carrier aggregation system, if any of scheduled cells (secondary cells) is involved in PUSCH transmission which does not coincide with the existing synchronous HARQ timing based on the UL-DL configuration intended for the case where only one cell is used, all of the PUSCH transmission of the scheduled cells can be made to perform PHICH-less operations.

<Fourth Embodiment>

In case a scheduling cell is a TDD cell and a scheduled cell is an FDD cell, the PUSCH of all the UL subframes of cells scheduled by CCS can be transmitted by the PHICH-less operations.

<Method for Performing HARQ in Case the Primary Cell is an FDD Cell and the Secondary Cell is a TDD Cell>

In what follows, the primary cell is an FDD cell (FDD primary cell), and the secondary cell is a TDD cell (TDD secondary cell) or a cell consisting only of UL subframes. In this way, in case an FDD cell and a TDD cell are aggregated, a control channel and data can be transmitted within the FDD cell. Therefore, the synchronous HARQ timing applied to the case consisting only of existing FDD cells can be applied in the same manner.

On the other hand, since a TDD cell is scheduled through a control channel transmitted through an FDD cell when CCS is applied, a timing different from the existing synchronous HARQ timing can be generated. If GU, HU, and UH for the FDD cell is applied to the TDD cell in the same manner, the period of the timing becomes 8 ms; since there are times when the TDD cell is unable to accommodate the 8 ms period, at least one of the HU and UH applied to the TDD cell can be changed.

Figure 12:
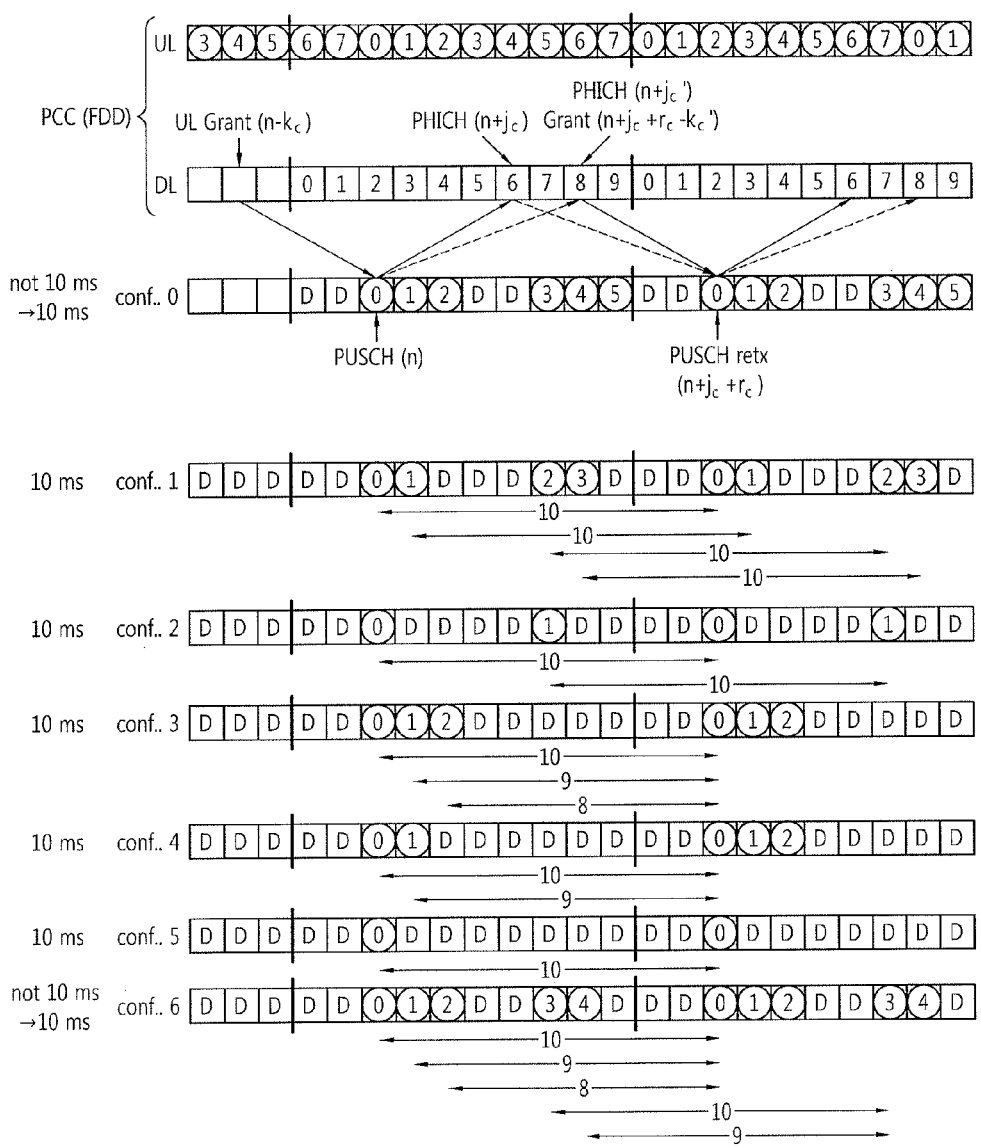
FIG. 12 illustrates examples illustrating HU and UH in case an FDD cell and a TDD cell are aggregated.
Figure 13:
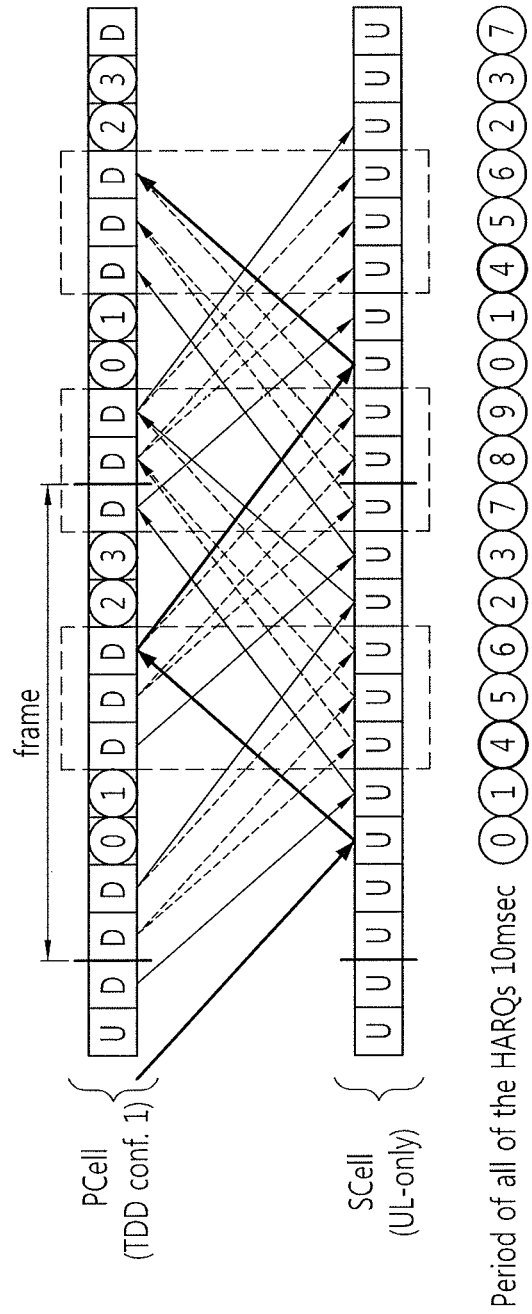
FIGS. 13-18 illustrate examples illustrating HARQ timing for each of UL-DL configurations 1-5 in table 7, 8, and 10.
Figure 14:
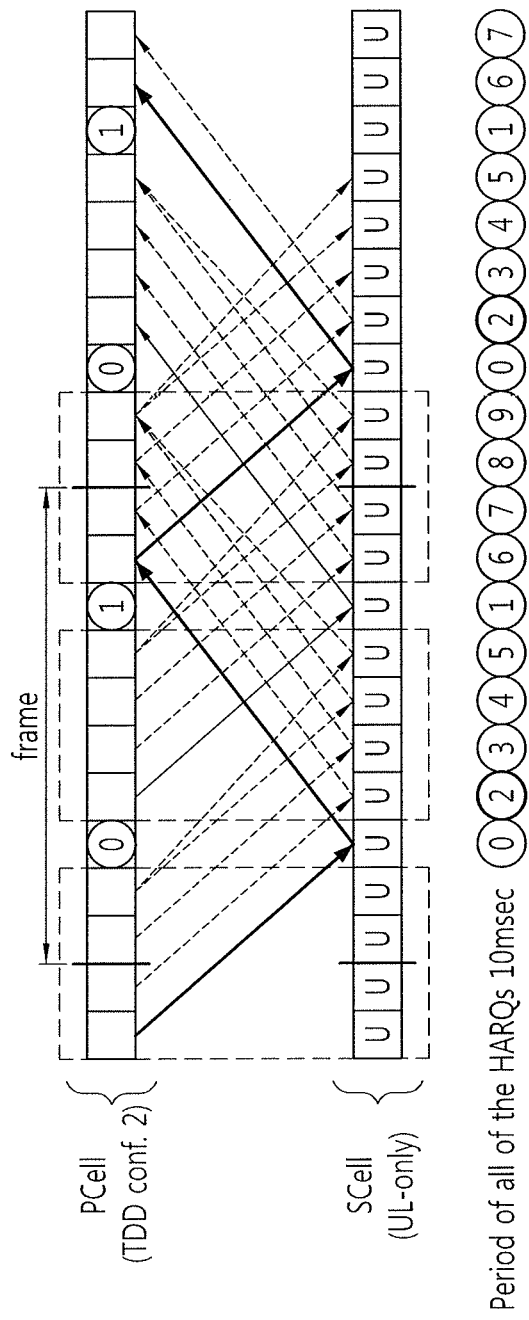
Figure 15:
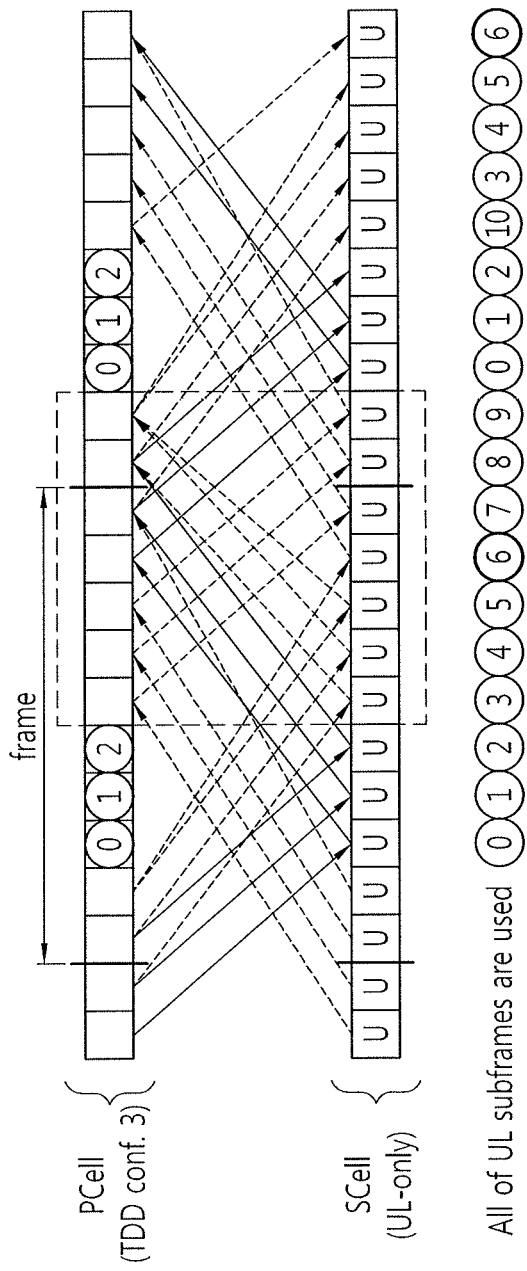
Figure 16:
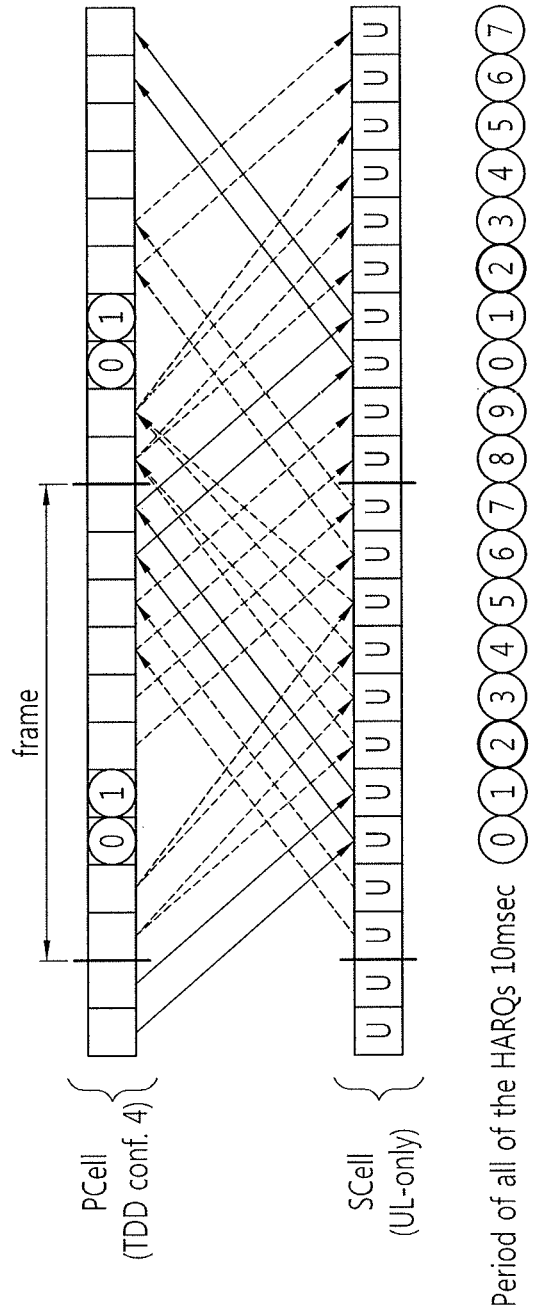
Figure 17:
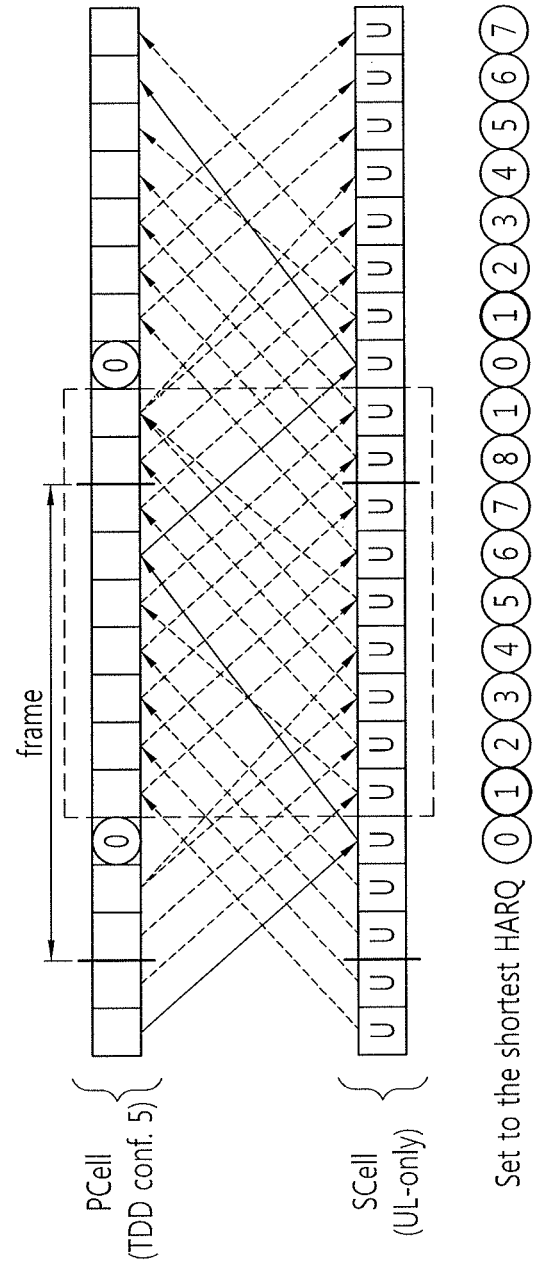
Figure 18:
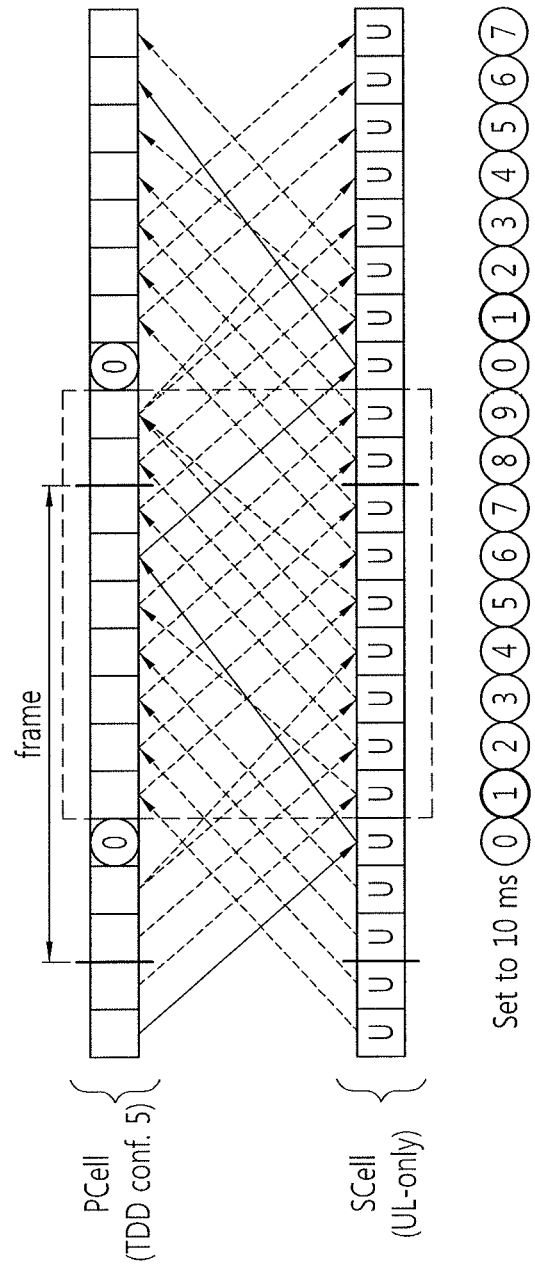

FIG. 12 illustrates examples illustrating HU and UH in case an FDD cell and a TDD cell are aggregated.

HU or UH can be changed to 6 ms other than the minimum period of 4 ms. In case HU is changed to 6 ms, GU can also be changed to 6 ms.

In case the UL-DL configuration of the secondary cell is 0, 6, if HU or UH is changed as described above, the synchronous HARQ period can be 10 ms. Therefore, the number of synchronous HARQ process can be changed when compared with the case where the secondary cell is used alone. In case UL-DL configuration of the secondary cell is 1-5, 10 ms period employed for the existing TDD cells can be applied in the same manner to the synchronous HARQ period.

UL-DL configuration is applied to a TDD cell through system information, where the UL-DL configuration applied through the system information can be called cell-specific UL-DL configuration. In case a TDD cell is used alone, HARQ timing can be determined according to cell-specific UL-DL configuration. In case a TDD cell is aggregated as a secondary cell with a cell of a different scheme and the cell-specific UL-DL configuration of the TDD cell corresponds to one of the UL-DL configuration 1-5, HARQ timing according to the cell-specific UL-DL configuration can be applied independently of CCS. On the other hand, in case the cell-specific UL-DL configuration is 0 or 6, UH+HU can be changed to 4 ms+6 ms or 6 ms+4 ms.

Meanwhile, in case a TDD cell is aggregated as a secondary cell with a cell of a different scheme and the cell-specific UL-DL configuration is 0 or 6, HARQ timing can be determined by another UL-DL configuration. In other words, if a TDD cell is used alone, HARQ timing is determined according to cell-specific UL-DL configuration (UL-DL configuration 0 or 6), but if the TDD cell is used as a secondary cell and is aggregated to the primary cell of a different scheme, HARQ timing can be determined by another UL-DL configuration other than the cell-specific UL-DL configuration. For example, even if the cell-specific UL-DL configuration of the secondary cell corresponds to UL-DL configuration 0 or 6, HARQ timing can be determined by UL-DL configuration 1. The reason why the UL-DL configuration 1 is chosen is that the UL subframes of the UL-DL configuration 1 overlap most with the UL subframes of UL-DL configuration 0 or 6.

In other words, if the primary cell which is an FDD cell and the secondary cell which is a TDD cell are aggregated together and CCS is applied, cell-specific UL-DL configuration of the secondary cell and UL-DL configuration which determines HARQ timing of the secondary cell can be set up differently from each other.

In a different method, by taking into account that adoption/application of the HARQ timing according to the cell-specific UL-DL configuration given by system information and HARQ timing according to different UL-DL configuration increases complexity, CCS and NCCS may be all allowed only when the cell-specific UL-DL configuration corresponds to UL-DL configuration 1-5, and only the NCCS may be allowed for UL-DL configuration 0 or 6.

Or in case an FDD cell and a TDD cell are aggregated together, cell-specific UL-DL configuration of the TDD cell may allow only UL-DL configuration 1-5, but UL-DL configuration 0 and 6 may not be allowed.

<Method for Performing HARQ in Case the Primary Cell is a TDD Cell and the Secondary Cell is an FDD Cell>

The primary cell is a TDD cell, and the secondary cell is an FDD cell or a cell consisting only of UL subframes. In this case, HARQ timing of a TDD cell is determined according to cell-specific UL-DL configuration. In what follows, methods applied to an FDD cell or a cell consisting only of UL subframes are not limited only to either one, but can be applied to both of the FDD cell and the cell consisting oly of UL subframes.

The DL subframe in a TDD cell may not be contiguous. Therefore, at the time of CCS, scheduling of the secondary cell may be restricted. Also, it should be considered that a TDD cell may include a subframe in which the PHICH does not exist.

The HARQ timing of the secondary cell follows the HARQ timing of the primary cell in the case of CCS; in the case of NCCS, the HARQ timing of the secondary cell can follow the HARQ timing of the secondary cell itself.

Meanwhile, suppose an interval between transmission of the PDSCH and transmission of the PUCCH is DC. The existing PUCCH is limited to the condition that it is always transmitted to the primary cell; if this condition is retained, it is preferable to apply DC timing within the primary cell to the secondary cell. When DC timing of the primary cell is applied to the secondary cell, HARQ timing of the secondary cell can also follow the HARQ timing of the primary cell.

In case HARQ timing of a TDD cell is applied to an FDD cell which is the secondary cell, there are chances that among UL subframes of the secondary cell due to the HARQ timing of the TDD cell, those UL subframes of the secondary cell not corresponding to the HARQ timing when the FDD cell is used alone may not be used. In that case, the number of UL HARQ processes in the secondary cell can be the same as the number of UL HARQ processes of the primary cell.

The table below shows k values about subframe n when a UL grant is transmitted from subframe n and the PUSCH scheduled by the UL grant is transmitted from subframe n+k. In Table 2 below, TDD UL-DL configuration is reference UL-DL configuration applied to a scheduled cell (secondary cell).

TABLE 2

| UL-DL Configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | 5 | 5 | | | | 5 | 5 | | | |
| 1 | 5 | 5 | | | 5 | 5 | 5 | | | 5 |
| 2 | 5 | 5 | | 5 | 5 | 5 | 5 | | 5 | 5 |
| 3 | 7 | 7 | | | | 4 | 4 | 4 | 7 | 7 |
| 4 | 6 | 6 | | | 4 | 4 | 4 | 4 | 6 | 6 |
| 5 | 5 | 5 | | 4 | 4 | 4 | 4 | 4 | 5 | 5 |
| 6 | 6 | 8 | | | | 5 | 5 | | | 6 |

The table below shows k values about subframe i when the PHICH or a UL grant related to retransmission is transmitted from subframe i and the PUSCH related thereto is transmitted from subframe (i−k).

TABLE 3

| UL-DL Configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 5 | 5 | | | | 5 | 5 | | | |
| 1 | 5 | 5 | | | 5 | 5 | 5 | | | 5 |
| 2 | 5 | 5 | | 5 | 5 | 5 | 5 | | 5 | 5 |
| 3 | 4 | 4 | | | | 7 | 7 | 7 | 7 | 4 |
| 4 | 4 | 4 | | | 6 | 6 | 6 | 6 | 4 | 4 |
| 5 | 4 | 4 | | 5 | 5 | 5 | 5 | 4 | 4 | 4 |
| 6 | 5 | 5 | | | | 6 | 6 | | | 8 |

The values of Table 3 can be used only for the timing between the PUSCH and a UL grant corresponding thereto. The PUSCH and PHICH transmission timing corresponding thereto can be defined separately.

Table 4 is another timing example that can be applied to UL-DL configuration 5 and shows k values about subframe i when the PUSCH is transmitted from subframe (i−k) and PHICH related to the aforementioned transmission is transmitted from subframe i.

TABLE 4

| UL-DL Configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 5 | 5 | 5 | | | 6 | 6 | 6 | 6 | 5 | 5 |

Table 5 shows the number of UL HARQ processes of the secondary cell by combining Table 2 and 3.

TABLE 5

| UL-DL Configuration | Subframe n | | | | | | | | | | # of UL HARQ process | | |
|---|---|---|---|---|---|---|---|---|---|---|---|---|---|
| | 0 | 1 | 2 | 3 | 4 | 5 | 6 | 7 | 8 | 9 | Existing (Pcell) | Added | Total |
| 0 | 5 + 5 | 5 + 5 | | | | 5 + 5 | 5 + 5 | | | | 7 | 4 | 11 |
| 1 | 5 + 5 | 5 + 5 | | | 5 + 5 | 5 + 5 | 5 + 5 | | | 5 + 5 | 4 | 6 | 10 |
| 2 | 5 + 5 | 5 + 5 | 5 + 5 | 5 + 5 | 5 + 5 | 5 + 5 | | | 5 + 5 | 5 + 5 | 2 | 8 | 10 |
| 3 | 4 + 7 | 4 + 7 | | | | 7 + 4 | 7 + 7 | 7 + 4 | 7 + 7 | 4 + 7 | 3 | 8 | 11 |
| 4 | 4 + 6 | 4 + 6 | | | 6 + 4 | 6 + 4 | 6 + 4 | 6 + 4 | 4 + 6 | 4 + 6 | 2 | 8 | 10 |
| 5 | 4 + 5 | 4 + 5 | 5 + 4 | 5 + 4 | 5 + 4 | 5 + 4 | 4 + 4 | 4 + 5 | 4 + 5 | | 1 | 8 | 9 |
| 6 | 5 + 6 | 5 + 8 | | | | 6 + 5 | 6 + 5 | | | 8 + 6 | 6 | 6 | 12 |

Table 6 shows the number of UL HARQ processes by combining Table 2 and 4.

TABLE 6

| UL-DL configuration | Subframe n | | | | | | | | | | # of UL HARQ process | | |
|---|---|---|---|---|---|---|---|---|---|---|---|---|---|
| | 0 | 1 | 2 | 3 | 4 | 5 | 6 | 7 | 8 | 9 | Existing (Pcell) | Added | Total |
| 5 | 5 + 5 | 5 + 5 | | 6 + 4 | 6 + 4 | 6 + 4 | 6 + 4 | 6 + 4 | 6 + 5 | 6 + 5 | 1 | 9 | 10 |

Table 7 shows k values about subframe n when a UL grant is transmitted from subframe n and the PUSCH scheduled by the UL grant is transmitted from subframe n+k.

TABLE 7

| UL-DL Configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | 5 | 5 | | | | 5 | 5 | | | |
| 1 | 4, 5 | 5 | | | 4, 5 | 5 | | | | |
| 2 | 4 | 4, 5 | | 4 | 4 | 4, 5 | | | | 4 |
| 3 | 6 | 6, 7 | | | 4 | 4 | 4 | | | 6 |
| 4 | 4, 5 | 5, 6 | | 4 | 4 | 4 | 4 | | | |
| 5 | 4 | 4, 5 | 4 | 4 | 4 | 4 | 4 | | | 4 |
| 6 | 6 | 8 | | | | 5 | 5 | | | 6 |

Table 8 is another example showing k values about subframe i when the PUSCH is transmitted from subframe (i−k) and the PHICH related to the aforementioned transmission is transmitted from subframe i.

TABLE 8

| UL-DL Configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 5 | 5 | | | | 5 | 5 | | | |
| 1 | 6, 5 | 5 | | | | 6, 5 | 5 | | | |
| 2 | 6 | 6, 5 | | | 6 | 6 | 6, 5 | | | 6 |

TABLE 8-continued

| UL-DL Configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 3 | 5 | 5, 4 | | | | | 7 | 7 | 7 | 8 |
| 4 | 6, 5 | 5, 4 | | | | 6 | 6 | 6 | 6 | |
| 5 | 5 | 5, 4 | | 5 | 5 | 5 | 5 | 4 | | 5 |
| 6 | 6 | 8 | | | | 5 | 5 | | | 6 |

Table 9 is a yet another example showing k values about subframe i when the PUSCH is transmitted from subframe (i−k) and the PHICH related to the aforementioned transmission is transmitted from subframe i.

TABLE 9

| UL-DL Configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 5 | 6 | 6, 5 | | | 6 | 6 | 6 | 6 | | 6 |

For those cells of Table 7 and 8 containing two values for one subframe, the first value of Table 7 is paired with the first value of Table 8, and the second value of Table 7 is paired with the second value of Table 8.

In this case, the number of UL HARQ processes of the secondary cell can be determined as shown in Table 10 or Table 11.

TABLE 10

| UL-DL Configuration | Subframe n | | | | | | | | | | # of UL HARQ process | | |
|---|---|---|---|---|---|---|---|---|---|---|---|---|---|
| | 0 | 1 | 2 | 3 | 4 | 5 | 6 | 7 | 8 | 9 | Existing (Pcell) | Added | Total |
| 0 | | 5 + 5 | 5 + 5 | | | | 5 + 5 | 5 + 5 | | | 7 | 4 | 11 |
| 1 | | 6 + 4 5 + 5 | 5 + 5 | | | | 6 + 4 5 + 5 | 5 + 5 | | | 4 | 6 | 10 |

TABLE 10-continued

| UL-DL Configuration | Subframe n | | | | | | | | | | # of UL HARQ process | | |
|---|---|---|---|---|---|---|---|---|---|---|---|---|---|
| | 0 | 1 | 2 | 3 | 4 | 5 | 6 | 7 | 8 | 9 | Existing (Pcell) | Added | Total |
| 2 | 6 + 4 | 6 + 4<br>5 + 5 | | | 6 + 4 | 6 + 4 | 6 + 4<br>5 + 5 | | | 6 + 4 | 2 | 8 | 10 |
| 3 | 5 + 6 | 5 + 6<br>4 + 7 | | | | 7 + 4 | 7 + 4 | 7 + 4 | | 8 + 6 | 3 | 8 | 11 |
| 4 | 6 + 4<br>5 + 5 | 5 + 5<br>4 + 6 | | | 6 + 4 | 6 + 4 | 6 + 4 | 6 + 4 | | | 2 | 8 | 10 |
| 5 | 5 + 4 | 5 + 4<br>4 + 5 | 5 + 4 | 5 + 4 | 5 + 4 | 5 + 4 | 4 + 4 | | | 5 + 4 | 1 | 8 | 9 |
| 6 | 5 + 6 | 5 + 8 | | | | 6 + 5 | 6 + 5 | | | 8 + 6 | 6 | 6 | 12 |

TABLE 11

| UL-DL configuration | Subframe n | | | | | | | | | | # of UL HARQ process | | |
|---|---|---|---|---|---|---|---|---|---|---|---|---|---|
| | 0 | 1 | 2 | 3 | 4 | 5 | 6 | 7 | 8 | 9 | Existing (Pcell) | Added | Total |
| 5 | 6 + 4 | 6 + 4<br>5 + 5 | | 6 + 4 | 6 + 4 | 6 + 4 | 6 + 4 | 6 + 4 | | | 1 | 9 | 10 |

In Table 2 and 7, the numbers of DL subframes corresponding to the respective UL subframes are equalized as evenly as possible so that the number of UL grants transmitted from each DL subframe is not heavily dependent on a specific DL subframe but distributed across the DL subframes as evenly as possible. Also, chosen is the fastest UL subframe satisfying the minimum required time period $k_m=4$ for transmitting the PUSCH after the UL grant is received. Through this scheme, an effect of dispersing a load is obtained by equalizing the number of PUSCHs transmitted from one UL subframe. If UL grant-PUSCH timing with the shortest interval is configured by taking into account only the minimum required time period but not considering equalized distribution, the PUSCH which has the largest k value is chosen as reference timing and the remaining PUSCHs can be equally distributed. At this time, the UL grant of the preceding PUSCH is disposed so that it is not placed after a UL grant of the PUSCH located after the preceding PUSCH. Also, at the time of equalized distribution, equalized distribution can be carried out by including HARQ timing of the existing UL-DL configuration, or equalized distribution can be carried out only for new HARQ timing. The latter case follows the scheme of Table 2, while the former case follows that of Table 7.

FIGS. 13 to 18 illustrate HARQ timing according to each of the UL-DL configuration 1 to 5 of Tables 7, 8, and 10.

In FIGS. 13 to 18, solid lines represent HARQ timing according to TDD UL-DL configuration when a single cell is used, while dotted lines represent HARQ timing shown in Tables 7, 8, and 9.

In Tables 2 to 11, it can be configured so that only the subframes where the period of a UL HARQ process is 10 ms are UL-scheduled. Similarly, it can be configured so that only the UL-DL configuration 1, 2, 4, and 5 where the periods of the UL HARQ processes all become a maximum of 10 ms may be used for the UL-DL configuration of the TDD primary cell which aggregates FDD secondary cells.

In what follows, it is assumed that a TDD cell is used as the primary cell, the secondary cell consists only of UL subframes, and a carrier aggregation system aggregates the TDD cell and the cell consisting only of UL subframes. Now described will be UL HARQ timing for each UL-DL configuration of a TDD cell that can be applied to a carrier aggregation system and a method for determining the number of UL HARQ processes. In the following drawings, different HARQ process numbers denote different HARQ processes, and the same HARQ process number denotes the same HARQ process. However, it should be noted that the HARQ process number is an arbitrarily chosen number, which is introduced for the sake of understanding of the present invention.

Figure 19:
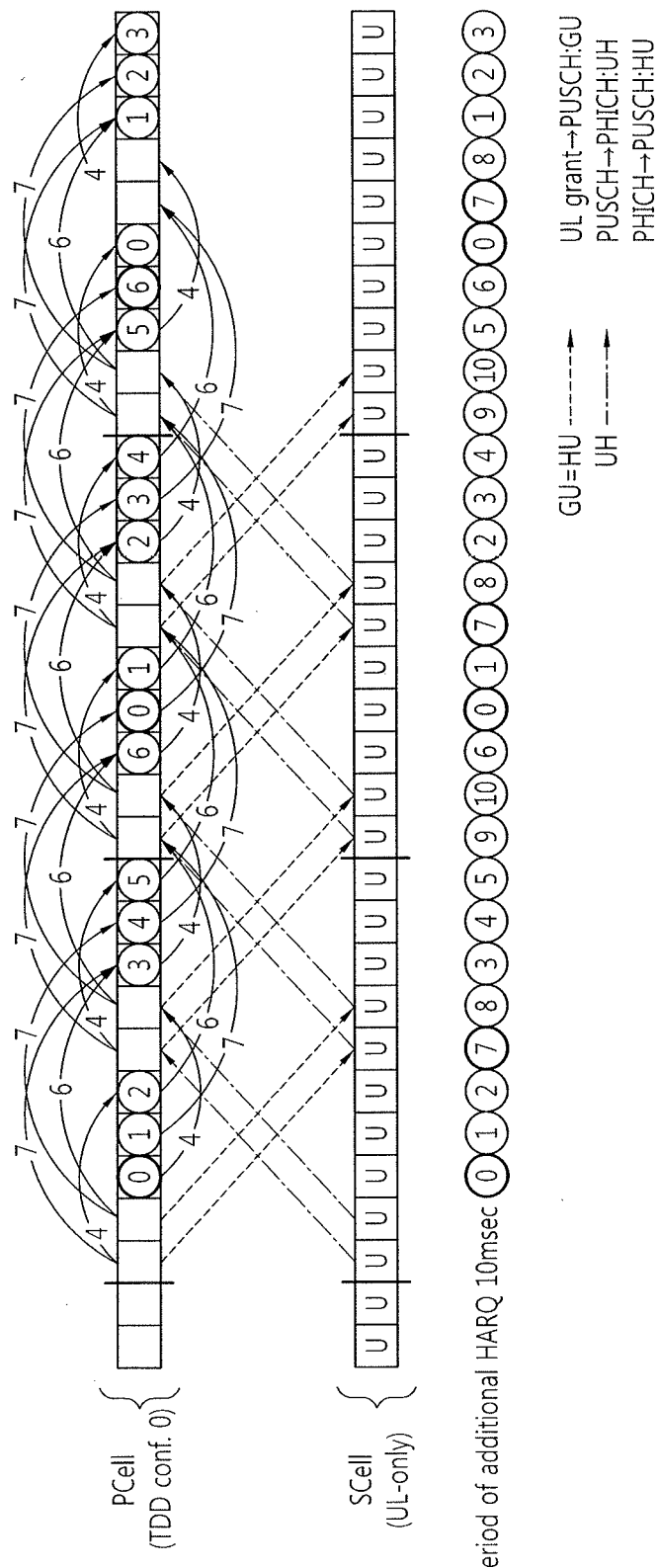
FIG. 19 illustrates UL HARQ timing for the case where a primary cell (TDD cell) using UL-DL configuration 0 and an FDD secondary cell are aggregated.

FIG. 19 illustrates UL HARQ timing for the case where a primary cell (TDD cell) using UL-DL configuration 0 and an FDD secondary cell are aggregated.

With reference to FIG. 19, the primary cell is a TDD cell using UL-DL configuration 0. In a UL subframe of the secondary cell, ACK/NACK about the data that the UE has transmitted is received through the PHICH of a DL subframe of the primary cell. The UL subframes of the secondary cell placed four subframes prior to the DL subframe of the primary cell can all be used.

In case HARQ timing different from the existing HARQ timing is added, the period of a HARQ process due to the additional HARQ timing can be made to be 10 ms.

As shown in FIG. 19, the number of new, additional UL HARQ processes indicated by dotted lines is 4, and the number of the existing UL HARQ processes indicated by solid lines is 7; therefore, a total of 11 UL HARQ processes can be operated.

The ACK/NACK signal about 3 UL subframes can exist in one DL subframe. In this case, the UL index field of a UL grant about the secondary cell can be increased to 3 bits. The additional HARQ timing can be specified by the third bit of the UL index field.

Or the UL grant existing in the HARQ timing according to the UL-DL configuration 0 about the secondary cell keeps the UL index field to 2 bits, while the UL grant not existent in the HARQ timing of UL-DL configuration 0 may not use the UL index field, use only 1 bit, or use 2 bits.

In case a UL grant with respect to additional HARQ timing and the existing UL grant are transmitted by separate coding, if the DCI lengths of the two UL grants are set to be the same to each other, there needs a method for differentiating the two UL grants. For example, to this purpose, the two UL grants can be differentiated by individual search spaces, by adding differentiating indicators, or by a status combination of bit fields.

Or in case a TDD cell is used as the primary cell and a secondary cell consisting only of UL subframes is used, HARQ timing is determined based on the existing HARQ timing, but additional HARQ timing can be configured so that up to two pieces of scheduling information about the PUSCH can be defined for each DL subframe. Since the number of the existing UL HARQ processes is 7 and the number of UL HARQ processes due to new HARQ timing is 0, the total number of UL HARQ processes is 7.

Figure 20:
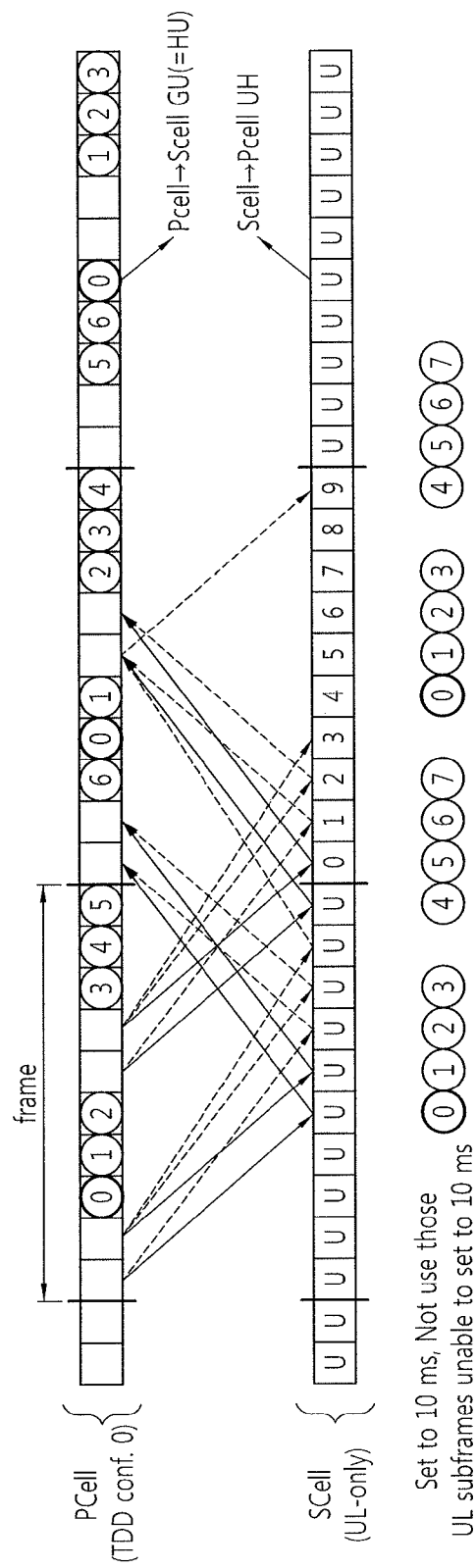
FIG. 20 is an example of HARQ timing that can be applied to the case where a TDD primary cell uses UL-DL configuration 0 and a secondary cell consists only UL subframes.

FIG. 20 is an example of HARQ timing that can be applied to the case where a TDD primary cell uses UL-DL configuration 0 and a secondary cell consists only UL subframes.

Independently from the existing HARQ timing, the UL HARQ period is set to 10 ms but those UL subframes that cannot be set to the period (UH+GU=10 ms) may not be used. In case a scheduling cell (primary cell) uses UL-DL configuration including 3 contiguous UL subframes, there arise UL subframes in the secondary cell which cannot meet the period of 10 ms.

The UL subframe 3, 8 of the secondary cell can be excluded from PUSCH transmission.

UL subframes are based on the HARQ timing where GU=4 ms and UH=6 ms. In case a UL subframe cannot satisfy the condition GU=4 ms and UH=6 ms, the corresponding UL subframe is excluded from the PUSCH transmission. In this case the number of UL HARQ processes becomes 4 which corresponds to the number of DL subframes of the primary cell.

In case a UL subframe cannot be operated with the HARQ timing that GU=4 ms and HU=6 ms, a UL grant of the corresponding UL subframe moves to another UL subframe so that UL subframes are not concentrated on a single DL subframe. In this case, the number of UL HARQ processes becomes two times the number of DL subframes of the primary cell, which is 8.

Figure 21:
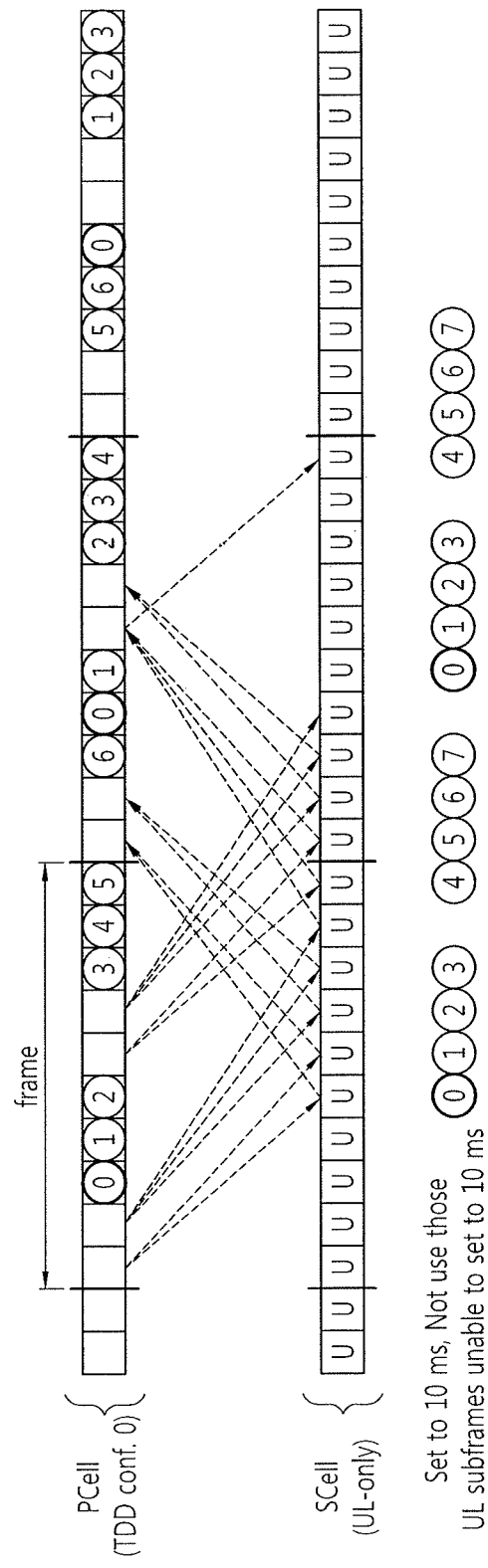
FIG. 21 is another example of HARQ timing that can be applied to the case where a TDD primary cell uses UL-DL configuration 0 and a secondary cell consists only UL subframes.

FIG. 21 is another example of HARQ timing that can be applied to the case where a TDD primary cell uses UL-DL configuration 0 and a secondary cell consists only UL subframes.

HARQ timing can be set up so that GU is more than 4 ms and less than 6 ms, and UH is more than 4 ms and less than 6 ms. Scheduling is configured so that a temporally preceding PUSCH is scheduled prior to a succeeding PUSCH and UL grants are not concentrated on one DL subframe.

Multi-subframe scheduling is needed, and one of HARQ timings where GU is more than 4 ms and less than 6 ms, and UH is more than 4 ms and less than 6 ms is selected. The number of UL HARQ processes becomes two times the number of DL subframes of the primary cell, which is 8 in total.

Figure 22:
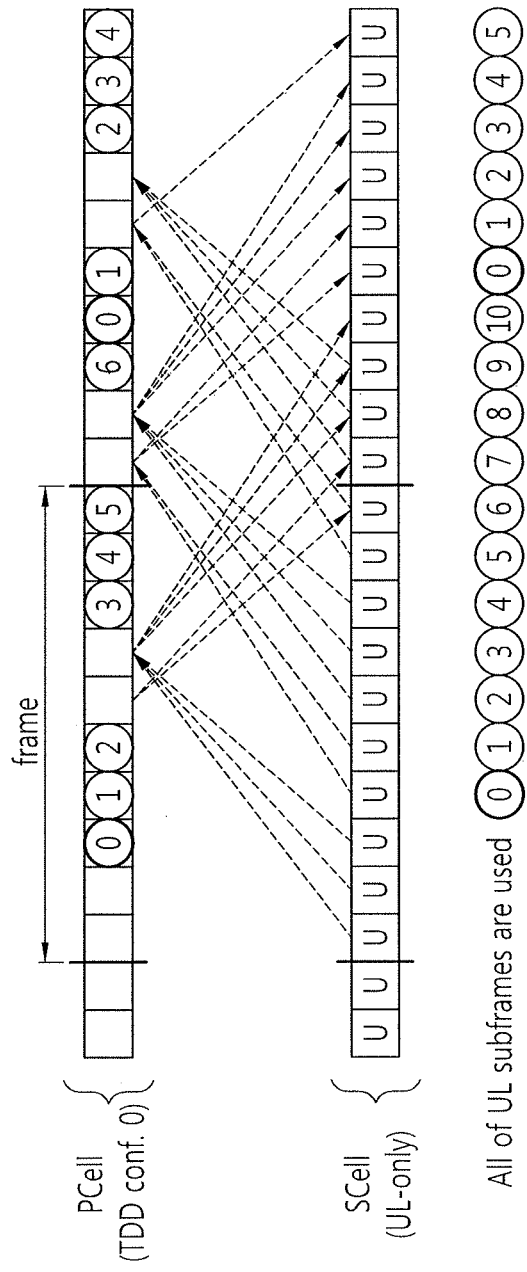
FIG. 22 is a yet another example of HARQ timing that can be applied to the case where a TDD primary cell uses UL-DL configuration 0 and a secondary cell consists only UL subframes.

FIG. 22 is a yet another example of HARQ timing that can be applied to the case where a TDD primary cell uses UL-DL configuration 0 and a secondary cell consists only UL subframes.

With reference to FIG. 22, UL HARQ can be configured by setting up the timing to ensure at least 4 ms of delay time independently of the existing HARQ timing and utilizing all of the UL subframes. Timing of retransmission of the PUSCH is determined based on the UL subframe which has the longest minimum period. The number of UL HARQ processes is 11.

Figure 23:
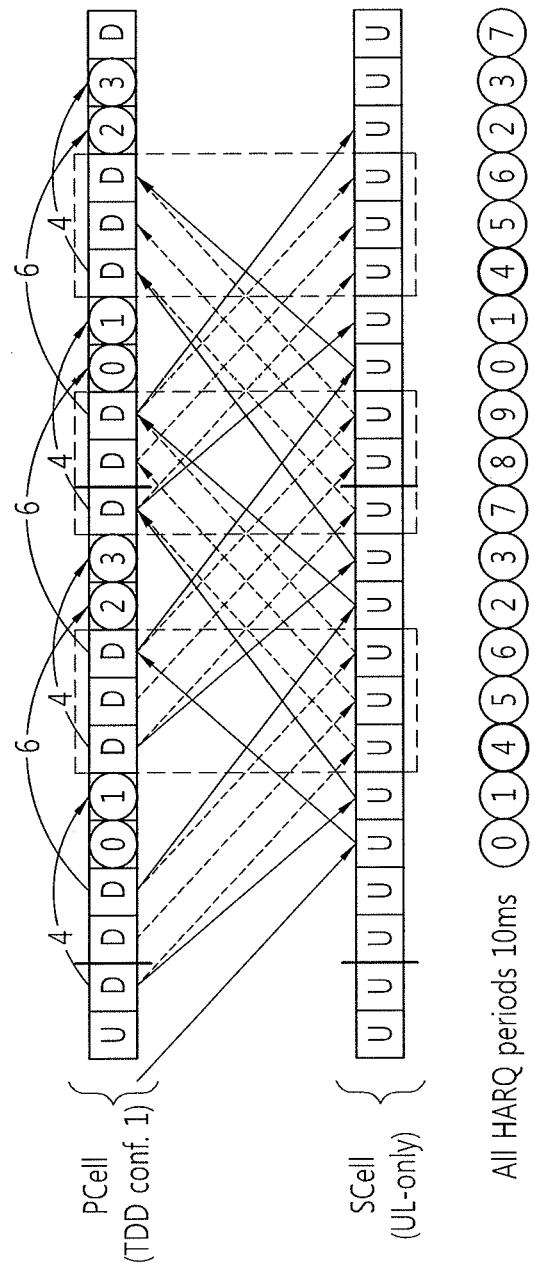
FIG. 23 is an example of HARQ timing in case a TDD primary cell using UL-DL configuration 1 and a secondary cell consisting only of UL subframes are aggregated.

FIG. 23 is an example of HARQ timing in case a TDD primary cell using UL-DL configuration 1 and a secondary cell consisting only of UL subframes are aggregated.

With reference to FIG. 23, all of the UL subframes are utilized based on HARQ timing ensuring the minimum delay time, 4 ms. In this case, the number of the existing UL HARQ processes is 4, and the number of UL HARQ processes due to the new UL HARQ timing is 6; thus, the total number of UL HARQ processes is 10.

The scheduling information about PUSCHs transmitted from two UL subframes can be incorporated into one DL subframe. For example, subframe 1, 4, 6, and 9 operate according to the aforementioned scheme. A UL grant about the secondary cell can have additional two bits for the UL index field. In other words, two PUSCHs can be scheduled by using one UL grant. This method can be applied to all of the UL subframes. Or subframe 0 and 5 can apply 1 bit or additional timing for utilizing 2 bits. Similarly, the method can be applied only to the corresponding subframe, or in the case of additional timing, an additional UL grant can be allocated. At this time, an UL index field may be not included, but separate coding can be applied.

Figure 24:
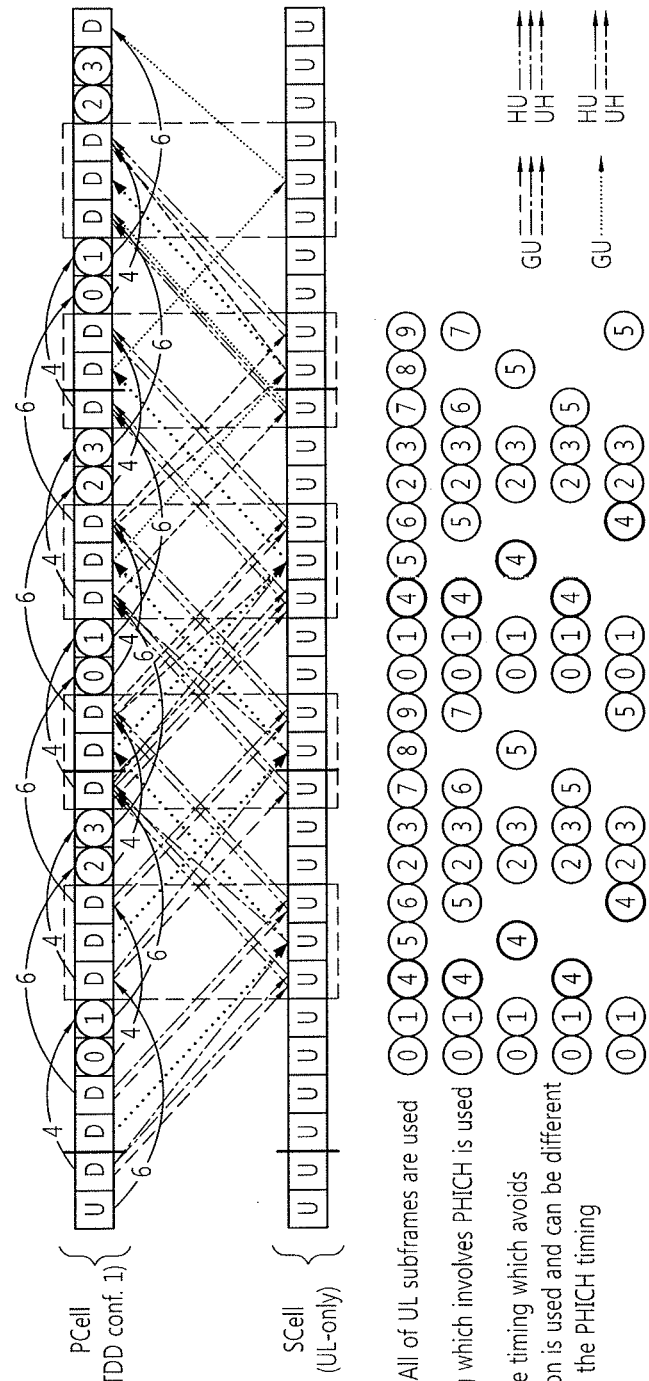
FIG. 24 is an example illustrating timing between the PHICH and the PUSCH in the PHICH-less operations and timing between a UL grant and the PUSCH in case a TDD primary cell using UL-DL configuration 1 and a secondary cell consisting only of UL subframes are aggregated.

FIG. 24 is an example illustrating timing between the PHICH and the PUSCH in the PHICH-less operations and timing between a UL grant and the PUSCH in case a TDD primary cell using UL-DL configuration 1 and a secondary cell consisting only of UL subframes are aggregated.

Based on the existing HARQ timing, the additional HARQ timing can be applied only those subframes which include the PHICH. UH/HU can be applied only for the subframes including the PHICH.

Figure 25:
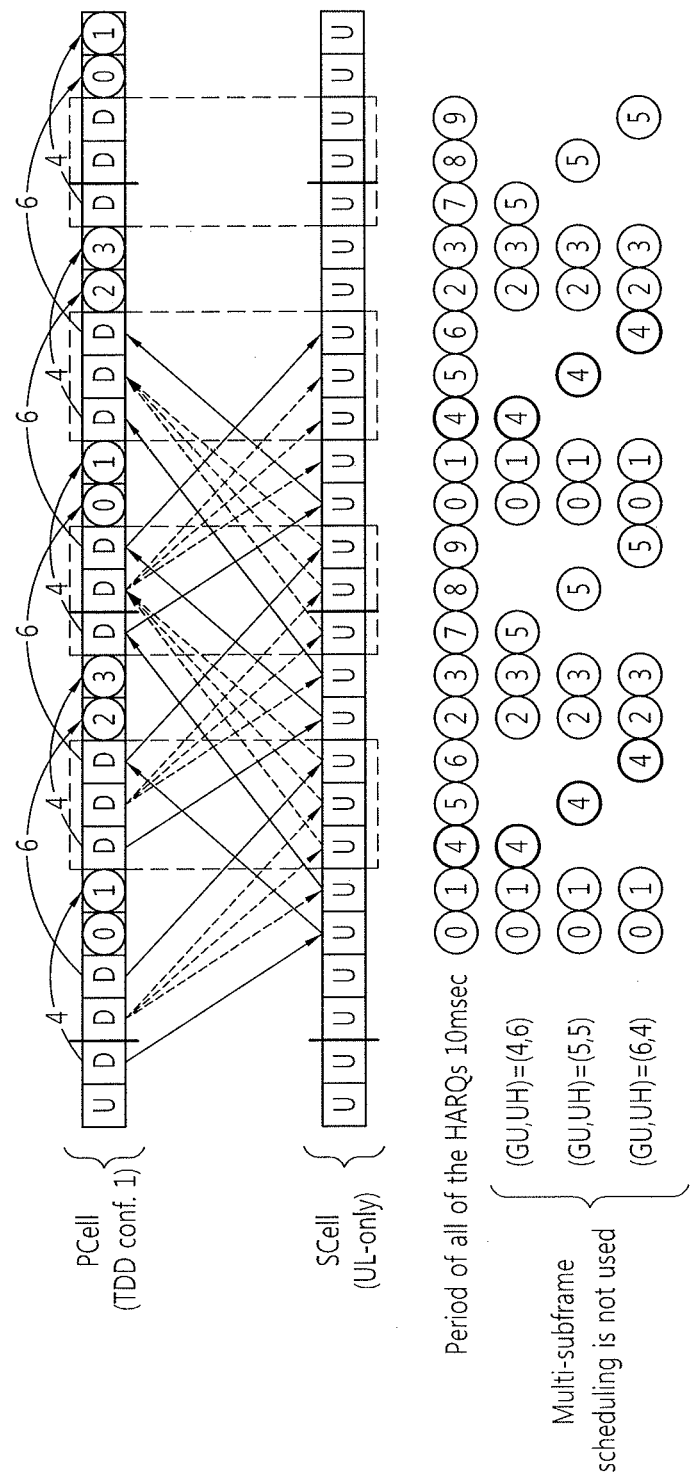
FIG. 25 is another example of HARQ timing which can be applied when a TDD primary cell using UL-DL configuration 1 and a secondary cell consisting only of UL subframes are aggregated.

FIG. 25 is another example of HARQ timing which can be applied when a TDD primary cell using UL-DL configuration 1 and a secondary cell consisting only of UL subframes are aggregated.

Based on the existing HARQ timing, a UL grant due to additional HARQ timing is incorporated only to the DL subframe which does not have the existing UL grant. At this time, it can be configured so that GU+UH=10 ms.

GU can be configured from DL subframe 0, 5 of the primary cell to UL subframe 4, 5, 6, 9, 0, 1 of the secondary cell, respectively.

For the case of FIG. 25, multi-subframe scheduling may be needed. For example, subframe 0, 5 requires multi-subframe scheduling.

Since the number of the existing UL HARQ processes is 4 and the number of new UL HARQ processes is 6, the total number of UL HARQ processes is 10.

In the subframe 0, 5 that is not defined in the existing timing, an additional UL grant can apply 3 bit UL index field. To simplify DCI configuration, the maximum value of the UL index field size can be apply to the UL grants of the whole DL subframes.

Similarly, to avoid multi-subframe scheduling, only one of the three timings can be chosen for subframe 0, 5. At this time, since the number of the existing UL HARQ processes is 4 and the number of new UL HARQ processes is 2, the total number of UL HARQ processes is 6.

Or to avoid multi-subframe scheduling, only the one predetermined timing can be used for subframe 0, 5. Since the number of the existing UL HARQ processes is 4 and the number of new UL HARQ processes is 2, the total number of UL HARQ processes is 6.

Figure 26:
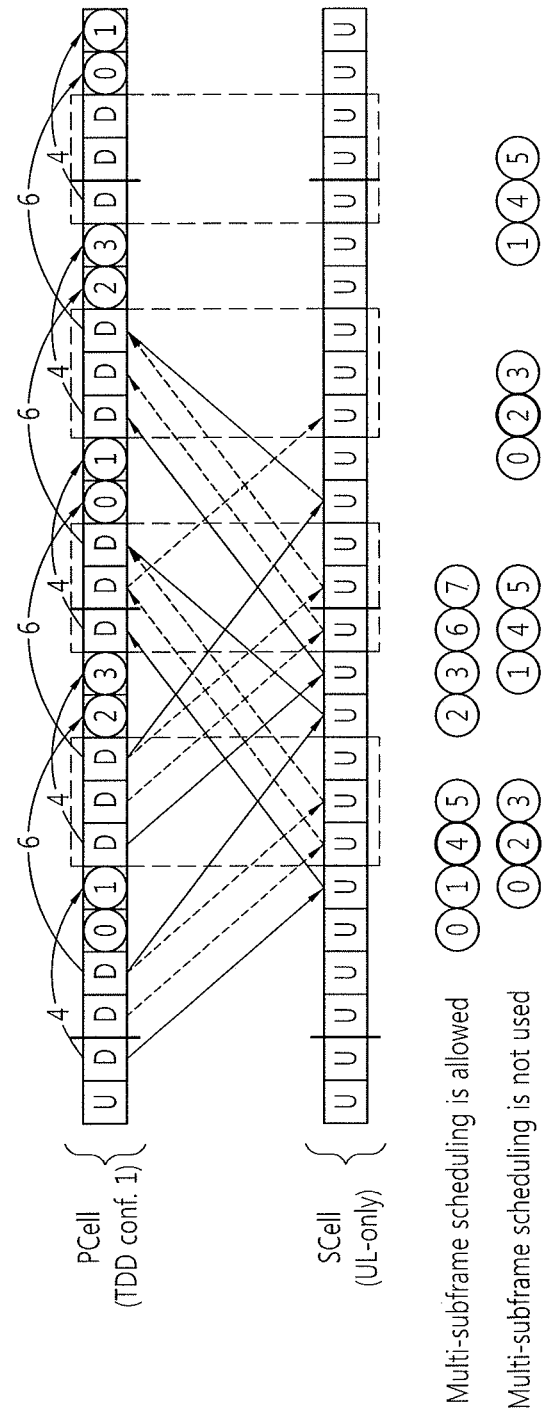
FIG. 26 is a yet another example of HARQ timing which can be applied when a primary cell using UL-DL configuration 1 and a secondary cell consisting only of UL subframes are aggregated.

FIG. 26 is a yet another example of HARQ timing which can be applied when a primary cell using UL-DL configuration 1 and a secondary cell consisting only of UL subframes are aggregated.

The additional HARQ timing of FIG. 26 is set up so that GU=4 ms and UH=6 ms.

In case operations based on GU=4 ms and UH=6 ms cannot be performed, PUSCH transmission from the corresponding UL subframe is excluded. For example, PUSCH transmission from subframe 1, 6 of the secondary cell is excluded. Since the number of the existing UL HARQ processes is 4 and the number of new UL HARQ processes is 4, the total number of UL HARQ processes is 8.

In case operations based on GU=4 ms and UH=6 ms cannot be performed, PUSCH transmission from the corresponding UL subframe (1, 6) is set to the shortest GU timing. For example, DL subframe 1 schedules UL subframe 6, and DL subframe 6 schedules UL subframe 1. At this time, since the number of the existing UL HART processes is 4 and the number of new UL HARQ processes is 6, the total number of UL HARQ processes is 10. Scheduling information about the PUSCH transmitted from 3 UL subframes can be incorporated into one DL subframe. For example, subframe 1 and 6 operate according to the aforementioned scheme. In this case, UL index field of 3 bits can be added to the scheduling information. Or the UL index field may not be added to the UL grant according to the existing timing, but the UL index field of 2 bits may be added only to the UL grant according to the additional timing.

Meanwhile, UL HARQ period can be fixed to 10 ms independently of the existing timing. At this time, it can be set up so that GU=4 ms and UH=6 ms. In case operations based on GU=4 ms and UH=6 ms cannot be performed, PUSCH transmission from the corresponding UL subframe is excluded. For example, PUSCH transmission is excluded for subframe 1, 2, 6, and 7. In this case, the number of UL HARQ processes becomes 6 which is the number of DL subframes of the primary cell.

In case operations based on GU=4 ms and UH=6 ms cannot be performed, PUSCH transmission from the corresponding UL subframe can be changed to the shortest GU timing.

Figure 27:
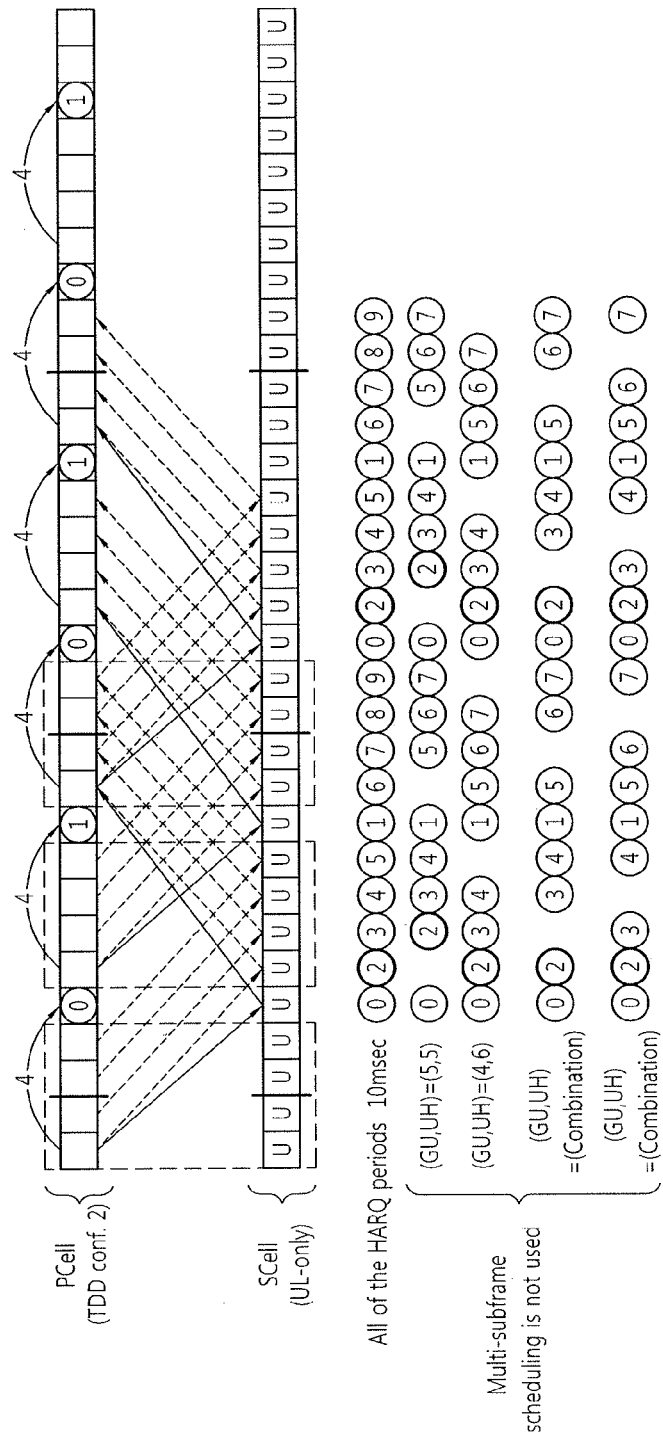
FIG. 27 is another example of HARQ timing which can be applied when a primary cell using UL-DL configuration 2 and a secondary cell consisting only of UL subframes are aggregated.

FIG. 27 is another example of HARQ timing which can be applied when a primary cell using UL-DL configuration 2 and a secondary cell consisting only of UL subframes are aggregated.

FIG. 27 illustrates a method for configuring UL HARQ with which all of the UL subframes can be utilized based on HARQ timing ensuring the minimum delay time, 4 ms.

The number of the existing UL HARQ processes is 2, and the number of UL HARQ processes according to new HARQ timing is 8. Therefore, the total number of UL HARQ processes becomes 10.

Subframe 3, 8 may have to include scheduling information about two UL subframes. In this case, 2 bit UL index field can be added to a UL grant for the secondary cell. Addition of the UL index field can be applied to all of the subframes satisfying the condition above. One bit of subframe 0, 1, 4, 5, 6, 9 can be used for indicating the timing shown in FIG. 27, and additional timing can be configured to utilize the remaining 1 bit of the 2 bits of subframe 0, 1, 4, 5, 6, 9. Or the UL index field can be added only to the corresponding subframe.

Figure 28:
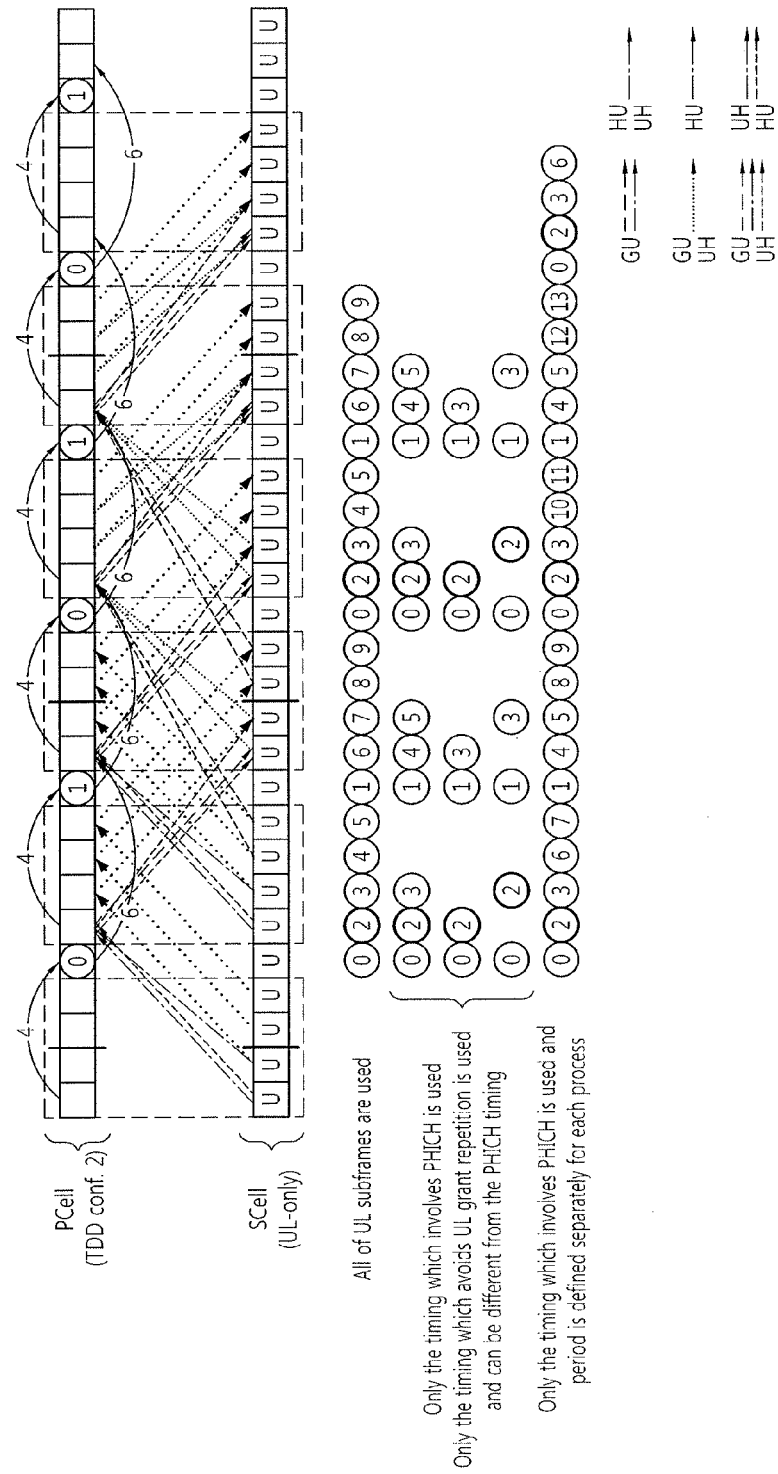
FIG. 28 is an example of HARQ timing which takes into account the PHICH-less operations in case a primary cell using UL-DL configuration 2 and a secondary cell consisting only of UL subframes are aggregated.

FIG. 28 is an example of HARQ timing which takes into account the PHICH-less operations in case a primary cell using UL-DL configuration 2 and a secondary cell consisting only of UL subframes are aggregated.

In this method, UH/HU can be applied only to those subframes including the PHICH. For example, UH/HU can be used for subframe 3, 6. The number of the existing UL HARQ processes is 2, and the number of UL HARQ processes according to new HARQ timing is 4. Therefore, the total number of UL HARQ processes becomes 6.

A period of 20 ms may be applied additionally. In this case, to satisfy the minimum delay time of 4 ms for subframe 0, 1, 6, and 7, HARQ timing of 20 ms period can be added. In this case, the number of the existing UL HARQ processes is 2, and the number of UL HARQ processes according to new HARQ timing is 12. Therefore, the total number of UL HARQ processes is 14.

Repetitive PHICH timing may not be applied among the additional HARQ timings. PHICH timing may not be applied to the subframe 0, 1, 4, 5, 6, and 9. One from the subframe 8, 3 or subframe 4, 9 can be chosen as arrival of GU and HU; and start of UH. The number of the existing UL HARQ processes is 2, and the number of UL HARQ processes according to new HARQ timing is 2. Therefore, the total number of UL HARQ processes becomes 4.

Meanwhile, timing may be configured so that one DL subframe has scheduling information for only one PUSCH. GU can be set up so that it can start only from subframe 4 and 9 or from subframe 5 and 0. Similarly, GU can be set up so that it can arrive at one of subframe 8, 3 and subframe 9, 4. Timing can be configured so that subframes can be mapped from subframe 4, 9 to subframe 8, 3 or from subframe 5, 0 to subframe 9, 4. The number of the existing UL HARQ processes is 2, and the number of UL HARQ processes according to new HARQ timing is 1 or 2. Therefore, the total number of UL HARQ processes becomes 3 or 4.

Figure 29:
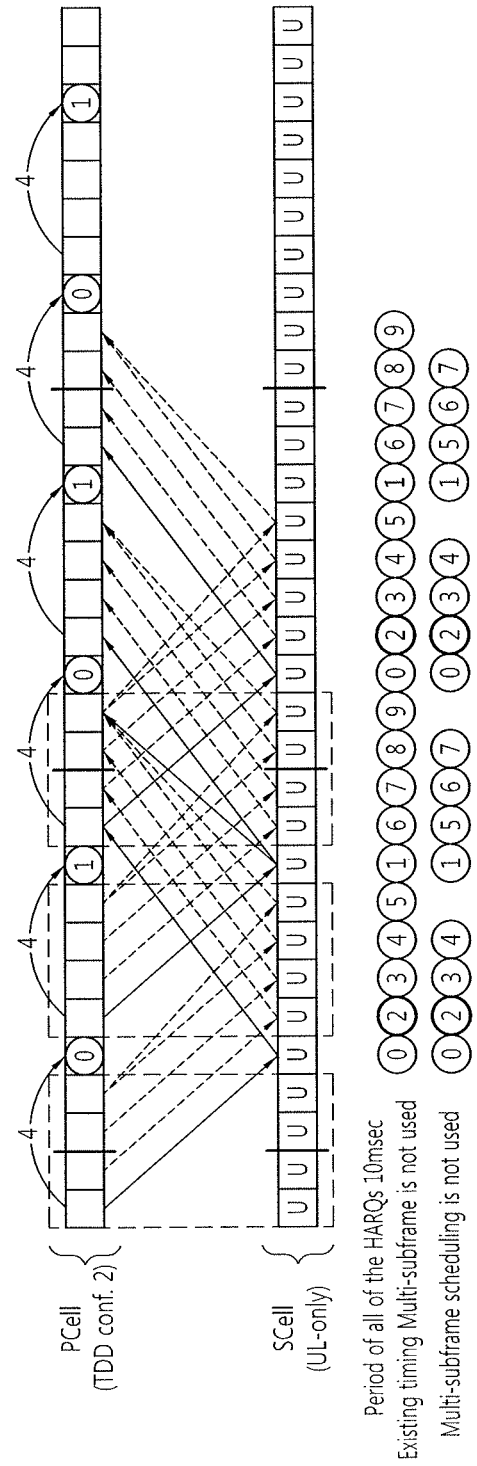
FIG. 29 is a yet another example of HARQ timing which can be applied when a primary cell using UL-DL configuration 2 and a secondary cell consisting only of UL subframes are aggregated.

FIG. 29 is a yet another example of HARQ timing which can be applied when a primary cell using UL-DL configuration 2 and a secondary cell consisting only of UL subframes are aggregated.

FIG. 29 illustrates an example where the period of HARQ timing is set to 10 ms (=GU+UH).

If multi-subframe scheduling is not allowed, the number of the existing UL HARQ processes becomes 2, and the number of UL HARQ processes according to new HARQ timing becomes 6. Therefore, the total number of UL HARQ processes becomes 8.

To avoid multi-subframe scheduling, UL-DL configuration is used so that one of a plurality of HARQ timings is chosen or one HARQ timing can be predetermined.

For those UL subframes that cannot be set to the period (UH+GU=10 ms), PUSCH transmission can be excluded. For example, PUSCH transmission can be excluded for subframe 1, 6. In this case, the number of the existing UL HARQ processes is 2, and the number of UL HARQ processes according to new HARQ timing becomes 6. Therefore, the total number of UL HARQ processes becomes 8.

In case operations based on GU=4 ms and UH=6 ms cannot be performed, PUSCH transmission from the corresponding UL subframe is set to the shortest GU timing. In this case, the number of the existing UL HARQ processes is 2, and the number of UL HARQ processes according to new HARQ timing becomes 8. Therefore, the total number of UL HARQ processes becomes 10.

In case one DL subframe includes scheduling information about the PUSCH transmitted from two UL subframes, the UL index field can be composed of 2 bits. Or instead of including the UL index field, separate coding different from that for the existing UL grant may be applied.

Or the HARQ period may be set to 10 ms independently of the existing HARQ timing. The HARQ period can be set so that GU is 4 ms and UH is 6 ms.

Figure 30:
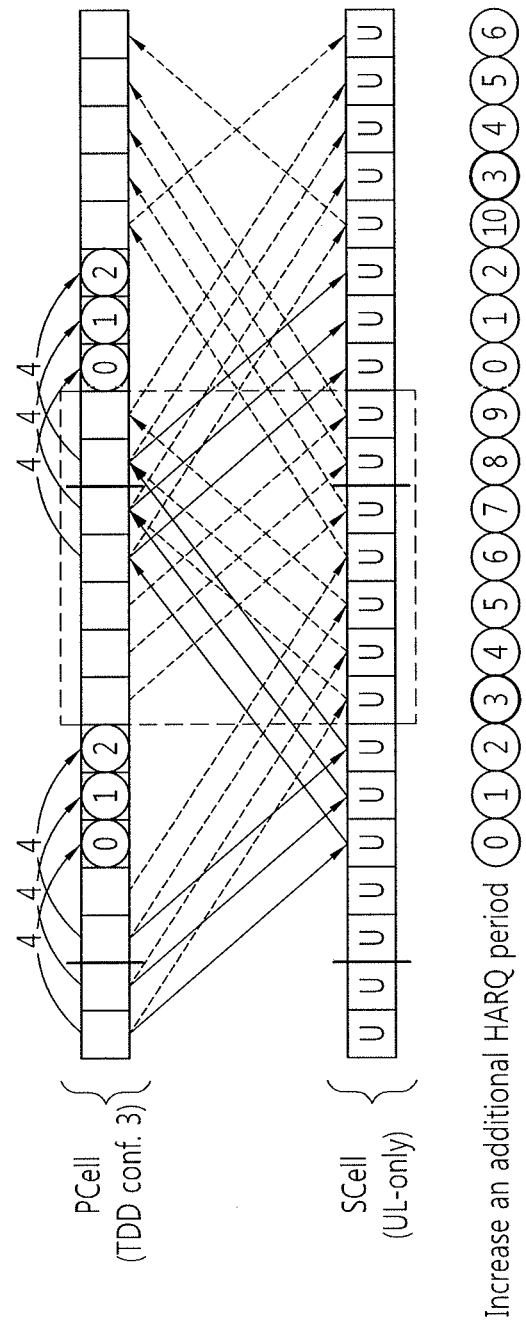
FIG. 30 is an example of HARQ timing which can be applied when a primary cell using UL-DL configuration 3 and a secondary cell consisting only of UL subframes are aggregated.

FIG. 30 is an example of HARQ timing which can be applied when a primary cell using UL-DL configuration 3 and a secondary cell consisting only of UL subframes are aggregated.

FIG. 30 illustrates a method for configuring UL HARQ, which uses a timing ensuring the minimum delay time of 4 ms to utilize all of the UL subframes. According to this method, the number of the existing UL HARQ processes is 3, and the number of UL HARQ processes according to new HARQ timing is 8. Therefore, the total number of UL HARQ processes becomes 11. At this time, a HARQ process having a HARQ period larger than 10 ms can be added.

Subframe 8, 9, 0 may have to include scheduling information about two UL subframes. In this case, 2 bit UL index field can be added to a UL grant for the secondary cell. Addition of the UL index field can be applied to all of the subframes satisfying the condition above. Subframe 5, 6, 7, and 1 can use 1 bit, and additional timing can be configured to utilize the 2 bits of subframe 5, 6, 7, and 1. Or the UL index field can be added only to the corresponding subframe.

Figure 31:
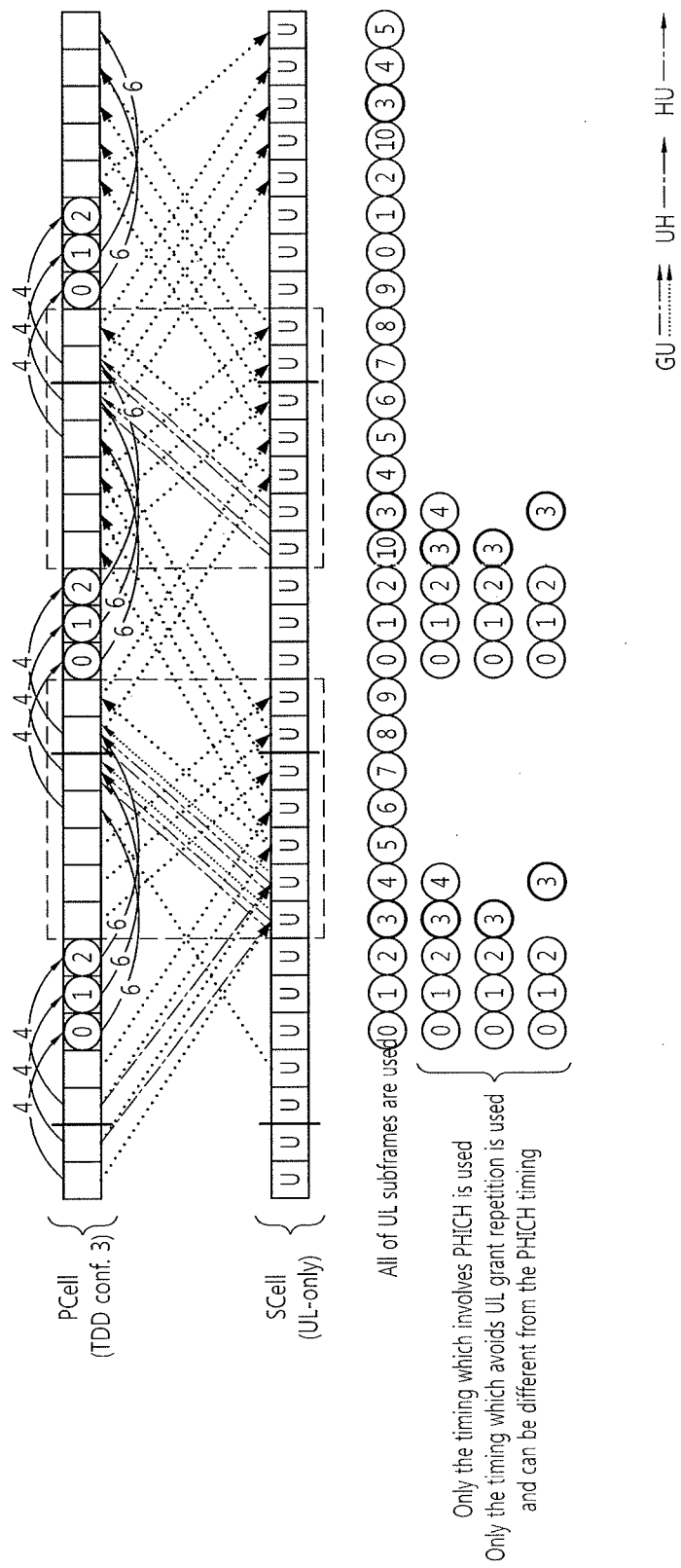
FIG. 31 is an example of HARQ timing taking into account the PHICH-less operations when a primary cell using UL-DL configuration 3 and a secondary cell consisting only of UL subframes are aggregated.

FIG. 31 is an example of HARQ timing taking into account the PHICH-less operations when a primary cell using UL-DL configuration 3 and a secondary cell consisting only of UL subframes are aggregated.

In the method of FIG. 31, UH/HU can be applied only to those subframes including the PHICH. For example, UH/HU can be used for subframe 9, 0. The number of the existing UL HARQ processes is 3, and the number of UL HARQ processes according to new HARQ timing is 2. Therefore; the total number of UL HARQ processes becomes 5.

A period of 20 ms may be applied additionally. In this case, to satisfy the minimum delay time of 4 ms for subframe 7, 8, 9, 0, and 1, HARQ timing of 20 ms period can be added. The number of the existing UL HARQ processes is 3, and the number of UL HARQ processes according to new HARQ timing is 12. Therefore, the total number of UL HARQ processes is 15.

Timing can be set up so that one DL subframe includes only the scheduling information about one PUSCH. In this case, there is no need to incorporate a UL index field to a UL grant. GU is set up so that it can start only from subframe 1. GU can be set up so that it can arrive at only one of subframe 5 or 6. The number of the existing UL HARQ processes is 3, and the number of UL HARQ processes according to new HARQ timing is 1. Therefore, the total number of UL HARQ processes becomes 4.

Figure 32:
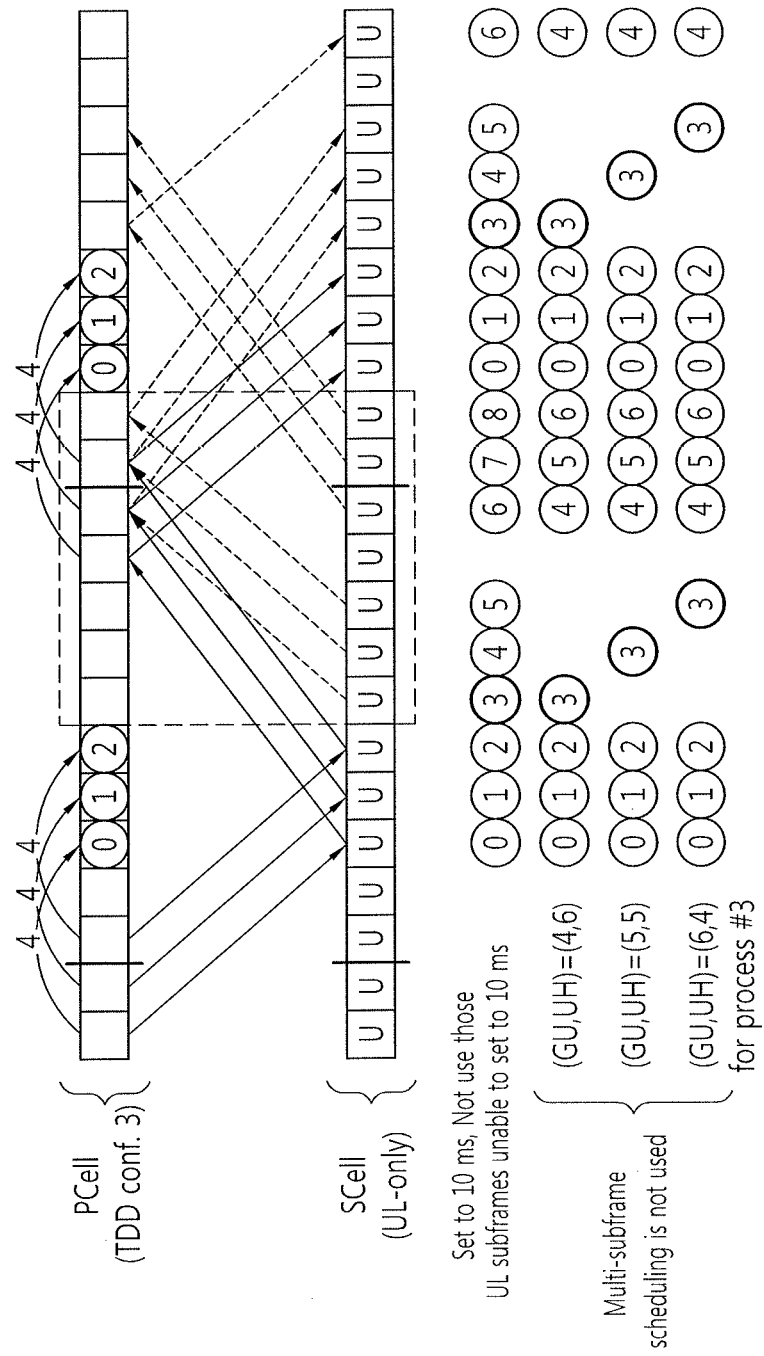
FIG. 32 is another example of HARQ timing which can be applied when a primary cell using UL-DL configuration 3 and a secondary cell consisting only of UL subframes are aggregated.

FIG. 32 is another example of HARQ timing which can be applied when a primary cell using UL-DL configuration 3 and a secondary cell consisting only of UL subframes are aggregated.

The method shown in FIG. 32 is based on the existing HARQ timing, and the period of a HARQ process added is set to 10 ms. Those UL subframes are not used, of which the period of the HARQ process cannot be set to 10 ms. In case a scheduling cell uses UL-DL configuration including 3 contiguous UL subframes, the secondary cell can include those UL subframes of which the period of the HARQ process cannot be set to 10 ms.

Subframe 8 is excluded from PUSCH transmission.

UL grants to be added are distributed as evenly as possible so that the UL grants are not concentrated on one DL subframe, and the shortest GU timing is applied for the UL grants.

The number of the existing UL HARQ processes is 3, and the number of UL HARQ processes according to new HARQ timing is 6. Therefore, the total number of UL HARQ processes becomes 9.

One DL subframe (for example, subframe 9, 0) can include scheduling information about two UL subframes. The existing UL grant and UL grants to be added are distributed as evenly as possible so that they cannot be concentrated on one DL subframe, and the shortest GU timing is applied. The number of the existing UL HARQ processes is 3, and the number of UL HARQ processes according to new HARQ timing is 6. Therefore, the total number of UL HARQ processes becomes 9. One DL subframe (for example, subframe 0, 1) can include scheduling information about two UL subframes.

Meanwhile, UL grants to be added can be set up so that they are not included in a DL subframe which includes the existing UL grants. DL subframe 1 can schedule one of UL subframe 5, 6, and 7. The number of the existing UL HARQ processes is 3, and the number of UL HARQ processes according to new HARQ timing is 4. Therefore, the total number of UL HARQ processes becomes 7.

Figure 33:
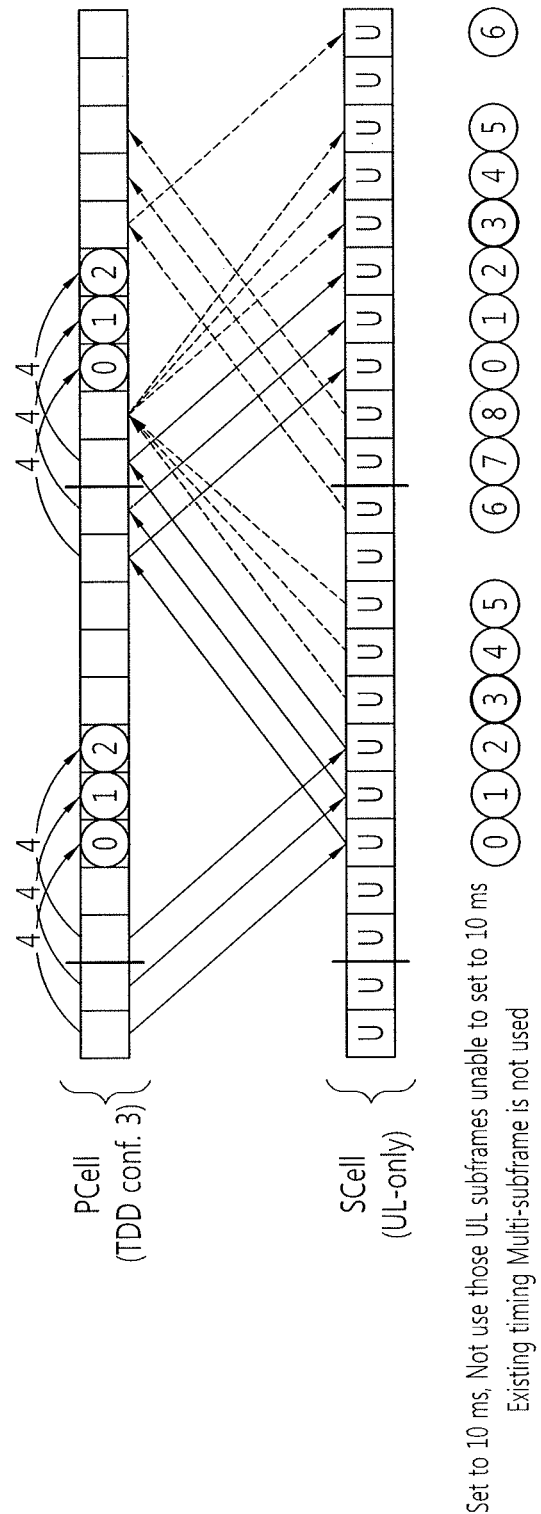
FIG. 33 is a yet another example of HARQ timing which can be applied when a primary cell using UL-DL configuration 3 and a secondary cell consisting only of UL subframes are aggregated.

FIG. 33 is a yet another example of HARQ timing which can be applied when a primary cell using UL-DL configuration 3 and a secondary cell consisting only of UL subframes are aggregated.

The method shown in FIG. 33 is based on the existing HARQ timing, and the period of additional HARQ timing is set up so that GU=4 ms and UH is 6 ms.

When additional HARQ timing is applied, PUSCH transmission is excluded for those UL subframes which cannot operate based on the condition that GU is 4 ms and UH is 6 ms. For example, PUSCH transmission is not carried out for subframe 6, 7, and 8. The number of the existing UL HARQ processes is 3, and the number of UL HARQ processes according to new HARQ timing is 4. Therefore, the total number of UL HARQ processes becomes 7.

When additional HARQ timing is applied, the shortest GU timing is applied for the UL subframes that cannot operate according to the condition that GU is 4 ms and UH is 6 ms. The number of the existing UL HARQ processes is 4, and the number of UL HARQ processes according to new HARQ timing is 6. Therefore, the total number of UL HARQ processes becomes 10. In case one DL subframe (for example, subframe 1) includes scheduling information about 3 UL subframes, the DL subframe can include a UL index field of 3 bits.

Figure 34:
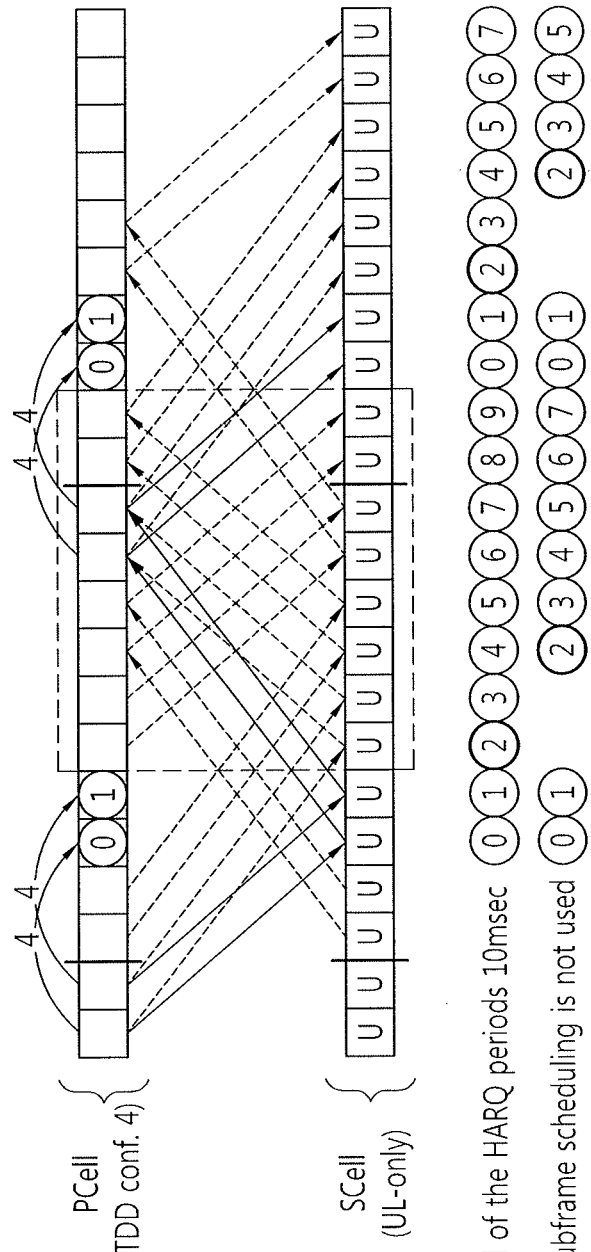
FIG. 34 is an example of HARQ timing which can be applied when a primary cell using UL-DL configuration 3 and a secondary cell consisting only of UL subframes are aggregated.

FIG. 34 is an example of HARQ timing which can be applied when a primary cell using UL-DL configuration 3 and a secondary cell consisting only of UL subframes are aggregated.

FIG. 34 illustrates a method for configuring UL HARQ with which all of the UL subframes can be utilized based on HARQ timing ensuring the minimum delay time, 4 ms. The number of the existing UL HARQ processes is 2, and the number of UL HARQ processes according to new HARQ timing is 8. Therefore, the total number of UL HARQ processes becomes 10.

Subframe 8, 9 may have to include scheduling information about two UL subframes. In this case, 2 bit UL index field can be added to a UL grant for the secondary cell. Addition of the UL index field can be applied to all of the subframes satisfying the condition above. Subframe 0, 1, 4, 5, 6, 7 uses 1 bit, and additional timing can be configured to utilize the 2 bits of subframe 0, 1, 4, 5, 6, 7. Or the UL index field can be added only to the corresponding subframe.

FIG. 34 illustrates a situation where one DL subframe may include scheduling information about two UL suframes. For example, subframe 8 and 9 can have a UL grant about two UL subframes. The number of the existing UL HARQ processes is 2, and the number of. UL HARQ processes according to new HARQ timing is 6. Therefore, the total number of UL HARQ processes becomes 8.

Multi subframe scheduling may not be allowed. In this case, The number of the existing UL HARQ processes is 2, and the number of UL HARQ processes according to new HARQ timing is 6. Therefore, the total number of UL HARQ processes becomes 8.

Figure 35:
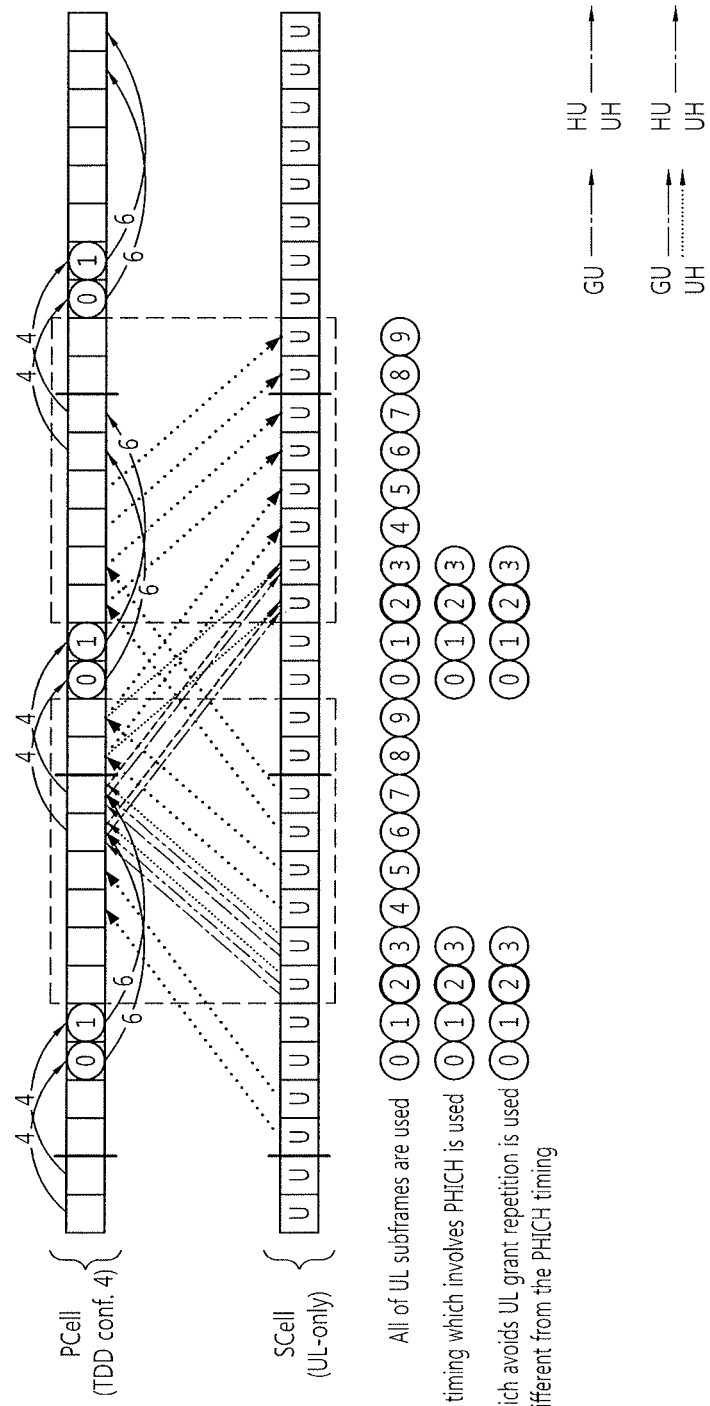
FIG. 35 is an example of HARQ timing taking into account the PHICH-less operations when a primary cell using UL-DL configuration 4 and a secondary cell consisting only of UL subframes are aggregated.

FIG. 35 is an example of HARQ timing taking into account the PHICH-less operations when a primary cell using UL-DL configuration 4 and a secondary cell consisting only of UL subframes are aggregated.

In the method of FIG. 35, UH/HU can be applied only to those subframes including the PHICH. For example, subframe 3, 6 can be used as subframes for PHICH arrival (UH) or start (HU). The number of the existing UL HARQ processes is 2, and the number of UL HARQ processes according to new HARQ timing is 2. Therefore, the total number of UL HARQ processes becomes 4.

A period of 20 ms may be applied additionally. In this case, to satisfy the minimum delay time of 4 ms for subframe 6, 7, 8, 9, 0, and 1, HARQ timing of 20 ms period can be added. The number of the existing UL HARQ processes is 2, and the number of UL HARQ processes according to new HARQ timing is 14. Therefore, the total number of UL HARQ processes is 16.

Meanwhile, GU timing can be configured in the same manner as HU timing.

Timing can be set up so that one DL subframe includes only the scheduling information about one PUSCH. In this case, there is no need to incorporate a UL index field to a UL grant. GU is set up so that it can start only from subframe 0 and 1. GU can be set up so that it can arrive at only one of subframe 4 or 5. The number of the existing UL HARQ processes is 2, and the number of UL HARQ processes according to new HARQ timing is 2. Therefore, the total number of UL HARQ processes becomes 4.

Figure 36:
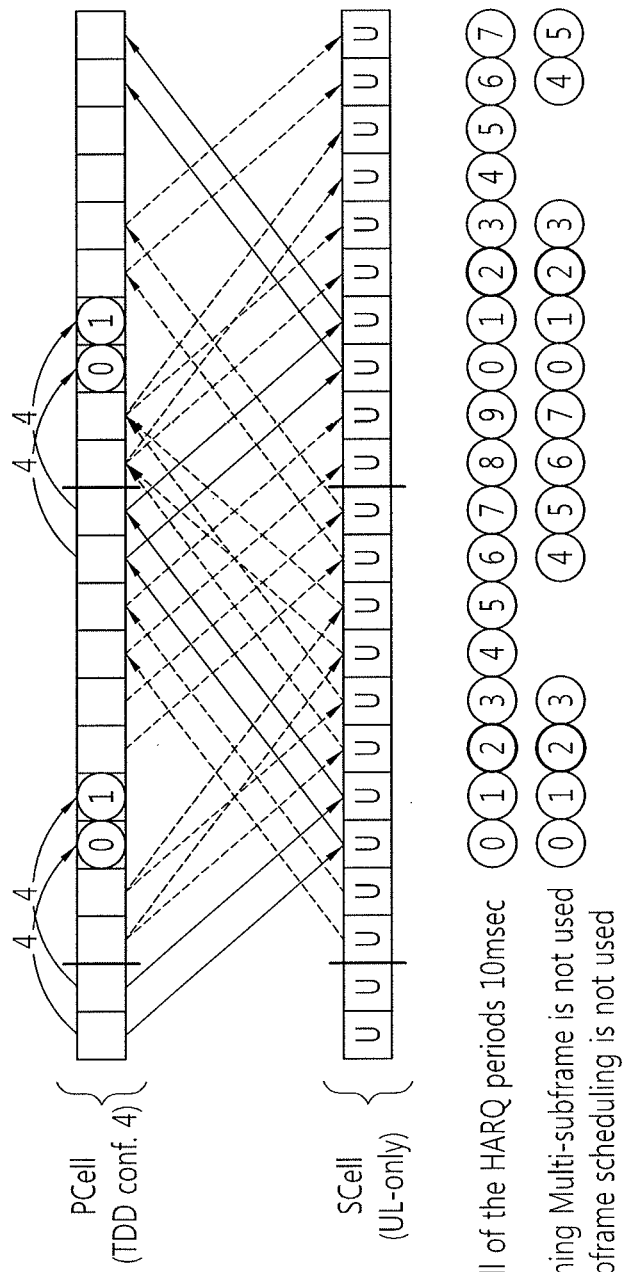
FIG. 36 is an example of HARQ timing which can be applied when a primary cell using UL-DL configuration 4 and a secondary cell consisting only of UL subframes are aggregated.

FIG. 36 is an example of HARQ timing which can be applied when a primary cell using UL-DL configuration 4 and a secondary cell consisting only of UL subframes are aggregated.

The method shown in FIG. 33 is based on the existing HARQ timing; however, the existing UL grant and a UL grant added by additional HARQ timing are distributed evenly to prevent the UL grants from being concentrated on one DL subframe, and the shortest GU timing can be applied.

One DL subframe can have scheduling information about two PUSCHs. For example, subframe 0 and 1 are such subframes. The number of the existing UL HARQ processes is 2, and the number of UL HARQ processes according to new HARQ timing is 8. Therefore, the total number of UL HARQ processes becomes 10.

If operations are constrained so that the scheduling information of a temporarily preceding PUSCH and the scheduling information of a temporarily succeeding PUSCH are disposed sequentially, subframe 0 schedules UL subframe 4, 5, and subframe 1 schedules UL subframe 6, 7.

If there is no constraint that the scheduling information of a temporarily preceding PUSCH and the scheduling information of a temporarily succeeding PUSCH should be disposed sequentially, subframe 0 can be made to schedule UL subframe 4, 6, and subframe 1 can be made to schedule subframe 5, 7.

If multi-subframe scheduling is not allowed, the number of the existing UL HARQ processes is 2, and the number of UL HARQ processes according to new HARQ timing is 6. Therefore, the total number of UL HARQ processes becomes 8.

Figure 37:
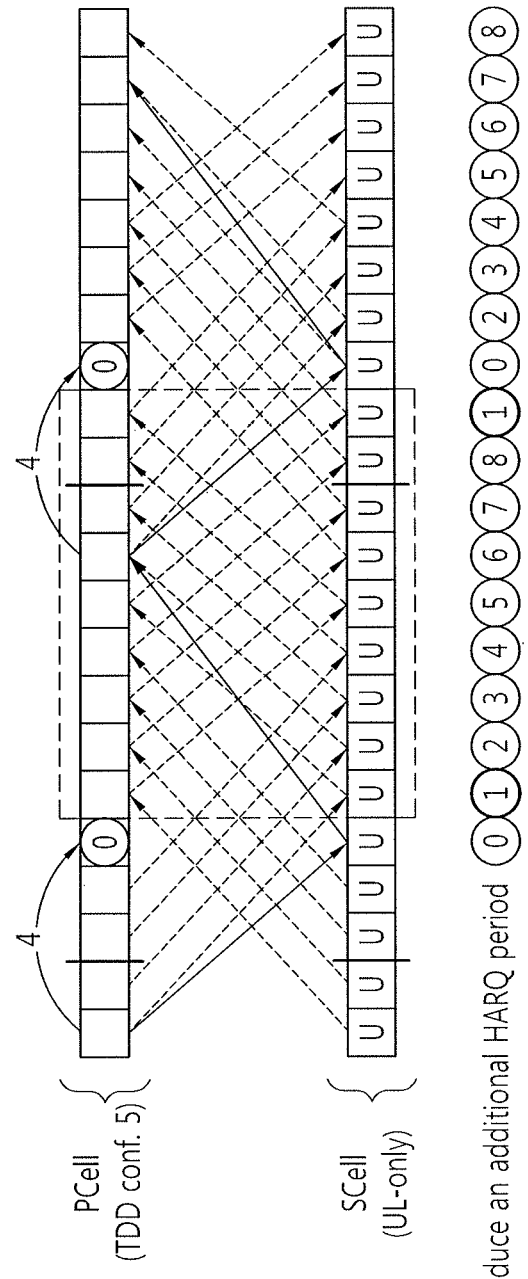
FIG. 37 is an example of HARQ timing which can be applied when a primary cell using UL-DL configuration 5 and a secondary cell consisting only of UL subframes are aggregated.

FIG. 37 is an example of HARQ timing which can be applied when a primary cell using UL-DL configuration 5 and a secondary cell consisting only of UL subframes are aggregated.

FIG. 37 illustrates a method for configuring UL HARQ with which all of the UL subframes can be utilized based on HARQ timing ensuring the minimum delay time, 4 ms. The number of the existing UL HARQ processes is 1, and the number of UL HARQ processes according to new HARQ timing is 8. Therefore, the total number of UL HARQ processes becomes 9. The period of a UL HARQ process due to new HARQ timing can be shorter than 10 ms.

Subframe 8 may have to include scheduling information about two UL subframes. In this case, 2 bit UL index field can be added to a UL grant for the secondary cell. Addition of the UL index field can be applied to all of the subframes satisfying the condition above. Subframe 3, 4, 5, 6, 7, 9, 0, and 1 can use 1 bit, and additional timing can be configured to utilize the 2 bits of subframe 3, 4, 5, 6, 7, 9, 0, and 1. Or the UL index field can be added only to the corresponding subframe.

Figure 38:
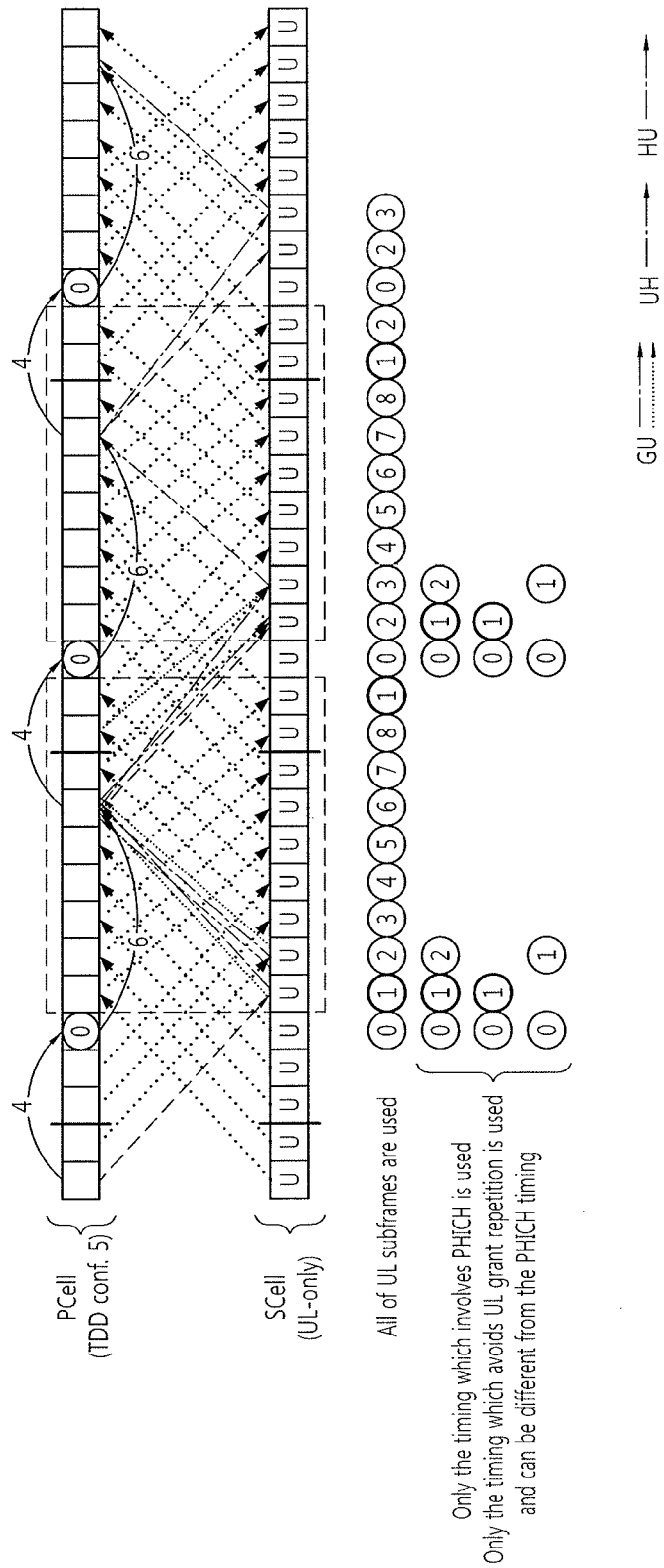
FIG. 38 is an example of HARQ timing taking into account the PHICH-less operations when a primary cell using UL-DL configuration 5 and a secondary cell consisting only of UL subframes are aggregated.

FIG. 38 is an example of HARQ timing taking into account the PHICH-less operations when a primary cell using UL-DL configuration 5 and a secondary cell consisting only of UL subframes are aggregated.

In the method of FIG. 38, UH/HU can be applied only to those subframes including the PHICH. For example, subframe 8 can be used as subframes for PHICH arrival (UH) or start (HU). The number of the existing UL HARQ processes is 1, and the number of UL HARQ processes according to new HARQ timing is 2. Therefore, the total number of UL HARQ processes becomes 3.

PHICH timing repeating among additional timings may not be allowed. In this case, the PHICH timing of subframe 0, 1, 3, 4, 5, 6, and 7 may not be used. For arrival of GU and HU, and start of UH, UL subframe 3 or 4 is chosen. The number of the existing UL HARQ processes is 1, and the number of UL HARQ processes according to new HARQ timing is 1. Therefore, the total number of UL HARQ processes becomes 2.

A period of 20 ms may be applied additionally. In this case, to satisfy the minimum delay time of 4 ms for subframe 5, 6, 7, 8, 9, 0, and 1, HARQ timing of 20 ms period can be added. The number of the existing UL HARQ processes is 1, and the number of UL HARQ processes according to new HARQ timing is 16. Therefore, the total number of UL HARQ processes is 17.

GU timing can be configured in the same manner as HU timing.

Or, timing can be set up so that one DL subframe includes only the scheduling information about one PUSCH. In this case, there is no need to incorporate a UL index field to a UL grant. GU is set up so that it can start only from subframe 9 and 0. GU can be set up so that it can arrive at only one of subframe 3 or 4. Or subframes can be mapped from subframe 9 to subframe 3 or from subframe 0 to subframe 4. The number of the existing UL HARQ processes is 2, and the number of UL HARQ processes according to new HARQ timing is 1 or 2. Therefore, the total number of UL HARQ processes becomes 3 or 4.

Figure 39:
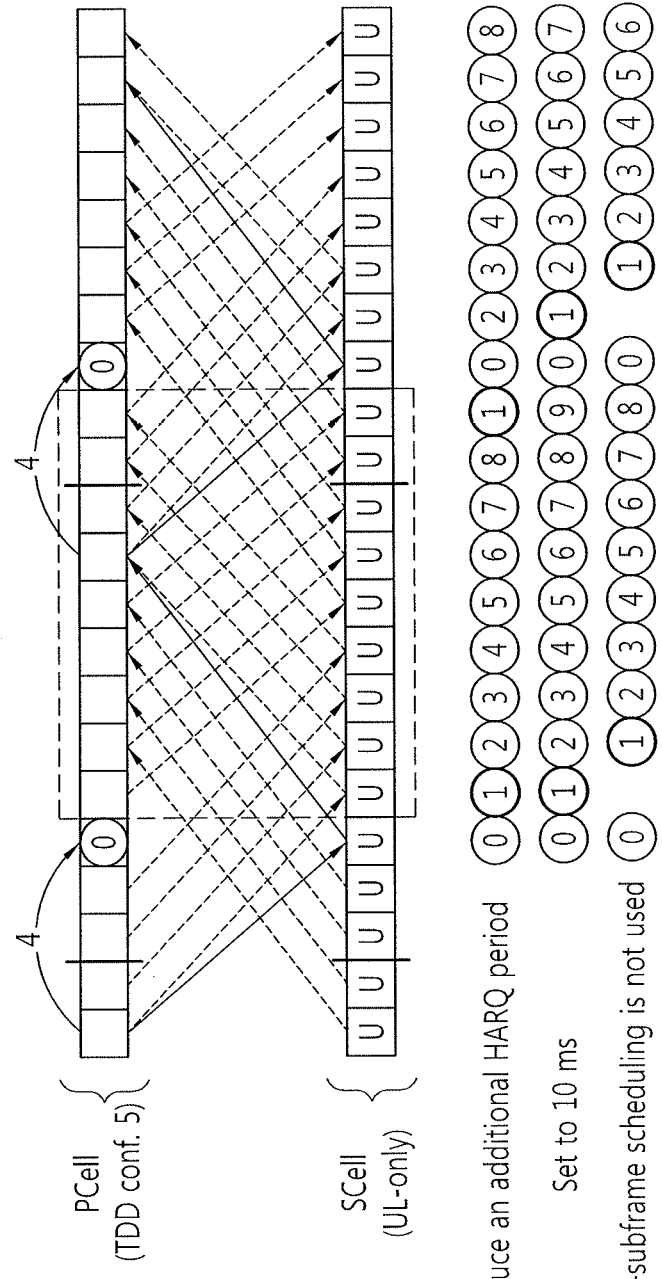
FIG. 39 is an example of HARQ timing which can be applied when a primary cell using UL-DL configuration 5 and a secondary cell consisting only of UL subframes are aggregated.

FIG. 39 is an example of HARQ timing which can be applied when a primary cell using UL-DL configuration 5 and a secondary cell consisting only of UL subframes are aggregated.

FIG. 39 illustrates a method for configuring UL HARQ with which all of the UL subframes can be utilized based on HARQ timing ensuring the minimum delay time, 4 ms. To further meet the HARQ period of 10 ms, the method changes HU or UH timing so that the sum of UH and HU becomes 10 ms (UH+HU=10 ms).

The method shown in FIG. 39 is based on the existing HARQ timing; however, a UL grant added by additional HARQ timing is distributed evenly to prevent the UL grant from being concentrated on one DL subframe, and the shortest GU timing is applied.

Subframe 8 may have to include scheduling information about two UL subframes. The number of the existing UL HARQ processes is 1, and the number of UL HARQ processes according to new HARQ timing is 9. Therefore, the total number of UL HARQ processes becomes 10.

If multi-subframe scheduling is not allowed, the number of the existing UL HARQ processes becomes 1, and the number of UL HARQ processes according to new HARQ timing becomes 8. Therefore, the total number of UL HARQ processes becomes 9.

Figure 40:
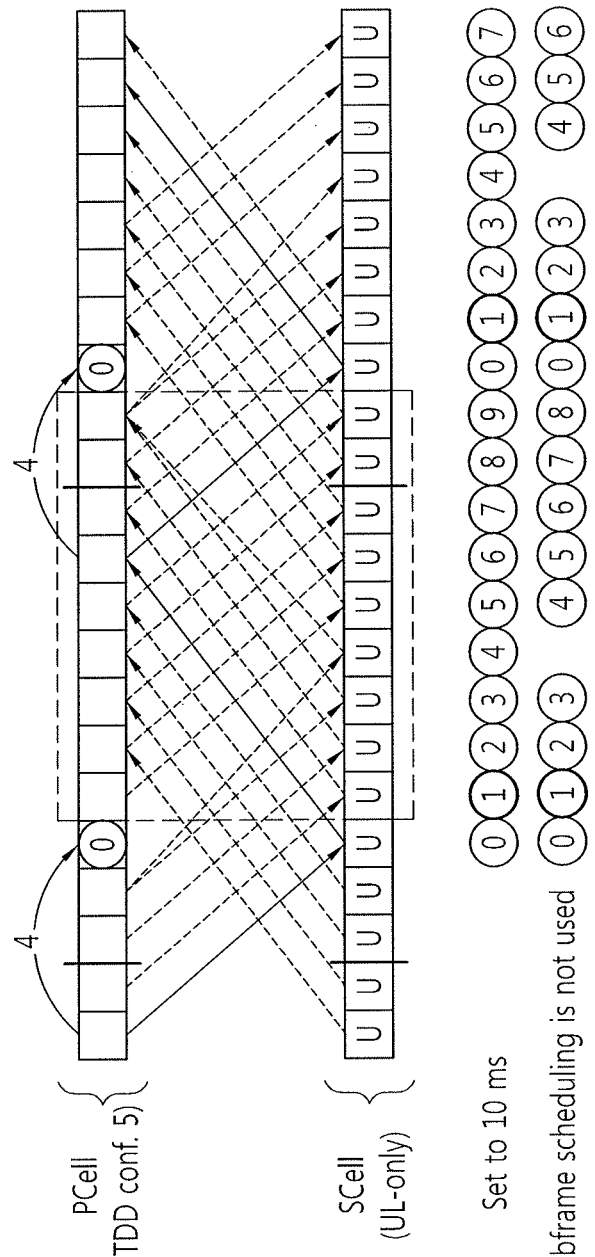
FIG. 40 is an example of HARQ timing which can be applied when a primary cell using UL-DL configuration 5 and a secondary cell consisting only of UL subframes are aggregated.

FIG. 40 is an example of HARQ timing which can be applied when a primary cell using UL-DL configuration 5 and a secondary cell consisting only of UL subframes are aggregated. Compared with FIG. 39, the scheme of FIG. 40 evenly distributes the existing UL grant as well as a UL grant to be added so that the UL grants are not concentrated on one DL subframe, and applies the shortest GU timing.

Subframe 1 may have to include scheduling information about two UL subframes. The number of the existing UL HARQ processes is 1, and the number of UL HARQ processes according to new HARQ timing is 9. Therefore, the total number of UL HARQ processes becomes 10.

If multi-subframe scheduling is not allowed, the number of the existing UL HARQ processes becomes 1, and the number of UL HARQ processes according to new HARQ timing becomes 8. Therefore, the total number of UL HARQ processes becomes 9.

Figure 41:
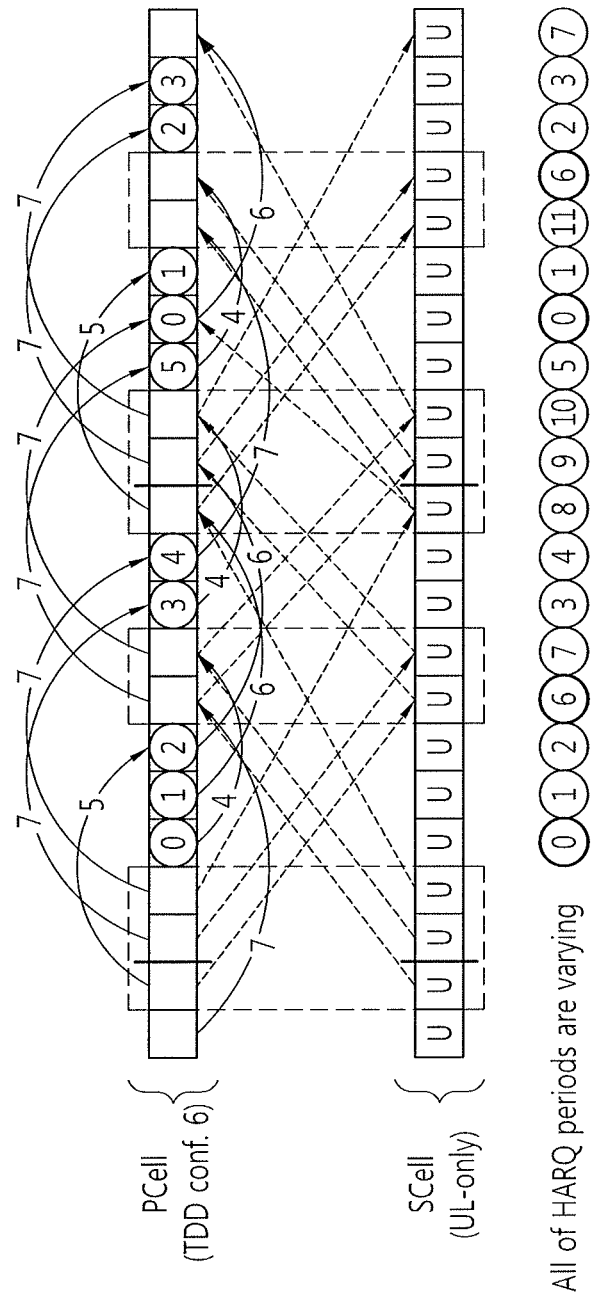
FIG. 41 is an example of HARQ timing which can be applied when a primary cell using UL-DL configuration 6 and a secondary cell consisting only of UL subframes are aggregated.

FIG. 41 is an example of HARQ timing which can be applied when a primary cell using UL-DL configuration 6 and a secondary cell consisting only of UL subframes are aggregated.

FIG. 41 illustrates a method for configuring UL HARQ with which all of the UL subframes can be utilized based on HARQ timing ensuring the minimum delay time, 4 ms. The additional HARQ process can be set up so that transmission can be performed with a period longer than 10 ms. The number of the existing UL HARQ processes is 6, and the number of UL HARQ processes according to new HARQ timing is 6. Therefore, the total number of UL HARQ processes becomes 12.

Or, timing can be set up so that one DL subframe includes only the scheduling information about one PUSCH. In other words, multi-subframe scheduling may not be allowed. In this case, the number of the existing UL HARQ processes is 5, and the number of UL HARQ processes according to new HARQ timing is 0. Therefore, the total number of UL HARQ processes becomes 5.

Figure 42:
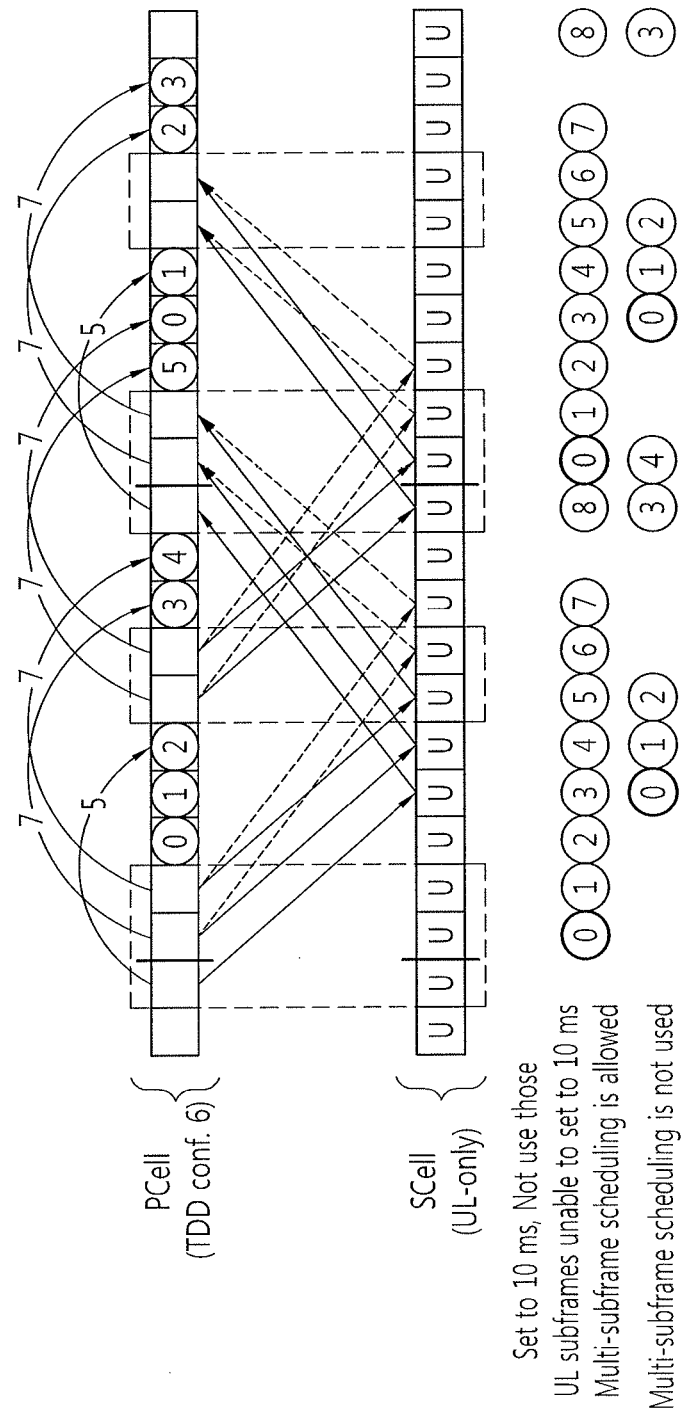
FIG. 42 is another example of HARQ timing which can be applied when a primary cell using UL-DL configuration 6 and a secondary cell consisting only of UL subframes are aggregated.

FIG. 42 is another example of HARQ timing which can be applied when a primary cell using UL-DL configuration 6 and a secondary cell consisting only of UL subframes are aggregated.

The method of FIG. 42 sets the period of the HARQ process to 10 ms independently of the existing HARQ timing. Those UL subframes that cannot be set to the period (UH+GU=10 ms) are not used. In case a scheduling cell uses UL-DL configuration including 3 contiguous UL subframes, the secondary cell can include those UL subframes of which the period of the HARQ process cannot be set to 10 ms.

UL subframe 8 can be excluded from PUSCH transmission.

PUSCH transmission is excluded for a UL subframe that cannot be operated based on the timing of GU=4 ms and UH=6 ms. In other words, in FIG. 42, only the timing denoted by solid lines is used. In this case, the number of UL HARQ processes is equal to the number of DL subframes of the primary cell, which amounts to 5.

The PUSCH to be transmitted from a UL subframe that cannot be operated according to the timing of GU=4 ms and UH=6 ms can be moved to another UL subframe; in this case, a UL grant is distributed so that it cannot be concentrated on one DL subframe. The number of UL HARQ processes becomes 9.

If operations are constrained so that the scheduling information of a temporarily preceding PUSCH and the scheduling information of a temporarily succeeding PUSCH are disposed sequentially, subframe 1 schedules UL subframe 5, 6, 7 and subframe 6 schedules UL subframe 0, 1, 2.

The scheduling may not be limited by the constraint that the scheduling information of a temporarily preceding PUSCH and the scheduling information of a temporarily succeeding PUSCH are disposed sequentially.

Figure 43:
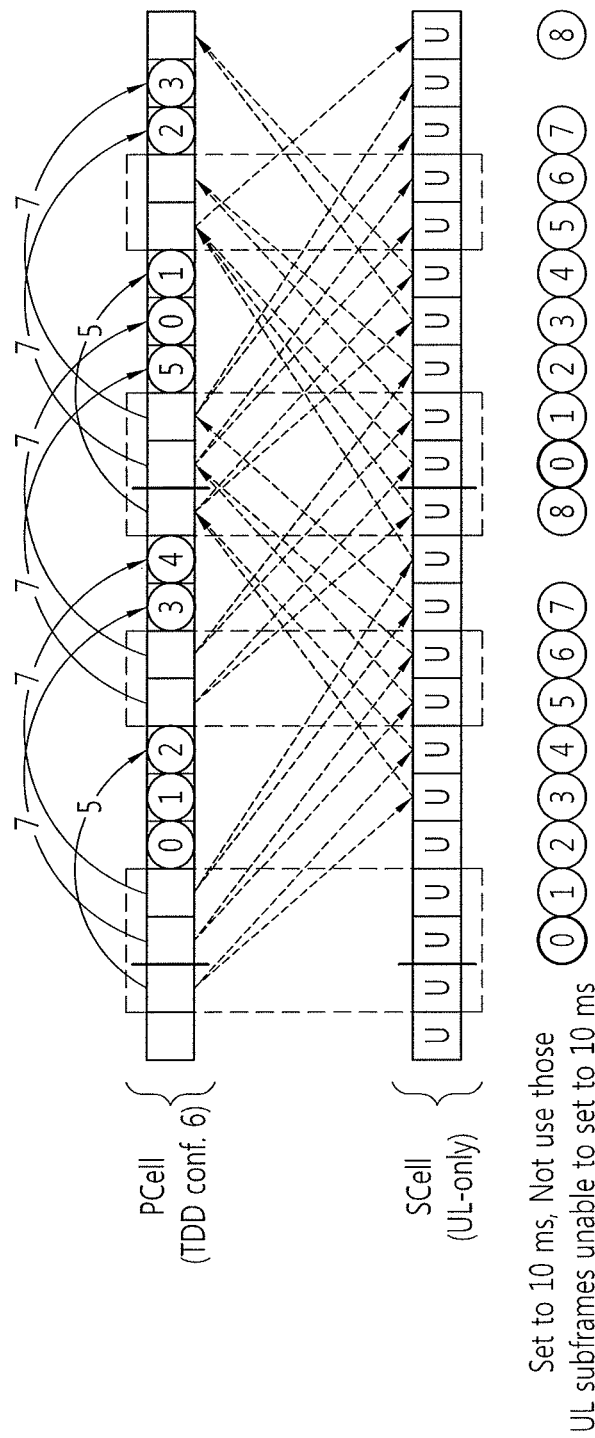
FIG. 43 is a yet another example of HARQ timing which can be applied when a primary cell using UL-DL configuration 6 and a secondary cell consisting only of UL subframes are aggregated.

FIG. 43 is a yet another example of HARQ timing which can be applied when a primary cell using UL-DL configuration 6 and a secondary cell consisting only of UL subframes are aggregated.

In the method of FIG. 43, GU is configured to be more than 4 ms and less than 6 ms, while UH is configured to be more than 4 ms and less than 6 ms. Scheduling can be constrained so that the scheduling information of a temporarily preceding PUSCH and the scheduling information of a temporarily succeeding PUSCH are disposed sequentially. A UL grant is distributed so that it is not concentrated on one DL subframe.

Multi-scheduling scheduling can be used. The number of UL HARQ processes is 9.

Figure 44:
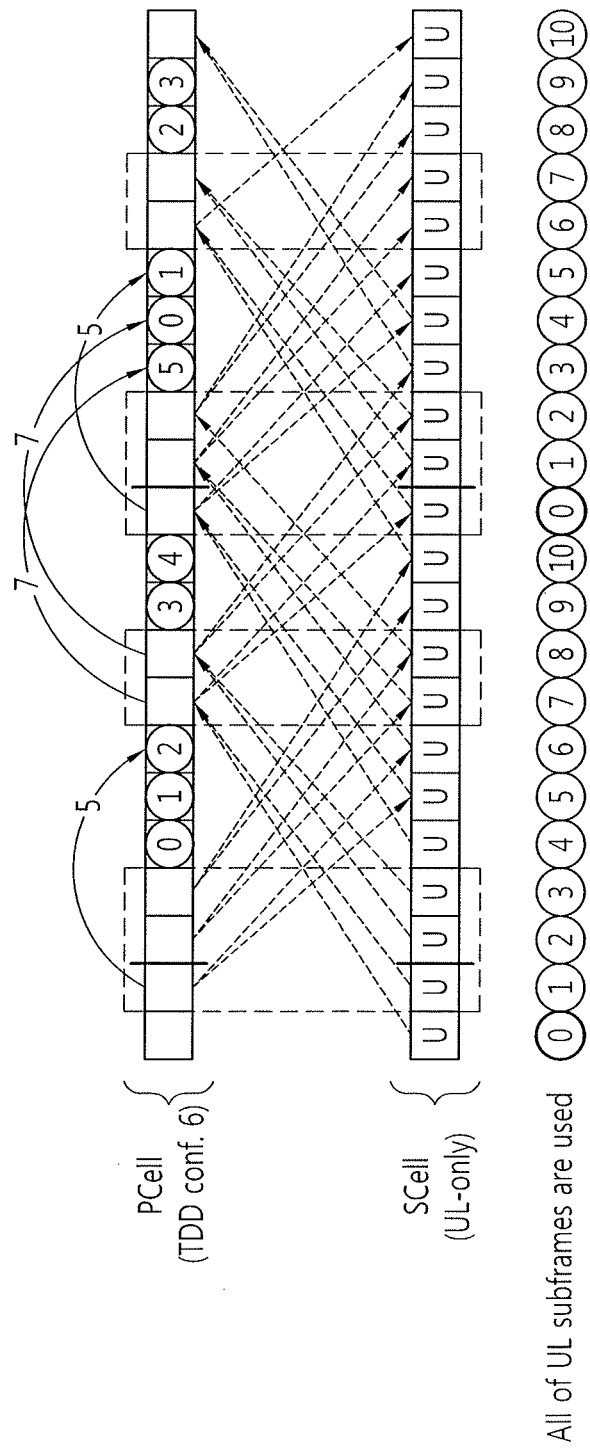
FIG. 44 is a still another example of HARQ timing which can be applied when a primary cell using UL-DL configuration 6 and a secondary cell consisting only of UL subframes are aggregated.

FIG. 44 is a still another example of HARQ timing which can be applied when a primary cell using UL-DL configuration 6 and a secondary cell consisting only of UL subframes are aggregated.

FIG. 44 illustrates a method for configuring UL HARQ with which all of the UL subframes can be utilized based on HARQ timing ensuring the minimum delay time, 4 ms, independently of the existing HARQ timing. Timing of retransmission of the PUSCH is determined based on the timing of the longest minimum period (which is composed of DL subframe 8 and 9). The number of UL HARQ processes is 11.

The methods described above can be used by selectively transforming a UL/DL subframe in one TDD cell, but can also be used for a method which selectively applies a subframe of the secondary cell to UL/DL. Since a DL subframe is used as a UL subframe, the same principles can be applied. A subframe always used being fixed as a DL subframe can be excluded.

Also, for the methods above, UL subframes which cannot be configured to handle a 10 ms HARQ period can be utilized for PUSCH transmission based on SPS PUSCH configuration timing.

PUSCH transmission can be set up by the period which is a multiple of 10 ms. The number of UL HARQ processes can be determined by taking into account the SPS PUSCH transmission as well.

In case the HARQ period of 10 ms is applied, only the initial transmission can be performed without retransmission or the retransmission can take into account transmission according to a period that is a multiple of 10 ms according to a PHICH response or a UL grant.

For activation/reactivation of SPS PUSCH, it is preferable that SPS PUSCH transmission is performed by separate coding even if a UL grant timing is determined at the DL subframe which is the same as that for a UL grant of a dynamic PUSCH. The same method can be applied for release of the SPS PUSCH transmission.

Figure 45:
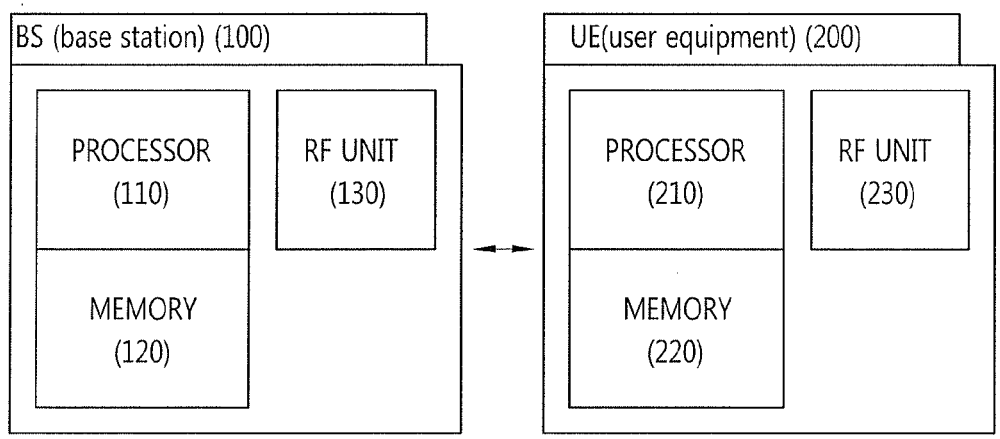
FIG. 45 is a block diagram illustrating the wireless communication system in which one embodiment of the present invention is implemented.

FIG. 45 is a block diagram illustrating the wireless communication system in which one embodiment of the present invention is implemented.

A base station (BS) 100 includes a processor 110, a memory 120, and an RF (radio frequency) unit 130. The processor 110 implements proposed functions, processes and/or methods. The memory 120 is connected to the processor 110 and stores various types of information for driving the processor 110. The RF unit 130 is connected to the processor 110, and transmits and/or receives radio signals.

A UE 200 includes a processor 210, a memory 220, and an RF unit 230. The processor 210 implements proposed functions, processes and/or methods. The memory 220 is connected to the processor 210, and stores various types of information for driving the processor 210. The RF unit 230 is connected to the processor 210, and transmits and/or receives radio signals.

The processor 110, 210 may include Application-Specific Integrated Circuits (ASICs), other chipsets, logic circuits, data processing devices and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented as a module (process, function, etc.) for performing the above-described function. The module may be stored in the memory 120, 220 and executed by the processor 110, 210. The memory 120, 220 may be placed inside or outside the processor 110, 210 and connected to the processor 110, 210 using a variety of well-known means.

What is claimed is:

1. A method for performing Hybrid Automatic Repeat reQuest (HARQ) in a carrier aggregation system including a first cell which uses a time division duplex (TDD) frame and a second cell which uses a frequency division duplex (FDD) frame, the method performed by a user equipment (UE) and comprising:
   transmitting data in an uplink subframe of the second cell to a base station;
   determining whether a first timing relationship coincides with a second timing relationship,
   wherein the first timing relationship is a time duration between the uplink subframe of the second cell and a first downlink subframe of the first cell supposed to receive an acknowledgement/not-acknowledgement (ACK/NACK) for the data, and
   wherein the second timing relationship is a time duration between an uplink subframe of the first cell, coinciding with the uplink subframe of the second cell, which can be used for transmitting another data and a second downlink subframe of the first cell to be used for receiving ACK/NACK for the another data; and
   attempting to receive, in the first downlink subframe of the first cell, either ACK/NACK for the data or scheduling information which schedules data to be retransmitted through the second cell from the base station according to the determination,
   wherein if the UE determines that the first timing relationship coincides with the second timing relationship, the UE attempts to receive the ACK/NACK for the data in the first downlink subframe of the first cell, and
   wherein if the UE determines that the first timing relationship does not coincide with the second timing relationship, the UE attempts to receive the scheduling information in the first downlink subframe of the first cell.

2. The method of claim 1, wherein the second cell is a cell scheduled by the first cell.

3. The method of claim 1, wherein the TDD frame of the first cell is configured by any one uplink-downlink (UL-DL) configuration of the following table:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

4. The method of claim 1, wherein the first cell is a primary cell which performs a process of establishing initial connection to the base station or a connection re-establishment process.

5. The method of claim 1, wherein the second cell is a secondary cell added to the primary cell.

6. A User Equipment (UE) for performing Hybrid Automatic Repeat reQuest (HARQ) in a carrier aggregation system including a first cell which uses a time division duplex (TDD) frame and a second cell which uses a frequency division duplex (FDD) frame, the UE comprising:
   a transceiver configured to transmit and receive a signal; and
   a processor coupled with the transceiver,
   wherein the processor is configured to:
      transmit data in an uplink subframe of the second cell to a base station;
      determine whether a first timing relationship coincides with a second timing relationship,
      wherein the first timing relationship is a time duration between the uplink subframe of the second cell and a first downlink subframe of the first cell supposed to receive an acknowledgement/not-acknowledgement (ACK/NACK) for the data, and
      wherein the second timing relationship is a time duration between an uplink subframe of the first cell, coinciding with the uplink subframe of the second cell, which can be used for transmitting another data and a second downlink subframe of the first cell to be used for receiving ACK/NACK for the another data; and attempt to receive, in the first downlink subframe of the first cell, either ACK/NACK for the data or scheduling information which schedules data to be retransmitted through the second cell from the base station according to the determination, wherein if the UE determines that the first timing relationship coincides with the second timing relationship, the UE attempts to receive the ACK/NACK for the data in the first downlink subframe of the first cell, and wherein if the UE determines that the first timing relationship does not coincide with the second timing relationship, the UE attempts to receive the scheduling information in the first downlink subframe of the first cell.

* * * * *